(12) United States Patent
Woodgate et al.

(10) Patent No.: US 12,222,077 B2
(45) Date of Patent: *Feb. 11, 2025

(54) VEHICLE EXTERNAL ILLUMINATION DEVICE

(71) Applicant: RealD Spark, LLC, Boulder, CO (US)

(72) Inventors: Graham J. Woodgate, Henley-on-Thames (GB); Jonathan Harrold, Upper Heyford (GB); Michael G. Robinson, Boulder, CA (US)

(73) Assignee: RealD Spark, LLC, Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/238,088

(22) Filed: Aug. 25, 2023

(65) Prior Publication Data
US 2024/0044469 A1    Feb. 8, 2024

Related U.S. Application Data

(63) Continuation of application No. 17/473,830, filed on Sep. 13, 2021, now Pat. No. 11,821,602.
(Continued)

(51) Int. Cl.
*F21S 41/24* (2018.01)
*F21S 43/241* (2018.01)
*F21Y 115/10* (2016.01)

(52) U.S. Cl.
CPC ............ *F21S 41/24* (2018.01); *F21S 43/241* (2018.01); *F21Y 2115/10* (2016.08)

(58) Field of Classification Search
CPC .... G02B 6/305; G02B 6/0073; G02B 6/0068; G02B 6/0055; F21S 43/241; F21S 41/24
See application file for complete search history.

(56) References Cited

U.S. PATENT DOCUMENTS

| 1,128,979 A | 2/1915 | Hess |
| 1,970,311 A | 8/1934 | Ives |

(Continued)

FOREIGN PATENT DOCUMENTS

| CN | 1142869 A | 2/1997 |
| CN | 1377453 A | 10/2002 |

(Continued)

OTHER PUBLICATIONS

JP-2015-512905 1st Office Action (translated) dated Feb. 7, 2017.
(Continued)

*Primary Examiner* — Anabel Ton
(74) *Attorney, Agent, or Firm* — Penny L. Lowry

(57) ABSTRACT

A directional illumination device for a vehicle external light comprises an array of light sources and an imaging waveguide comprising an input surface and a reflective end. Opposed guide surfaces are arranged to guide input light from the input surface to the reflective end and back along the waveguide after reflection at the reflective end, the waveguide being arranged to extract input light as it is guided back along the waveguide after reflection and to cause the extracted light to exit through the first guide surface. The reflective end has positive optical power in the direction laterally across the waveguide and the waveguide is arranged to direct the extracted light in respective output illumination directions distributed in a lateral direction in dependence on the input positions of the light sources in the direction laterally across the waveguide. A thin, high brightness and high efficiency controllable directional vehicle headlight is provided.

56 Claims, 47 Drawing Sheets

Related U.S. Application Data

(60) Provisional application No. 63/228,317, filed on Aug. 2, 2021, provisional application No. 63/151,095, filed on Feb. 19, 2021, provisional application No. 63/146,111, filed on Feb. 5, 2021, provisional application No. 63/136,257, filed on Jan. 12, 2021, provisional application No. 63/085,145, filed on Sep. 29, 2020, provisional application No. 63/079,352, filed on Sep. 16, 2020.

(56) References Cited

U.S. PATENT DOCUMENTS

| | | | |
|---|---|---|---|
| 2,133,121 | A | 10/1938 | Stearns |
| 2,247,969 | A | 7/1941 | Stewart |
| 2,480,178 | A | 8/1949 | Zinberg |
| 2,810,905 | A | 10/1957 | Barlow |
| 3,409,351 | A | 11/1968 | Winnek |
| 3,715,154 | A | 2/1973 | Bestenreiner |
| 4,057,323 | A | 11/1977 | Ward |
| 4,528,617 | A | 7/1985 | Blackington |
| 4,542,958 | A | 9/1985 | Young |
| 4,804,253 | A | 2/1989 | Stewart |
| 4,807,978 | A | 2/1989 | Grinberg et al. |
| 4,829,365 | A | 5/1989 | Eichenlaub |
| 4,914,553 | A | 4/1990 | Hamada et al. |
| 5,050,946 | A | 9/1991 | Hathaway et al. |
| 5,278,608 | A | 1/1994 | Taylor et al. |
| 5,347,644 | A | 9/1994 | Sedlmayr |
| 5,349,419 | A | 9/1994 | Taguchi et al. |
| 5,459,592 | A | 10/1995 | Shibatani et al. |
| 5,466,926 | A | 11/1995 | Sasano et al. |
| 5,510,831 | A | 4/1996 | Mayhew |
| 5,528,720 | A | 6/1996 | Winston et al. |
| 5,581,402 | A | 12/1996 | Taylor |
| 5,588,526 | A | 12/1996 | Fantone et al. |
| 5,688,035 | A | 11/1997 | Kashima et al. |
| 5,697,006 | A | 12/1997 | Taguchi et al. |
| 5,703,667 | A | 12/1997 | Ochiai |
| 5,727,107 | A | 3/1998 | Umemoto et al. |
| 5,771,066 | A | 6/1998 | Barnea |
| 5,796,451 | A | 8/1998 | Kim |
| 5,808,792 | A | 9/1998 | Woodgate et al. |
| 5,850,580 | A | 12/1998 | Taguchi et al. |
| 5,875,055 | A | 2/1999 | Morishima et al. |
| 5,896,225 | A | 4/1999 | Chikazawa |
| 5,903,388 | A | 5/1999 | Sedlmayr |
| 5,933,276 | A | 8/1999 | Magee |
| 5,956,001 | A | 9/1999 | Sumida et al. |
| 5,959,664 | A | 9/1999 | Woodgate |
| 5,959,702 | A | 9/1999 | Goodman |
| 5,969,850 | A | 10/1999 | Harrold et al. |
| 5,971,559 | A | 10/1999 | Ishikawa et al. |
| 6,008,484 | A | 12/1999 | Woodgate et al. |
| 6,014,164 | A | 1/2000 | Woodgate et al. |
| 6,023,315 | A | 2/2000 | Harrold et al. |
| 6,044,196 | A | 3/2000 | Winston et al. |
| 6,055,013 | A | 4/2000 | Woodgate et al. |
| 6,061,179 | A | 5/2000 | Inoguchi et al. |
| 6,061,489 | A | 5/2000 | Ezra et al. |
| 6,064,424 | A | 5/2000 | Berkel et al. |
| 6,075,557 | A | 6/2000 | Holliman et al. |
| 6,094,216 | A | 7/2000 | Taniguchi et al. |
| 6,108,059 | A | 8/2000 | Yang |
| 6,118,584 | A | 9/2000 | Berkel et al. |
| 6,128,054 | A | 10/2000 | Schwarzenberger |
| 6,144,118 | A | 11/2000 | Cahill et al. |
| 6,172,723 | B1 | 1/2001 | Inoue et al. |
| 6,199,995 | B1 | 3/2001 | Umemoto et al. |
| 6,219,113 | B1 | 4/2001 | Takahara |
| 6,224,214 | B1 | 5/2001 | Martin et al. |
| 6,232,592 | B1 | 5/2001 | Sugiyama |
| 6,256,447 | B1 | 7/2001 | Laine |
| 6,262,786 | B1 | 7/2001 | Perlo et al. |
| 6,295,109 | B1 | 9/2001 | Kubo et al. |
| 6,302,541 | B1 | 10/2001 | Grossmann |
| 6,305,813 | B1 | 10/2001 | Lekson et al. |
| 6,335,999 | B1 | 1/2002 | Winston et al. |
| 6,373,637 | B1 | 4/2002 | Gulick et al. |
| 6,377,295 | B1 | 4/2002 | Woodgate et al. |
| 6,422,713 | B1 | 7/2002 | Fohl et al. |
| 6,456,340 | B1 | 9/2002 | Margulis |
| 6,464,365 | B1 | 10/2002 | Gunn et al. |
| 6,476,850 | B1 | 11/2002 | Erbey |
| 6,481,849 | B2 | 11/2002 | Martin et al. |
| 6,654,156 | B1 | 11/2003 | Crossland et al. |
| 6,663,254 | B2 | 12/2003 | Ohsumi |
| 6,724,452 | B1 | 4/2004 | Takeda et al. |
| 6,731,355 | B2 | 5/2004 | Miyashita |
| 6,736,512 | B2 | 5/2004 | Balogh |
| 6,798,406 | B1 | 9/2004 | Jones et al. |
| 6,801,243 | B1 | 10/2004 | Berkel |
| 6,816,158 | B1 | 11/2004 | Lemelson et al. |
| 6,825,985 | B2 | 11/2004 | Brown et al. |
| 6,847,354 | B2 | 1/2005 | Vranish |
| 6,847,488 | B2 | 1/2005 | Travis |
| 6,859,240 | B1 | 2/2005 | Brown et al. |
| 6,867,828 | B2 | 3/2005 | Taira et al. |
| 6,870,671 | B2 | 3/2005 | Travis |
| 6,883,919 | B2 | 4/2005 | Travis |
| 7,052,168 | B2 | 5/2006 | Epstein et al. |
| 7,058,252 | B2 | 6/2006 | Woodgate et al. |
| 7,073,933 | B2 | 7/2006 | Gotoh et al. |
| 7,091,931 | B2 | 8/2006 | Yoon |
| 7,101,048 | B2 | 9/2006 | Travis |
| 7,136,031 | B2 | 11/2006 | Lee et al. |
| 7,215,391 | B2 | 5/2007 | Kuan et al. |
| 7,215,415 | B2 | 5/2007 | Maehara et al. |
| 7,215,475 | B2 | 5/2007 | Woodgate et al. |
| 7,227,567 | B1 | 6/2007 | Beck et al. |
| 7,239,293 | B2 | 7/2007 | Perlin et al. |
| 7,365,908 | B2 | 4/2008 | Dolgoff |
| 7,375,886 | B2 | 5/2008 | Lipton et al. |
| 7,410,286 | B2 | 8/2008 | Travis |
| 7,430,358 | B2 | 9/2008 | Qi et al. |
| 7,492,346 | B2 | 2/2009 | Manabe et al. |
| 7,528,893 | B2 | 5/2009 | Schultz et al. |
| 7,545,429 | B2 | 6/2009 | Travis |
| 7,587,117 | B2 | 9/2009 | Winston et al. |
| 7,614,777 | B2 | 11/2009 | Koganezawa et al. |
| 7,660,047 | B1 | 2/2010 | Travis et al. |
| 7,750,981 | B2 | 7/2010 | Shestak et al. |
| 7,750,982 | B2 | 7/2010 | Nelson et al. |
| 7,771,102 | B2 | 8/2010 | Iwasaki |
| 7,798,699 | B2 | 9/2010 | Laitinen et al. |
| 7,944,428 | B2 | 5/2011 | Travis |
| 7,970,246 | B2 | 6/2011 | Travis et al. |
| 7,976,208 | B2 | 7/2011 | Travis |
| 8,016,475 | B2 | 9/2011 | Travis |
| 8,179,361 | B2 | 5/2012 | Sugimoto et al. |
| 8,216,405 | B2 | 7/2012 | Emerton et al. |
| 8,223,296 | B2 | 7/2012 | Lee et al. |
| 8,325,295 | B2 | 12/2012 | Sugita et al. |
| 8,354,806 | B2 | 1/2013 | Travis et al. |
| 8,477,261 | B2 | 7/2013 | Travis et al. |
| 8,502,253 | B2 | 8/2013 | Min |
| 8,534,901 | B2 | 9/2013 | Panagotacos et al. |
| 8,556,491 | B2 | 10/2013 | Lee |
| 8,651,725 | B2 | 2/2014 | Ie et al. |
| 8,684,588 | B2 | 4/2014 | Ajichi et al. |
| 8,714,804 | B2 | 5/2014 | Kim et al. |
| 8,736,967 | B1 | 5/2014 | Browne et al. |
| 8,752,995 | B2 | 6/2014 | Park |
| 8,760,762 | B1 | 6/2014 | Kelly et al. |
| 8,926,112 | B2 | 1/2015 | Uchiike et al. |
| 8,942,434 | B1 | 1/2015 | Karakotsios et al. |
| 8,985,810 | B2 | 3/2015 | Woodgate et al. |
| 9,188,731 | B2 | 11/2015 | Woodgate et al. |
| 9,197,884 | B2 | 11/2015 | Lee et al. |
| 9,350,980 | B2 | 5/2016 | Robinson et al. |
| 9,519,153 | B2 | 12/2016 | Robinson et al. |
| 10,054,732 | B2 | 8/2018 | Robinson et al. |
| 10,191,196 | B2 | 1/2019 | Morozov et al. |
| 10,425,635 | B2 | 9/2019 | Woodgate et al. |

(56) References Cited

U.S. PATENT DOCUMENTS

| | | | |
|---|---|---|---|
| 11,821,602 B2 * | 11/2023 | Woodgate | B60Q 1/3015 |
| 2001/0001566 A1 | 5/2001 | Moseley et al. | |
| 2001/0050686 A1 | 12/2001 | Allen | |
| 2002/0018299 A1 | 2/2002 | Daniell | |
| 2002/0113246 A1 | 8/2002 | Nagai et al. | |
| 2002/0113866 A1 | 8/2002 | Taniguchi et al. | |
| 2003/0046839 A1 | 3/2003 | Oda et al. | |
| 2003/0137738 A1 | 7/2003 | Ozawa et al. | |
| 2003/0137821 A1 | 7/2003 | Gotoh et al. | |
| 2004/0008877 A1 | 1/2004 | Leppard et al. | |
| 2004/0015729 A1 | 1/2004 | Elms et al. | |
| 2004/0021809 A1 | 2/2004 | Sumiyoshi et al. | |
| 2004/0042233 A1 | 3/2004 | Suzuki et al. | |
| 2004/0046709 A1 | 3/2004 | Yoshino | |
| 2004/0105264 A1 | 6/2004 | Spero | |
| 2004/0108971 A1 | 6/2004 | Waldern et al. | |
| 2004/0109303 A1 | 6/2004 | Olczak | |
| 2004/0135741 A1 | 7/2004 | Tomisawa et al. | |
| 2004/0170011 A1 | 9/2004 | Kim et al. | |
| 2004/0263968 A1 | 12/2004 | Kobayashi et al. | |
| 2004/0263969 A1 | 12/2004 | Lipton et al. | |
| 2005/0007753 A1 | 1/2005 | Hees et al. | |
| 2005/0073495 A1 | 4/2005 | Harbers et al. | |
| 2005/0094295 A1 | 5/2005 | Yamashita et al. | |
| 2005/0110980 A1 | 5/2005 | Maehara et al. | |
| 2005/0135116 A1 | 6/2005 | Epstein et al. | |
| 2005/0174768 A1 | 8/2005 | Conner | |
| 2005/0180167 A1 | 8/2005 | Hoelen et al. | |
| 2005/0190180 A1 | 9/2005 | Jin et al. | |
| 2005/0190345 A1 | 9/2005 | Dubin et al. | |
| 2005/0237488 A1 | 10/2005 | Yamasaki et al. | |
| 2005/0254127 A1 | 11/2005 | Evans et al. | |
| 2005/0264717 A1 | 12/2005 | Chien et al. | |
| 2005/0274956 A1 | 12/2005 | Bhat | |
| 2005/0276071 A1 | 12/2005 | Sasagawa et al. | |
| 2005/0280637 A1 | 12/2005 | Ikeda et al. | |
| 2006/0002678 A1 | 1/2006 | Weber et al. | |
| 2006/0012845 A1 | 1/2006 | Edwards | |
| 2006/0056166 A1 | 3/2006 | Yeo et al. | |
| 2006/0114664 A1 | 6/2006 | Sakata et al. | |
| 2006/0132423 A1 | 6/2006 | Travis | |
| 2006/0139447 A1 | 6/2006 | Unkrich | |
| 2006/0158729 A1 | 7/2006 | Vissenberg et al. | |
| 2006/0176912 A1 | 8/2006 | Anikitchev | |
| 2006/0203200 A1 | 9/2006 | Koide | |
| 2006/0215129 A1 | 9/2006 | Alasaarela et al. | |
| 2006/0221642 A1 | 10/2006 | Daiku | |
| 2006/0227087 A1 | 10/2006 | Hajjar et al. | |
| 2006/0227427 A1 | 10/2006 | Dolgoff | |
| 2006/0244918 A1 | 11/2006 | Cossairt et al. | |
| 2006/0250580 A1 | 11/2006 | Silverstein et al. | |
| 2006/0262376 A1 | 11/2006 | Mather et al. | |
| 2006/0269213 A1 | 11/2006 | Hwang et al. | |
| 2006/0284974 A1 | 12/2006 | Lipton et al. | |
| 2006/0291053 A1 | 12/2006 | Robinson et al. | |
| 2006/0291243 A1 | 12/2006 | Niioka et al. | |
| 2007/0008406 A1 | 1/2007 | Shestak et al. | |
| 2007/0013624 A1 | 1/2007 | Bourhill | |
| 2007/0025680 A1 | 2/2007 | Winston et al. | |
| 2007/0035829 A1 | 2/2007 | Woodgate et al. | |
| 2007/0035964 A1 | 2/2007 | Olczak | |
| 2007/0081110 A1 | 4/2007 | Lee | |
| 2007/0085105 A1 | 4/2007 | Beeson et al. | |
| 2007/0109400 A1 | 5/2007 | Woodgate et al. | |
| 2007/0109401 A1 | 5/2007 | Lipton et al. | |
| 2007/0115551 A1 | 5/2007 | Spilman et al. | |
| 2007/0115552 A1 | 5/2007 | Robinson et al. | |
| 2007/0153160 A1 | 7/2007 | Lee et al. | |
| 2007/0183466 A1 | 8/2007 | Son et al. | |
| 2007/0188667 A1 | 8/2007 | Schwerdtner | |
| 2007/0189701 A1 | 8/2007 | Chakmakjian et al. | |
| 2007/0223251 A1 | 9/2007 | Liao | |
| 2007/0223252 A1 | 9/2007 | Lee et al. | |
| 2007/0279554 A1 | 12/2007 | Kowarz et al. | |
| 2007/0279727 A1 | 12/2007 | Gandhi et al. | |
| 2008/0079662 A1 | 4/2008 | Saishu et al. | |
| 2008/0084519 A1 | 4/2008 | Brigham et al. | |
| 2008/0086289 A1 | 4/2008 | Brott | |
| 2008/0128728 A1 | 6/2008 | Nemchuk et al. | |
| 2008/0225205 A1 | 9/2008 | Travis | |
| 2008/0259012 A1 | 10/2008 | Fergason | |
| 2008/0259643 A1 | 10/2008 | Ijzerman et al. | |
| 2008/0291359 A1 | 11/2008 | Miyashita | |
| 2008/0297431 A1 | 12/2008 | Yuuki et al. | |
| 2008/0297459 A1 | 12/2008 | Sugimoto et al. | |
| 2008/0304282 A1 | 12/2008 | Mi et al. | |
| 2008/0316768 A1 | 12/2008 | Travis | |
| 2009/0016057 A1 | 1/2009 | Rinko | |
| 2009/0040426 A1 | 2/2009 | Mather et al. | |
| 2009/0067156 A1 | 3/2009 | Bonnett et al. | |
| 2009/0109705 A1 | 4/2009 | Pakhchyan et al. | |
| 2009/0128735 A1 | 5/2009 | Larson et al. | |
| 2009/0135623 A1 | 5/2009 | Kunimochi | |
| 2009/0140656 A1 | 6/2009 | Kohashikawa et al. | |
| 2009/0160757 A1 | 6/2009 | Robinson | |
| 2009/0167651 A1 | 7/2009 | Minaño et al. | |
| 2009/0168459 A1 | 7/2009 | Holman et al. | |
| 2009/0174700 A1 | 7/2009 | Daiku | |
| 2009/0174840 A1 | 7/2009 | Lee et al. | |
| 2009/0190072 A1 | 7/2009 | Nagata et al. | |
| 2009/0190079 A1 | 7/2009 | Saitoh | |
| 2009/0207629 A1 | 8/2009 | Fujiyama et al. | |
| 2009/0225380 A1 | 9/2009 | Schwerdtner et al. | |
| 2009/0278936 A1 | 11/2009 | Pastoor et al. | |
| 2009/0290203 A1 | 11/2009 | Schwerdtner | |
| 2009/0315915 A1 | 12/2009 | Dunn et al. | |
| 2010/0034987 A1 | 2/2010 | Fujii et al. | |
| 2010/0040280 A1 | 2/2010 | McKnight | |
| 2010/0053771 A1 | 3/2010 | Travis et al. | |
| 2010/0053938 A1 | 3/2010 | Kim et al. | |
| 2010/0091254 A1 | 4/2010 | Travis et al. | |
| 2010/0165598 A1 | 7/2010 | Chen et al. | |
| 2010/0177387 A1 | 7/2010 | Travis et al. | |
| 2010/0182542 A1 | 7/2010 | Nakamoto et al. | |
| 2010/0188438 A1 | 7/2010 | Kang | |
| 2010/0188602 A1 | 7/2010 | Feng | |
| 2010/0214135 A1 | 8/2010 | Bathiche et al. | |
| 2010/0220260 A1 | 9/2010 | Sugita et al. | |
| 2010/0231498 A1 | 9/2010 | Large et al. | |
| 2010/0271838 A1 | 10/2010 | Yamaguchi | |
| 2010/0277575 A1 | 11/2010 | Ismael et al. | |
| 2010/0278480 A1 | 11/2010 | Vasylyev | |
| 2010/0289870 A1 | 11/2010 | Leister | |
| 2010/0295920 A1 | 11/2010 | McGowan | |
| 2010/0295930 A1 | 11/2010 | Ezhov | |
| 2010/0300608 A1 | 12/2010 | Emerton et al. | |
| 2010/0302135 A1 | 12/2010 | Larson et al. | |
| 2010/0309296 A1 | 12/2010 | Harrold et al. | |
| 2010/0328438 A1 | 12/2010 | Ohyama et al. | |
| 2010/0328561 A1 | 12/2010 | Schuck et al. | |
| 2011/0013417 A1 | 1/2011 | Saccomanno et al. | |
| 2011/0019112 A1 | 1/2011 | Dolgoff | |
| 2011/0032483 A1 | 2/2011 | Hruska et al. | |
| 2011/0032724 A1 | 2/2011 | Kinoshita | |
| 2011/0043142 A1 | 2/2011 | Travis et al. | |
| 2011/0043501 A1 | 2/2011 | Daniel | |
| 2011/0044056 A1 | 2/2011 | Travis et al. | |
| 2011/0044579 A1 | 2/2011 | Travis et al. | |
| 2011/0051237 A1 | 3/2011 | Hasegawa et al. | |
| 2011/0187293 A1 | 8/2011 | Travis | |
| 2011/0187635 A1 | 8/2011 | Lee et al. | |
| 2011/0188120 A1 | 8/2011 | Tabirian et al. | |
| 2011/0199459 A1 | 8/2011 | Barenbrug et al. | |
| 2011/0211142 A1 | 9/2011 | Kashiwagi et al. | |
| 2011/0216266 A1 | 9/2011 | Travis | |
| 2011/0221998 A1 | 9/2011 | Adachi et al. | |
| 2011/0228183 A1 | 9/2011 | Hamagishi | |
| 2011/0228562 A1 | 9/2011 | Travis et al. | |
| 2011/0235359 A1 | 9/2011 | Liu et al. | |
| 2011/0242150 A1 | 10/2011 | Song et al. | |
| 2011/0242277 A1 | 10/2011 | Do et al. | |
| 2011/0242298 A1 | 10/2011 | Bathiche et al. | |
| 2011/0255303 A1 | 10/2011 | Nichol et al. | |
| 2011/0267563 A1 | 11/2011 | Shimizu | |

(56) References Cited

U.S. PATENT DOCUMENTS

| | | |
|---|---|---|
| 2011/0285927 A1 | 11/2011 | Schultz et al. |
| 2011/0292321 A1 | 12/2011 | Travis et al. |
| 2011/0310232 A1 | 12/2011 | Wilson et al. |
| 2012/0002136 A1 | 1/2012 | Nagata et al. |
| 2012/0002295 A1 | 1/2012 | Dobschal et al. |
| 2012/0008067 A1 | 1/2012 | Mun et al. |
| 2012/0013720 A1 | 1/2012 | Kadowaki et al. |
| 2012/0056971 A1 | 3/2012 | Kumar et al. |
| 2012/0062991 A1 | 3/2012 | Krijn et al. |
| 2012/0075285 A1 | 3/2012 | Oyagi et al. |
| 2012/0081920 A1 | 4/2012 | Ie et al. |
| 2012/0086776 A1 | 4/2012 | Lo |
| 2012/0092435 A1 | 4/2012 | Wohlert |
| 2012/0106193 A1 | 5/2012 | Kim et al. |
| 2012/0127573 A1 | 5/2012 | Robinson et al. |
| 2012/0154450 A1 | 6/2012 | Aho et al. |
| 2012/0169838 A1 | 7/2012 | Sekine |
| 2012/0182482 A1 | 7/2012 | Byoun et al. |
| 2012/0206050 A1 | 8/2012 | Spero |
| 2012/0243204 A1 | 9/2012 | Robinson |
| 2012/0243261 A1 | 9/2012 | Yamamoto et al. |
| 2012/0268426 A1 | 10/2012 | Yi et al. |
| 2012/0293721 A1 | 11/2012 | Ueyama |
| 2012/0294579 A1 | 11/2012 | Chen |
| 2012/0299913 A1 | 11/2012 | Robinson et al. |
| 2012/0314145 A1 | 12/2012 | Robinson |
| 2012/0327172 A1 | 12/2012 | El-Saban et al. |
| 2013/0050452 A1 | 2/2013 | Ramsey et al. |
| 2013/0083303 A1 | 4/2013 | Hoover et al. |
| 2013/0101253 A1 | 4/2013 | Popovich et al. |
| 2013/0107340 A1 | 5/2013 | Wong et al. |
| 2013/0119237 A1 | 5/2013 | Raguin et al. |
| 2013/0127861 A1 | 5/2013 | Gollier |
| 2013/0135588 A1 | 5/2013 | Popovich et al. |
| 2013/0156265 A1 | 6/2013 | Hennessy |
| 2013/0169701 A1 | 7/2013 | Whitehead et al. |
| 2013/0170004 A1 | 7/2013 | Futterer |
| 2013/0222384 A1 | 8/2013 | Futterer et al. |
| 2013/0230136 A1 | 9/2013 | Sakaguchi et al. |
| 2013/0235561 A1 | 9/2013 | Etienne et al. |
| 2013/0278612 A1 | 10/2013 | Holman et al. |
| 2013/0307831 A1 | 11/2013 | Robinson et al. |
| 2013/0307946 A1 | 11/2013 | Robinson et al. |
| 2013/0308339 A1 | 11/2013 | Woodgate et al. |
| 2013/0321599 A1 | 12/2013 | Harrold et al. |
| 2013/0328866 A1 | 12/2013 | Woodgate et al. |
| 2013/0335821 A1 | 12/2013 | Robinson et al. |
| 2014/0009508 A1 | 1/2014 | Woodgate et al. |
| 2014/0016354 A1 | 1/2014 | Lee et al. |
| 2014/0022619 A1 | 1/2014 | Woodgate et al. |
| 2014/0028807 A1 | 1/2014 | Goulanian et al. |
| 2014/0036361 A1 | 2/2014 | Woodgate et al. |
| 2014/0041205 A1 | 2/2014 | Robinson et al. |
| 2014/0043323 A1 | 2/2014 | Sumi |
| 2014/0098558 A1 | 4/2014 | Vasylyev |
| 2014/0240344 A1 | 8/2014 | Tomono et al. |
| 2014/0240828 A1 | 8/2014 | Robinson et al. |
| 2014/0289835 A1 | 9/2014 | Varshavsky et al. |
| 2014/0340728 A1 | 11/2014 | Taheri |
| 2015/0029754 A1 | 1/2015 | Ouderkirk et al. |
| 2015/0070773 A1 | 3/2015 | Wang et al. |
| 2015/0085091 A1 | 3/2015 | Varekamp |
| 2015/0116212 A1 | 4/2015 | Freed et al. |
| 2015/0192265 A1 | 7/2015 | Yu et al. |
| 2015/0268479 A1 | 9/2015 | Woodgate et al. |
| 2015/0334365 A1 | 11/2015 | Tsubaki et al. |
| 2015/0339512 A1 | 11/2015 | Son et al. |
| 2016/0033710 A1 | 2/2016 | Kim et al. |
| 2018/0074265 A1 | 3/2018 | Waldern et al. |
| 2018/0113310 A1 | 4/2018 | Rolland et al. |
| 2018/0196275 A1 | 7/2018 | Robinson et al. |
| 2018/0284341 A1 | 10/2018 | Woodgate et al. |
| 2018/0313510 A1 | 11/2018 | Albou et al. |
| 2018/0373051 A1 | 12/2018 | Harrold et al. |
| 2019/0056086 A1 | 2/2019 | Nambara et al. |
| 2019/0227322 A1 | 7/2019 | Schaub et al. |
| 2020/0049995 A1 | 2/2020 | Urey et al. |
| 2020/0183152 A1 | 6/2020 | Pennell et al. |
| 2020/0278538 A1 | 9/2020 | Taylor et al. |
| 2021/0333570 A1 | 10/2021 | Fattal et al. |
| 2022/0120402 A1 | 4/2022 | Woodgate et al. |
| 2023/0408826 A1 | 12/2023 | Oh et al. |
| 2023/0418068 A1 | 12/2023 | Woodgate et al. |
| 2024/0061248 A1 | 2/2024 | Robinson et al. |

FOREIGN PATENT DOCUMENTS

| | | |
|---|---|---|
| CN | 1454329 A | 11/2003 |
| CN | 1466005 A | 1/2004 |
| CN | 1487332 A | 4/2004 |
| CN | 1588196 A | 3/2005 |
| CN | 1678943 A | 10/2005 |
| CN | 1696788 A | 11/2005 |
| CN | 1769971 A | 5/2006 |
| CN | 1823292 A | 8/2006 |
| CN | 1826553 A | 8/2006 |
| CN | 1866112 A | 11/2006 |
| CN | 1900785 A | 1/2007 |
| CN | 1908753 A | 2/2007 |
| CN | 2872404 | 2/2007 |
| CN | 1307481 | 3/2007 |
| CN | 101029975 A | 9/2007 |
| CN | 101049028 A | 10/2007 |
| CN | 200983052 | 11/2007 |
| CN | 101114080 A | 1/2008 |
| CN | 101142823 A | 3/2008 |
| CN | 101266338 A | 9/2008 |
| CN | 100449353 | 1/2009 |
| CN | 101364004 A | 2/2009 |
| CN | 101598863 B | 12/2009 |
| CN | 100591141 | 2/2010 |
| CN | 101660689 A | 3/2010 |
| CN | 102147079 A | 8/2011 |
| CN | 202486493 U | 10/2012 |
| EP | 0653891 A1 | 5/1995 |
| EP | 0721131 A2 | 7/1996 |
| EP | 0830984 A2 | 3/1998 |
| EP | 0833183 A1 | 4/1998 |
| EP | 0860729 A2 | 8/1998 |
| EP | 0939273 A1 | 9/1999 |
| EP | 0656555 B1 | 3/2003 |
| EP | 1394593 A1 | 3/2004 |
| EP | 1736702 A1 | 12/2006 |
| EP | 2003394 A2 | 12/2008 |
| EP | 2105655 A2 | 9/2009 |
| EP | 2219067 A1 | 8/2010 |
| EP | 2451180 A2 | 5/2012 |
| EP | 1634119 B1 | 8/2012 |
| EP | 2796771 B1 | 5/2020 |
| GB | 2405542 | 2/2005 |
| JP | H07270792 | 10/1995 |
| JP | H08211334 | 8/1996 |
| JP | H08237691 A | 9/1996 |
| JP | H08254617 | 10/1996 |
| JP | H08070475 | 12/1996 |
| JP | H08340556 | 12/1996 |
| JP | H1042315 A | 2/1998 |
| JP | H10142556 A | 5/1998 |
| JP | H11242908 A | 9/1999 |
| JP | 2000048618 A | 2/2000 |
| JP | 2000069504 A | 3/2000 |
| JP | 2000131683 A | 5/2000 |
| JP | 2000200049 A | 7/2000 |
| JP | 2001093329 A | 4/2001 |
| JP | 2002049004 A | 2/2002 |
| JP | 2003215349 A | 7/2003 |
| JP | 2003215705 A | 7/2003 |
| JP | 2004112814 A | 4/2004 |
| JP | 2004127810 A | 4/2004 |
| JP | 2004265813 A | 9/2004 |
| JP | 2004319364 A | 11/2004 |
| JP | 2005135844 A | 5/2005 |
| JP | 2005181914 A | 7/2005 |
| JP | 2005183030 A | 7/2005 |

(56) References Cited

FOREIGN PATENT DOCUMENTS

| | | |
|---|---|---|
| JP | 2005203182 A | 7/2005 |
| JP | 2005259361 A | 9/2005 |
| JP | 2006004877 A | 1/2006 |
| JP | 2006010935 A | 1/2006 |
| JP | 2006031941 A | 2/2006 |
| JP | 2006310269 A | 11/2006 |
| JP | 2007094035 A | 4/2007 |
| JP | 3968742 B2 | 8/2007 |
| JP | 2007273288 A | 10/2007 |
| JP | 2008204874 A | 9/2008 |
| JP | 2010160527 A | 7/2010 |
| JP | 2011192468 A | 9/2011 |
| JP | 2012060607 A | 3/2012 |
| JP | 2014022309 A | 2/2014 |
| KR | 20030064258 | 7/2003 |
| KR | 20090932304 | 12/2009 |
| KR | 20110006773 A | 1/2011 |
| KR | 20110017918 A | 2/2011 |
| KR | 20110067534 A | 6/2011 |
| KR | 20120048301 A | 5/2012 |
| KR | 20120049890 A | 5/2012 |
| KR | 20130002646 A | 1/2013 |
| TW | 200528780 A | 9/2005 |
| WO | 1998021620 A1 | 5/1998 |
| WO | 1999011074 A1 | 3/1999 |
| WO | 2001061241 A1 | 8/2001 |
| WO | 2008038539 A1 | 4/2008 |
| WO | 2008045681 A1 | 4/2008 |
| WO | 2009098809 A1 | 8/2009 |
| WO | 2010021926 A2 | 2/2010 |
| WO | 2011020962 A1 | 2/2011 |
| WO | 2011022342 A2 | 2/2011 |
| WO | 2011068907 A1 | 6/2011 |
| WO | 2011149739 A2 | 12/2011 |
| WO | 2012158574 A1 | 11/2012 |
| WO | 2013137161 A1 | 9/2013 |
| WO | 2014130860 A1 | 8/2014 |
| WO | 2022060673 A1 | 3/2022 |

OTHER PUBLICATIONS

Kalantar, et al. "Backlight Unit With Double Surface Light Emission," J. Soc. Inf. Display, vol. 12, Issue 4, pp. 379-387 (Dec. 2004).
Kononenko et al., "Learning to Look Up: Realtime Monocular Gaze Correction Using Machine Learning", Computer Vision and Pattern Recognition, pp. 4667-4675, 2015.
KR-20137015775 Office action (translated) dated Oct. 18, 2016.
Languy et al., "Performance comparison of four kinds of flat nonimaging Fresnel lenses made of polycarbonates and polymethyl methacrylate for concentrated photovoltaics", Optics Letters, 36, pp. 2743-2745.
Lipton: "Stereoscopic Composition Lenny Lipton", Feb. 15, 2009 (Feb. 15, 2009), XP055335930, Retrieved from the Internet: URL:https://lennylipton.wordpress.com/2009/02/15/stereoscopic-composition/ [retrieved on Jan. 17, 2017].
Lowe, "Distinctive Image Features from Scale-Invariant Keypoints", International Journal of Computer Vision 60 (2), pp. 91-110, 2004.
Lucio et al: "RGBD Camera Effects", Aug. 1, 2012 (Aug. 1, 2012), XP055335831, SIBGRAPI—Conference on Graphics, Patterns and Images Retrieved from the Internet: URL:https://www.researchgate.net/profile/Leandro Cruz/publication/233398182 RGBD Camera Effects/links/0912f50a2922010eb2000000.pdf [retrieved on Jan. 17, 2017].
Ozuysal et al., "Fast Keypoint recognition in Ten Lines of Code", Computer Vision and Pattern Recognition, pp. 1-8, 2007.
PCT/US2007/85475 International preliminary report on patentability dated May 26, 2009.
PCT/US2011/061511 International Preliminary Report on Patentability dated May 21, 2013.
PCT/US2011/061511 International search report and written opinion of international searching authority dated Jun. 29, 2012.
PCT/US2012/037677 International search report and written opinion of international searching authority dated Jun. 29, 2012.
PCT/US2012/042279 International search report and written opinion of international searching authority dated Feb. 26, 2013.
PCT/US2012/052189 International search report and written opinion of the international searching authority dated Jan. 29, 2013.
PCT/US2013/041192 International search report and written opinion of international searching authority mailed Aug. 28, 2013.
PCT/US2013/041228 International search report and written opinion of international searching authority mailed Aug. 23, 2013.
PCT/US2013/041235 International search report and written opinion of international searching authority Mailed Aug. 23, 2013.
PCT/US2013/041548 International search report and written opinion of international searching authority mailed Aug. 27, 2013.
PCT/US2013/041619 International search report and written opinion of international searching authority mailed Aug. 27, 2013.
PCT/US2013/041655 International search report and written opinion of international searching authority mailed Aug. 27, 2013.
PCT/US2013/041683 International search report and written opinion of international searching authority mailed Aug. 27, 2013.
PCT/US2013/041697 International search report and written opinion of international searching authority mailed Aug. 23, 2013.
PCT/US2013/041703 International search report and written opinion of international searching authority mailed Aug. 27, 2013.
PCT/US2013/063125 International search report and written opinion of international searching authority mailed Jan. 20, 2014.
PCT/US2013/063133 International search report and written opinion of international searching authority mailed Jan. 20, 2014.
PCT/US2013/077288 International search report and written opinion of international searching authority mailed Apr. 18, 2014.
PCT/US2014/017779 International search report and written opinion of international searching authority mailed May 28, 2014.
PCT/US2014/042721 International search report and written opinion of international searching authority mailed Oct. 10, 2014.
PCT/US2015/054523 International search report and written opinion of international searching authority dated Mar. 18, 2016.
PCT/US2016/034418 International search report and written opinion of the international searching authority dated Sep. 7, 2016.
PCT/US2016/056410 International search report and written opinion of the international searching authority dated Jan. 25, 2017.
PCT/US2016/058695 International search report and written opinion of international searching authority dated Feb. 28, 2017.
PCT/US2016/061428 International search report and written opinion of international searching authority mailed Jan. 20, 2017.
PCT/US2017/012203 International search report and written opinion of international searching authority mailed Apr. 18, 2017.
Robinson et al., U.S. Appl. No. 15/165,960 entitled "Wide Angle Imaging Directional Backlights" filed May 26, 2016. The application is available to Examiner on the USPTO database and has not been filed herewith.
Robinson et al., U.S. Appl. No. 15/290,543 entitled "Wide angle imaging directional backlights" filed Oct. 11, 2016. The application is available to Examiner on the USPTO database and has not been filed herewith.
Robinson, U.S. Appl. No. 13/300,293 entitled "Directional flat illuminators" filed Nov. 18, 2011. The application is available to Examiner on the USPTO database and has not been filed herewith.
RU-2013122560 First office action dated Jan. 22, 2014.
RU-2013122560 Second office action dated Apr. 10, 2015.
RU-201401264 Office action dated Jan. 18, 2017.
Tabiryan et al., "The Promise of Diffractive Waveplates," Optics and Photonics News, vol. 21, Issue 3, pp. 40-45 (Mar. 2010).
Travis, et al. "Backlight for view-sequential autostereo 3D", Microsoft E&DD Applied Sciences, (date unknown), 25 pages.
Travis, et al. "Collimated light from a waveguide for a display," Optics Express, vol. 17, No. 22, pp. 19714-19719 (2009).
Mola and Jones, "Rapid Object Detection using a Boosted Cascade of Simple Features", pp. 1-9 CVPR 2001.
Zach et al., "A Duality Based Approach for Realtime TV-L1 Optical Flow", Pattern Recognition (Proc. DAGM), 2007, pp. 214-223.
AU-2014218711 Examination report No. 1 dated Mar. 20, 2017.
Beato: "Understanding Comfortable stereography", Dec. 31, 2011 (Dec. 31, 2011), XP055335952, Retrieved from the Internet: URL:http://64.17.134.112/Affonso Beato/Understanding Comfortable Stereography.html [retrieved-on Jan. 17, 2017].

(56) References Cited

OTHER PUBLICATIONS

Braverman: "The 3D Toolbox : News", Aug. 13, 2010 (Aug. 13, 2010), XP055336081, Retrieved from the Internet: URL:http://www.dashwood3d.com/blog/the-3d-toolbox/ [retrieved on Jan. 17, 2017].
CN-201180065590.0 Office fourth action dated Jan. 4, 2017.
CN-201380026045.X Chinese First Office Action of Chinese Patent Office dated Aug. 29, 2016.
CN-201380026046.4 Chinese 1st Office Action of the State Intellectual Property Office of P.R. China dated Oct. 24, 2016.
CN-201380026047.9 Chinese 1st Office Action of the State Intellectual Property Office of P.R. dated Dec. 18, 2015.
CN-201380026050.0 Chinese 2nd Office Action of the State Intellectual Property Office of P.R. dated Apr. 1, 2017.
CN-201380026058.7 Chinese 1st Office Action of the State Intellectual Property Office of P.R. China dated Nov. 2, 2016.
CN-201380026059.1 Chinese 2nd Office Action of the State Intellectual Property Office of P.R. dated Feb. 22, 2017.
CN-201380026059.1 Chinese 1st Office Action of the State Intellectual Property Office of P.R. dated Apr. 25, 2016.
CN-201380049451.8 Chinese Office Action of the State Intellectual Property Office of P.R. dated Apr. 5, 2016.
CN-201380063047.6 Chinese Office Action of the State Intellectual Property Office of P.R. China dated Oct. 9, 2016.
CN-201380063055.0 Chinese 1st Office Action of the State Intellectual Property Office of P.R. dated Jun. 23, 2016.
CN-201380073381.X Chinese Office Action of the State Intellectual Property Office of P.R. China dated Nov. 16, 2016.
Cootes et al., "Active Appearance Models", IEEE Trans. Pattern Analysis and Machine Intelligence, 23(6):681-685, 2001.
Cootes et al., "Active Shape Models—Their Training and Application" Computer Vision and Image Understanding 61(1):38-59 Jan. 1995.
Dalal et al., "Histogram of Oriented Gradients for Human Detection", Computer Vision and Pattern Recognition, pp. 886-893, 2005.
Drucker et al., "Support Vector Regression Machines", Advances in Neural Information Processing Systems 9, pp. 155-161, NIPS 1996.
EP-11842021.5 Office Action dated Oct. 2, 2015.
EP-11842021.5 Office Action dated Sep. 2, 2016.
EP-13758536.0 European Extended Search Report of European Patent Office dated Feb. 4, 2016.
EP-13790013.0 European Extended Search Report of European Patent Office dated Jan. 26, 2016.
EP-13790141.9 European Extended Search Report of European Patent Office dated Feb. 11, 2016.
EP-13790195.5 European Extended Search Report of European Patent Office dated Mar. 2, 2016.
EP-13790775.4 European Extended Search Report of European Patent Office dated Oct. 9, 2015.
EP-13790775.4 Office Action dated Aug. 29, 2016.
EP-13790809.1 European Extended Search Report of European Patent Office dated Feb. 16, 2016.
EP-13790942.0 European Extended Search Report of European Patent Office dated May 23, 2016.
EP-13791332.3 European Extended Search Report of European Patent Office dated Feb. 1, 2016.
EP-13791437.0 European first office action dated Aug. 30, 2016.
EP-13822472.0 European Extended Search Report of European Patent Office dated Mar. 2, 2016.
EP-13843659.7 European Extended Search Report of European Patent Office dated May 10, 2016.
EP-13865893.5 European Extended Search Report of European Patent Office dated Oct. 6, 2016.
EP-14754859.8 European Extended Search Report of European Patent Office dated Oct. 14, 2016.
EP-14813739.1 European Extended Search Report of European Patent Office dated Jan. 25, 2017.
EP-14853532.1 European Extended Search Report of European Patent Office dated May 23, 2017.
Ho, "Random Decision Forests", Proceedings of the 3rd International Conference on Document Analysis and Recognition, Montreal, QC, pp. 278-282, Aug. 14-16, 1995.
Ian Sexton et al: "Stereoscopic and autostereoscopic display-systems",—IEEE Signal Processing Magazine, May 1, 1999 (May 1, 1999 ), pp. 85-99, XP055305471, Retrieved from the Internet: RL:http://ieeexplore.ieee.org/iel5/79/16655/00768575.pdf [retrieved on Sep. 26, 2016].
International Search Report and Written Opinion of the International Searching Authority dated Dec. 20, 2021 for Application No. PCT/US2021/050117.
JP-2013540083 Notice of reasons for rejection of Jun. 30, 2015.
JP-2015-512794 1st Office Action (translated) dated Feb. 14, 2017.
JP-2015-512809 1st Office Action dated Mar. 28, 2017.
JP-2015-512810 1st Office Action (translated) dated Feb. 7, 2017.
JP-2015-512879 1st Office Action (translated) dated Apr. 11, 2017.
JP-2015-512887 1st Office Action (translated) dated Feb. 7, 2017.
JP-2015-512896 1st Office Action (translated) dated May 9, 2017.
JP-2015-512901 1st Office Action dated Mar. 28, 2017.
Cheng et al., "Design and manufacturing AR head-mounted displays: A review and outlook", Light: Advanced Manufacturing (2021)2:24, Official journal of the JHL 2689-9620, pp. 1-20.
International search report and written opinion of international searching authority for co-pending PCT application No. PCT/US2013/041619 mailed Aug. 27, 2013.
Jeong et al., Holographically customized optical combiner for eye-box extended near-eye display, Opt. Express 27, 38006-38018 (2019) Dec. 23, 2019.
PCT/US2023/025706 International search report and written opinion of the international searching authority mailed Oct. 5, 2023.
PCT/US2023/025722 International search report and written opinion of the international searching authority mailed Oct. 6, 2023.
PCT/US2023/028359 International search report and written opinion of the international searching authority mailed Oct. 20, 2023.
PCT/US2023/029866 International search report and written opinion of the international searching authority mailed Nov. 27, 2023.
EP-23207269.4 European Extended Search Report of European Patent Office dated Dec. 22, 2023.
KR1020207030206 Notice of Preliminary Rejection dated Jan. 4, 2024.
PCT/US2023/081677 International search report and written opinion of the international searching authority mailed Mar. 15, 2024.
PCT/US2023/081692 International search report and written opinion of the international searching authority mailed Mar. 12, 2024.
3M™ ePrivacy Filter software professional version; http://www.cdw.com/shop/products/3M-ePrivacy-Filter-software-professional-version/3239412.aspx?cm_mmc=ShoppingFeeds-_-ChannelIntelligence-_-Software-_-3239412_3MT%20ePrivacy%20Filter%20software%20professional%20version_3MF-EPFPRO&cpncode=37-7582919&srccode=cii_10191459#PO; Copyright 2007-2016.
Robinson et al., U.S. Appl. No. 14/751,878 entitled "Directional privacy display" filed Jun. 26, 2015. The application is available to Examiner on the USPTO database and has not been filed herewith.
CN-201480023023.2 Office second action dated May 11, 2017.
EP-21870034.2 European Extended Search Report of European Patent Office dated Jul. 30, 2024.
PCT/US2024/032628 International search report and written opinion of the international searching authority mailed Sep. 20, 2024.
PCT/US2024/032630 International search report and written opinion of the international searching authority mailed Sep. 20, 2024.
PCT/US2024/032634 International search report and written opinion of the international searching authority mailed Sep. 19, 2024.

\* cited by examiner

VEHICLE EXTERNAL ILLUMINATION DEVICE

TECHNICAL FIELD

This disclosure generally relates to illumination from light modulation devices, and more specifically relates to optical stacks for providing narrow angle illumination for use in illumination systems including vehicle external lights that include headlights, reversing lights, fog lights, indicators and other vehicle lights.

BACKGROUND

Illumination systems for environmental lighting such as automobile headlights, architectural, commercial or domestic lighting may provide a narrow directional light output distribution, for example by means of focusing optics to provide spotlighting effects, or can achieve a wide directional light output distribution for example by means of diffusing optics.

Beam switching control for external vehicle headlights can achieve some control of the illuminated zone in front of the vehicle. For example, headlights that switch between dip beam and full beam profiles, reduce dazzle to oncoming vehicles while the road and kerb features remain illuminate. Adaptive Beam Control systems can produce increased control and definition of illumination zones. In one type of known adaptive beam control headlight light from a light source is deflected by an array of micromirrors into the aperture of a projection lens, which projects on to the road.

In another known directional illumination apparatus such as described in U.S. Pat. No. 8,985,810, herein incorporated by reference in its entirety, an array of micro-LEDs is aligned to an array of catadioptric optical elements. Light from each micro-LED is directed into a respective beam direction.

In known displays, a backlight is provided with an optical waveguide such that light from an array of LEDs is directed into the edge of a waveguide. Light escaping from the waveguide is directed towards a transmissive spatial light modulator with substantially uniform illumination. Embodiments of an imaging waveguide for a directional display backlight such as an autostereoscopic display or a privacy display are described in U.S. Pat. No. 9,519,153 and in U.S. Pat. No. 10,054,732, both of which are herein incorporated by reference in their entireties. Such embodiments of an imaging waveguide provide an image of an array of LEDs in front of the display. An observer placing an eye in the image of the LED (an optical window) sees a substantially uniform image across the whole of the spatial light modulator.

BRIEF SUMMARY

According to a first aspect of the present disclosure there is provided a directional illumination device for a vehicle external light, comprising: an array of light sources; and a waveguide comprising: an input surface; a reflective end; and first and second guide surfaces extending between the input surface and the reflective end, wherein the light sources of the array are arranged to input light into the waveguide through the input surface and are disposed at different input positions in a direction laterally across the waveguide; and the first and second, opposed guide surfaces are arranged to guide input light from the input surface to the reflective end and back along the waveguide after reflection at the reflective end, the waveguide being arranged to extract input light as it is guided back along the waveguide after reflection at the reflective end and to cause the extracted light to exit through the first guide surface; and the reflective end has positive optical power in the direction laterally across the waveguide and the waveguide is arranged to direct the extracted light in respective output illumination directions distributed in a lateral direction in dependence on the input positions of the light sources in the direction laterally across the waveguide. Advantageously an array of addressable light cones may be provided with high efficiency in a thin structure and at low cost.

The first guide surface 6 may be arranged to guide light by total internal reflection, and across a region of the waveguide, the second guide surface may comprise: at least one light extraction feature, arranged to extract input light by deflecting the input light as it is guided back along the waveguide after reflection at the reflective end in directions causing the deflected light exit through the first guide surface; and at least one guiding region to guide light along the waveguide without extraction. Advantageously light may be directed into illumination cones with high efficiency and high beam shape fidelity. A thin optical structure may be provided with low cost.

The at least one light extraction feature may comprise plural light extraction features, and the at least one guiding region may include one or more intermediate regions between the light extraction features. The second guide surface may comprise at least two light extraction features, and the at least one guiding region includes an intermediate region between each of the at least two light extraction features. Advantageously increased structure may be provided in output illumination profiles. Increased yield may be provided for replication of the waveguide, reducing cost.

The number of light extraction features may be 10 or less, or preferably 5 or less. Advantageously the fidelity of the shape of the light extraction features may be increased.

The second guide surface may be shaped as a series of steps, the light extraction features and the intermediate regions being surfaces of successive steps. The light extraction features may have a pitch measured in a direction parallel to the first surface between centres of the light extraction that is greater than 0.5 mm, preferably greater than 1 mm and more preferably greater than 2 mm. The pitch of the light extraction features parallel to the first surface may be greater than 0.5 mm, preferably greater than 1 mm and more preferably greater than 2 mm. Advantageously the fidelity of the shape of the light extraction features may be increased.

Across respective sub-regions of the region of the waveguide, the light extraction features may be configured differently. Advantageously desirable structure of light cones may be provided.

Across the respective sub-regions of the region of the waveguide, the light extraction features may extend in different directions so that the output illumination directions into which light may be directed from the different regions are offset. Advantageously steps may be provided at desirable locations in the output light cone profile.

Across the respective sub-regions of the region of the waveguide, the light extraction features may have different profiles so that the output illumination directions into which light may be directed from the different regions have different intensity distributions along a length perpendicular to the lateral directions for respective waveguides, in which the output illumination directions are distributed. Advantageously desirable structure of output light cones may be provided.

The region of the waveguide may be the entirety of the waveguide. Advantageously high illuminance may be achieved.

The region of the waveguide may be a partial region, and across the remaining region of the waveguide, the second guide surface may be arranged to guide light by total internal reflection and may be inclined at an angle with respect to the first guide surface that may be selected so that the waveguide may be arranged to extract input light as it is guided back along the waveguide after reflection at the reflective end by breaking total internal reflection, and the directional illumination device may further comprise a deflection element extending across the first guide surface of the remainder of the waveguide for deflecting light towards the normal to the first guide surface. Advantageously an output illuminance profile may be provided with a narrow angular size in a direction orthogonal to the lateral direction. A high illuminance region may be provided in the illuminated scene.

The waveguide may be non-planar; and the plural light extraction features may be curved to achieve a common output illumination direction across at least part of the waveguide. The facets of the waveguide may be curved to achieve a common output illumination direction across at least part of the waveguide. Advantageously the waveguide may be curved to match the shape of a vehicle. Occupied volume of the illumination device may be reduced.

At least one light extraction feature may have a reflective surface. Advantageously optical efficiency of output may be increased.

The height of the at least one light extraction feature in a direction orthogonal to the first surface may be greater than 0.25 mm, preferably greater than 0.5 mm and more preferably greater than 1 mm. Advantageously the fidelity of the shape of the light extraction features may be increased.

The directional illumination device may further comprise at least one elongate lens element arranged in front of the first guide surface, the elongate lens element axis being aligned with a light extraction feature and arranged to control the distribution of the extracted light in a direction orthogonal to the lateral direction. Advantageously output luminous intensity may be increased. Power consumption for a desirable luminous intensity may be reduced.

The at least one light extraction feature may comprise plural light extraction features and the at least one elongate lens element may comprise plural elongate lens elements arranged in front of the first guide surface, each elongate lens element being aligned with a respective light extraction feature. Advantageously thickness may be reduced.

The plural elongate lens elements may have the same optical power and may be separated from the respective light extraction feature with which they are aligned by the same distance. Advantageously cost and complexity may be reduced.

The plural elongate lens elements may have optical powers that increase with increasing distance from the reflective end, such that the distribution of the extracted light from each light extraction feature in a direction orthogonal to the lateral direction is uniform for the extracted light from each light extraction feature. Advantageously weight and thickness may be reduced. Efficiency may be increased.

The plural elongate lens elements may be provided in a common component extending across the first guide surface. Advantageously cost and complexity of assembly may be reduced.

The plural elongate lens elements may be separate components. Advantageously tooling costs and complexity may be reduced.

The plural elongate lens elements may have sides extending away from first light guiding surface of the waveguide. The sides may comprise light absorbing material. Advantageously the cone angle and stray light in the direction orthogonal to the lateral direction may be reduced.

The at least one elongate lens element may be arranged in front of the first guide surface with an air gap therebetween. Advantageously efficiency is increased.

The at least one light extraction feature may comprise plural light extraction features, at least one of the light extraction features having no elongate lens element aligned therewith. Advantageously desirable profiles of illumination may be provided in the direction orthogonal to the lateral direction.

The directional illumination device may further comprise a reflective element extending across the first guide surface that may be arranged to reflect the extracted light back through the waveguide so that it is output in an output direction that is forwards of the second guide surface. The reflective element may provide at least one elongate mirror element arranged in front of the first guide surface, the elongate mirror element being aligned with a light extraction feature and arranged to control the distribution of the extracted light in a direction orthogonal to the lateral direction. Advantageously thickness and cost may be reduced. Chromaticity of output illuminance may be reduced.

The first guide surface may be arranged to guide light by total internal reflection, and across a region of the waveguide, the second guide surface may comprise light extraction features and intermediate regions between the light extraction features, the light extraction features being arranged to extract input light by deflecting the input light as it is guided back along the waveguide after reflection at the reflective end in directions causing the deflected light exit through the first guide surface, the intermediate regions being arranged to guide light along the waveguide without extraction. Advantageously high fidelity optical cones may be provided.

The second guide surface may be shaped as a series of steps, the light extraction features and the intermediate regions being surfaces of successive steps. Advantageously the second surface may be fabricated with low cost and high surface quality.

The light extraction features may have no optical power in a direction laterally across the waveguide. Advantageously the beam size in an illuminated scene may have reduced angular size and increased fidelity.

The first guide surface may be arranged to guide light by total internal reflection, and across a region of the waveguide, the second guide surface may be arranged to guide light by total internal reflection and may be inclined at an angle with respect to the first guide surface that is selected so that the waveguide may be arranged to extract input light as it is guided back along the waveguide after reflection at the reflective end by breaking total internal reflection, and the directional illumination device may further comprise a deflection element extending across the first guide surface of the region of the waveguide for deflecting light towards the normal to the first guide surface. Advantageously light output may be in a direction that is near to the surface normal of the waveguide.

The directional illumination device may be arranged to output the extracted light in an output direction that is forwards of the first guide surface. The directional illumination device may further comprise a reflective element extending across the first guide surface that is arranged to reflect the extracted light back through the waveguide so that it is output in an output direction that is forwards of the second guide surface.

The waveguide may further comprise sides extending between the opposed guide surfaces and between the input surface and the reflective end. Advantageously stray light may be reduced by control of light reflections at the sides.

Some of the light sources may be separated in the direction perpendicular to the direction laterally across the waveguide. The light sources may be contiguous in the direction laterally across waveguide. Advantageously the package size of the light sources may be increased. The uniformity of illuminance profile in the lateral direction may be increased.

The directional illumination device may further comprise a diffuser arranged across a partial region of the first guide surface. Advantageously the structure of an output illuminance profile may be modified.

The directional illumination device may further comprise a rear reflector disposed behind the second guide surface. Advantageously the efficiency of the illumination device may be increased.

The rear reflector may comprise an array of reflective facets arranged to reflect input light that is transmitted through the second guide surface back through the waveguide to exit through the first guide surface. Advantageously the structure of the output illuminance profile may be modified to achieve desirable illuminance profile in the direction orthogonal to the lateral direction.

The directional illumination device may comprise: plural arrays of light sources; and plural waveguides each comprising: an input surface; a reflective end; and first and second guide surfaces extending between the input surface and the reflective end, wherein in respect of each waveguide: the light sources of a respective array of light sources may be arranged to input light into the waveguide through the input surface and may be disposed at different input positions in a direction laterally across the waveguide; and the first and second, opposed guide surfaces may be arranged to guide input light from the input surface to the reflective end and back along the waveguide after reflection at the reflective end, the waveguide being arranged to extract input light as it is guided back along the waveguide and to cause the extracted light to exit through the first guide surface; and the reflective end may have positive optical power in the direction laterally across the waveguide and the waveguide may be arranged to direct the extracted light in respective output illumination directions distributed in a lateral direction in dependence on the input positions of the light sources in the direction laterally across the waveguide, and wherein the first guide surface of each waveguide faces in a common direction. Advantageously increased luminance may be achieved. The structure of the illuminance profile may be modified. The output profiles of the respective waveguides may be independently controlled.

The plural waveguides may be oriented so that the lateral directions for respective waveguides, in which the output illumination directions are distributed, may be perpendicular or at an acute non-zero angle. Advantageously control of illuminance profiles may be achieved in more than one direction.

The plural waveguides may be oriented so that the lateral directions for respective waveguides, in which the output illumination directions are distributed, may be parallel. Advantageously increased control of illuminance profile may be achieved in the lateral direction.

The plural waveguides may be configured to provide output illumination directions having intensity distributions along a length perpendicular to the lateral directions for respective waveguides, in which the output illumination directions are distributed, that may be different for each waveguide. Advantageously the illuminance profile in the direction orthogonal to the lateral direction may be modified and may be independently controlled.

In respect of each waveguide: the first guide surface may be arranged to guide light by total internal reflection, and across a region of the waveguide, the second guide surface may comprise light extraction features and intermediate regions between the light extraction features, the light extraction features being arranged to extract input light by deflecting the input light as it is guided back along the waveguide after reflection at the reflective end in directions causing the deflected light to exit through the first guide surface, the intermediate regions being arranged to guide light along the waveguide without extraction. Advantageously the illuminance profile may provide a wide angular spread and may further provide first and second angular regions of high illuminance.

In respect of a first one of the waveguides: the first guide surface may be arranged to guide light by total internal reflection; and the second guide surface may comprise light extraction features and intermediate regions between the light extraction features, the light extraction features being arranged to extract input light by deflecting the input light as it is guided back along the waveguide after reflection at the reflective end in directions causing the deflected light to exit through the first guide surface, the intermediate regions being arranged to guide light along the waveguide without extraction, and in respect of a first one of the waveguides: the first guide surface may be arranged to guide light by total internal reflection, and the second guide surface may be arranged to guide light by total internal reflection and may be inclined at an angle with respect to the first guide surface that may be selected so that the waveguide may be arranged to extract input light as it is guided back along the waveguide after reflection at the reflective end by breaking total internal reflection, and the directional illumination device may further comprise a deflection element extending across the first guide surface of the region of the waveguide for deflecting light towards the normal to the first guide surface. Advantageously the output illuminance profile may comprise a wide angular spread profile and a narrow angular spread profile.

In respect of each waveguide: the first guide surface may be arranged to guide light by total internal reflection, and the second guide surface may be arranged to guide light by total internal reflection and may be inclined at an angle with respect to the first guide surface that may be selected so that the waveguide may be arranged to extract input light as it is guided back along the waveguide after reflection at the reflective end by breaking total internal reflection, and the directional illumination device may further comprise a deflection element extending across the first guide surface of the region of the waveguide for deflecting light towards the normal to the first guide surface. Advantageously the output illuminance profile may comprise more than one narrow angular spread profile to provide higher illuminance in desirable directions.

The plural waveguides may be tiled. Advantageously increased control of illuminance profiles may be achieved with high efficiency in a thin form factor.

The plural waveguides may be stacked. Advantageously the area occupied by the illumination device may be reduced.

The directional illumination device may further comprise a control system arranged to selectively control the light sources. Advantageously the output illuminance profiles may be controlled.

Each light source of the array of light sources may comprises an optical output that comprises a white light spectrum, an infra-red light spectrum or an ultraviolet light spectrum. At least some of the light sources comprise light emitting diodes or laser diodes. Advantageously controlled illumination may be provided to reduce glare to eyes of other road users or detectors including cameras and other sensors.

The array of light sources may comprise at least two light sources with different spectral outputs. The two different spectral outputs comprise two of: a first white light spectrum, a second white light spectrum different from the first white light spectrum, red light, orange light, and infra-red light. Advantageously the illuminance device may provide modulated colour output.

According to a second aspect of the present disclosure there is provided a vehicle external light comprising: a housing for fitting to a vehicle, and an illumination device according to any one of the preceding claims mounted on the housing; and a transmissive cover extending across the waveguide. Advantageously a robust external light may be provided.

The output luminous flux may be at least 100 lumens, preferably at least 300 lumens and most preferably at least 600 lumens. Advantageously a desirable illuminance may be achieved for illumination from the vehicle light.

According to a third aspect of the present disclosure there is provided a vehicle reversing light comprising a vehicle external light of the second aspect. Advantageously the visibility of obstacles to the rear of a vehicle may be increased.

According to a fourth aspect of the present disclosure there is provided a rearwards facing light comprising the vehicle external light according to the second aspect wherein the light sources provide red light. Advantageously brake lights and high intensity fog lights may be directed in desirable directions.

According to a fifth aspect of the present disclosure there is provided an illumination device for a vehicle, comprising: an array of light sources; and a waveguide comprising: an input surface; a reflective end; and first and second guide surfaces extending between the input surface and the reflective end, wherein the light sources of the array are arranged to input light into the waveguide through the input surface and are disposed at different input positions in a direction laterally across the waveguide; and the first and second, opposed guide surfaces are arranged to guide input light from the input surface to the reflective end and back along the waveguide after reflection at the reflective end, the waveguide being arranged to extract input light as it is guided back along the waveguide after reflection at the reflective end and to cause the extracted light to exit through the first guide surface, and the reflective end has positive optical power in the direction laterally across the waveguide and the waveguide is arranged to direct the extracted light in respective output illumination directions distributed in a lateral direction in dependence on the input positions of the light sources in the direction laterally across the waveguide.

Any of the aspects of the present disclosure may be applied in any combination.

Embodiments of the present disclosure may be used in a variety of optical systems. The embodiments may include or work with a variety of projectors, projection systems, optical components, displays, microdisplays, computer systems, processors, self-contained projector systems, visual and/or audiovisual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which.

DETAILED DESCRIPTION

Figure 1:
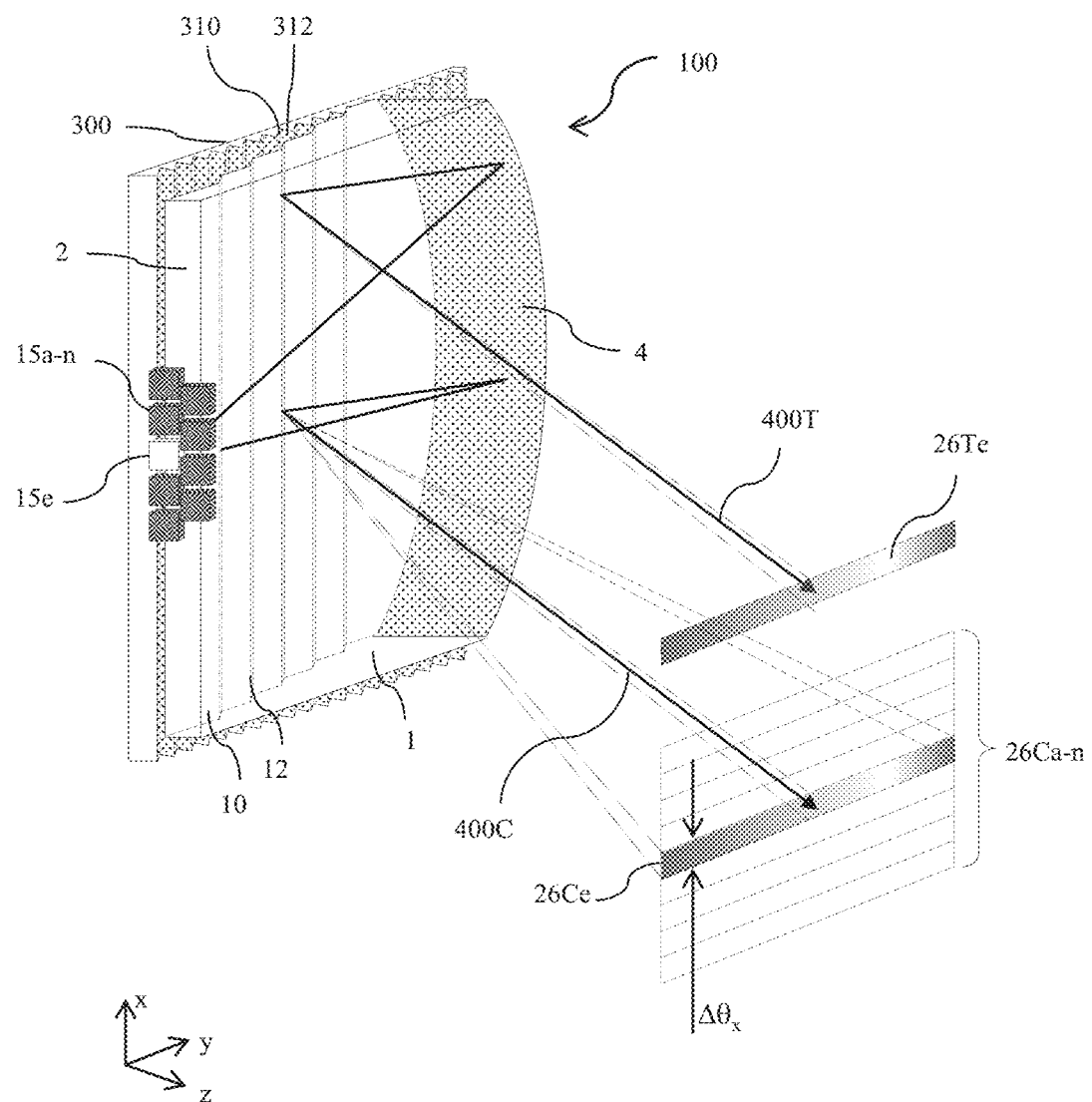
FIG. 1 is a schematic diagram illustrating in front perspective view a directional illumination device comprising a stepped waveguide with curved reflective surface and a facetted rear reflector.

The structure and operation of various directional illumination devices will now be described. In this description, common elements have common reference numerals. It is noted that the disclosure relating to any element applies to each device in which the same or corresponding element is provided. Accordingly, for brevity such disclosure is not repeated.

It would be desirable to provide an illumination apparatus for a vehicle with adjustable illumination profile by means of electronic control.

FIG. 1 is a schematic diagram illustrating in front perspective view a directional illumination device 100 comprising a stepped waveguide 1 with curved reflective surface 4 and a facetted rear reflector 300.

The directional illumination device 100 comprises an array of light sources 15a-n; and a waveguide 1 comprising: an input surface 2; a reflective end 4; and first and second guide surfaces 6, 8 extending between the input surface 2 and the reflective end 4, wherein the light sources 15a-n of the array are arranged to input light into the waveguide 1 through the input surface 2 and are disposed at different input positions in a direction laterally across the waveguide 1.

The first and second, opposed guide surfaces 6, 8 of the waveguide 1 are arranged to guide input light from light sources 15a-n at the input surface 2 to the reflective end 4 and back along the waveguide 1 after reflection at the reflective end 4.

The waveguide 1 is arranged to extract input light as it is guided back along the waveguide 1 after reflection at the reflective end 4 and to cause the extracted light to exit through the first guide surface 6.

The reflective end 4 has positive optical power in the direction laterally across the waveguide 1 and the waveguide 1 is arranged to direct the extracted light in respective output illumination directions 26a-n distributed in a lateral direction in dependence on the input positions of the light sources 15a-n in the direction laterally across the waveguide 1.

The waveguide 1 further comprises sides 20, 22 extending between the opposed guide surfaces 6, 8 and between the input surface 2 and the reflective end 4.

The directional illumination device 100 further comprises a rear reflector 300 disposed behind the second guide surface 8.

The directional illumination device 100 is arranged to output the extracted light in an output direction that is forwards of the first guide surface 6.

Figure 2A:
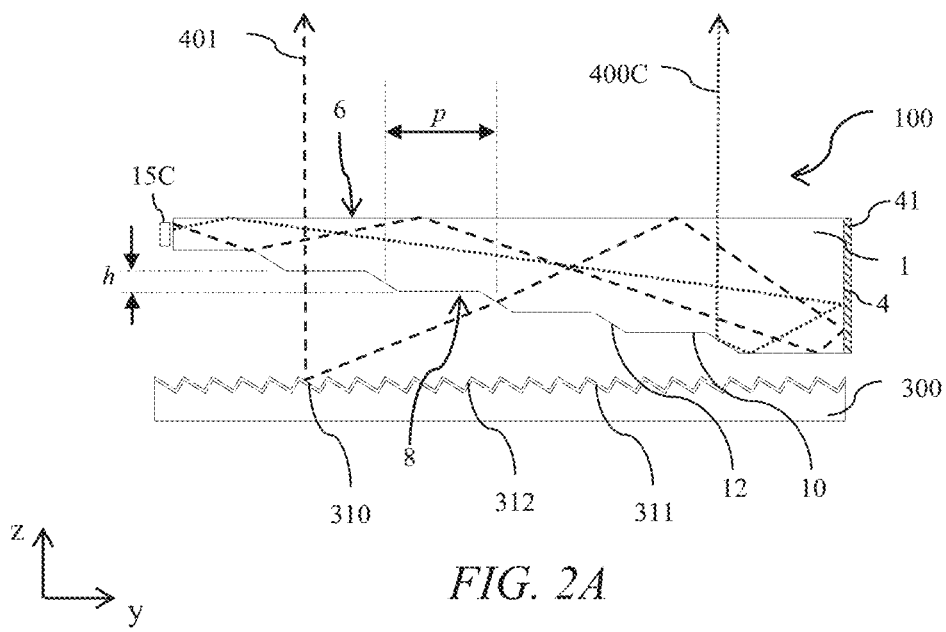
FIG. 2A is a schematic diagram illustrating in side view the directional illumination device of FIG. 1.
Figure 2B:
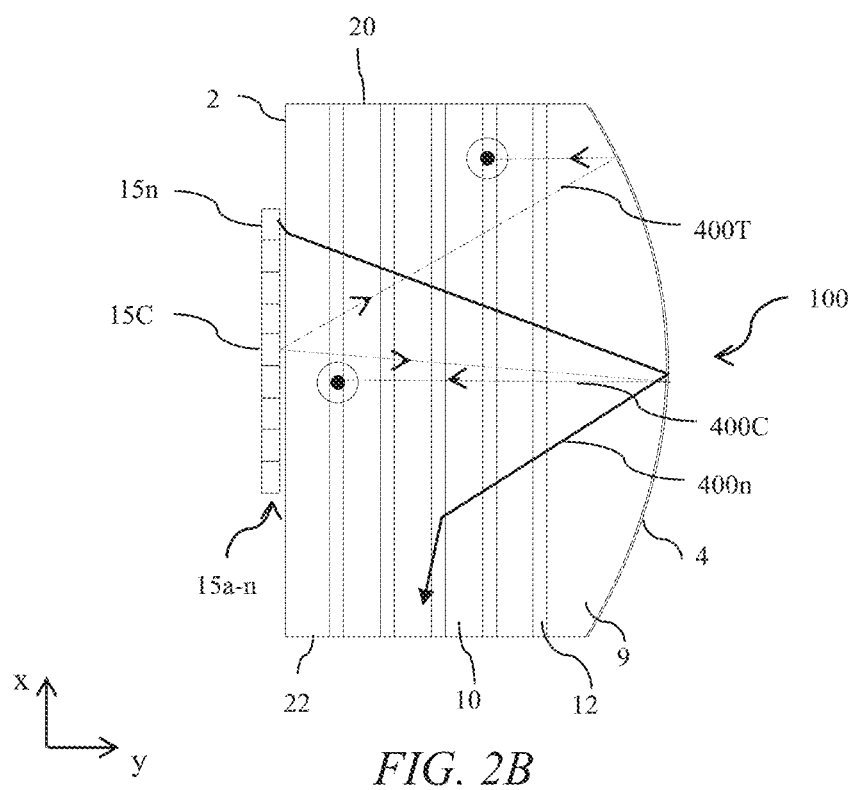
FIG. 2B is a schematic diagram illustrating in front view the directional illumination device of FIG. 1.

FIG. 2A is a schematic diagram illustrating in side view the directional illumination device 100 of FIG. 1; and FIG. 2B is a schematic diagram illustrating in front view the directional illumination device 100 of FIG. 1. Features of the embodiment of FIGS. 2A-B not discussed in further detail may be assumed to correspond to the features with equivalent reference numerals as discussed above, including any potential variations in the features.

As illustrated in FIG. 2A, the first guide surface 6 is arranged to guide light by total internal reflection, and across a region of the waveguide 1, the second guide surface 8 comprises light extraction features 12 and intermediate regions 10 between the light extraction features 12. In other words the at least one light extraction feature 12 comprises plural light extraction features 12, and the at least one guiding region 10 includes one or more intermediate regions between the light extraction features 12.

The light extraction features 12 are arranged to extract input light by deflecting the input light as it is guided back along the waveguide 1 after reflection at the reflective end 4 in directions causing the deflected light to exit through the first guide surface 6, the intermediate regions 10 being arranged to guide light along the waveguide 1 without extraction. The second guide surface 8 is shaped as a series of steps, the light extraction features 12 and the intermediate regions 10 being surfaces of successive steps. Guiding region 9A is arranged between the reflective end 4 and the first step 12 of the array of steps and guiding region 9B is arranged between the input end 2 and the last step 12, guiding regions 9A, 9B being arranged to guide light along the waveguide 1 without loss.

The directional illumination device 100 is arranged to output the extracted light in an output direction that is forwards of the first guide surface 6.

Considering light ray 400C from light source 15C, total internal reflection at the feature 12 provides output light ray 400C through the first surface 6.

In the plane that has a surface normal direction in the lateral direction (y-z plane in FIG. 2A), light extraction features 12 may have substantially planar surfaces, may be curved or may comprise regions of curvature and regions of planar. The curvature of the feature 12 profile shape is different to curvature of the light extraction features 12 in the direction in which the light extraction features 12 are extended (i.e. curvature in the x-y plane).

Considering light rays 400n from light source 15n, light is directed into off-axis cone 26n, that is off-axis with respect to the cone 26C.

Waveguide 1 may be provided by a transparent material such as PMMA, PC, COP, glass or other known suitable materials. Advantageously high transmission efficiency may be achieved over a wide spectral range and operating range of temperature and humidity.

Reflective end 4 may be provided by a shaped surface with optical power and a reflective layer 41 that may be a layer of a reflective material such as aluminium, silver that may be applied by a coating method or may be an adhered reflective material such as ESR™ from 3M corporation.

In an illustrative embodiment a waveguide 1 may have a length in the lateral direction (x-axis) of 100 mm and a height in the direction orthogonal to the lateral direction (y-axis) of 56 mm. The input side 2 may have a thickness in the direction orthogonal to the first surface 6 of 1 mm and the reflective side 4 may have a thickness of 5 mm. Ten light extraction features 12 may be arranged across the second surface 8, each with a step height h in the direction orthogonal to the first surface 6 of 400 microns and a pitch p of 5 mm. The width of the features 10 is approximately 4.6 mm. Advantageously such step sizes may achieve low level of scatter.

In general in the present embodiments, the design of the waveguide 1 and in particular the light extraction features 12 may differ from the imaging waveguide of known displays such as 3D displays and privacy displays using the imaging waveguide to illuminate a transmissive spatial light modulator because there is no requirement to provide uniform illumination across surface of waveguide 1. Advantageously reduced complexity of manufacture, desirable output illumination profiles and reduced stray light may be achieved, for example by incorporating any or all of the following features.

The light extraction features have a pitch p measured in a direction parallel to the first surface 6 between centres of the light extraction features that is greater than 0.5 mm, preferably greater than 1 mm and more preferably greater than 2 mm. In other words the pitch p of the light extraction features 12 in a direction parallel to the first surface 6 (or the direction of the optical axis (z-axis)) may be greater than in such known displays, because it is not necessary to avoid visibility of the illuminated stripes that are provided by light output from the light extraction features 12 and non-illuminated stripes that are provided by no light output from the intermediate features 10. Further it is not necessary to provide reduction of Moiré with the pixels of the spatial light modulator. Further it is not necessary to provide substantially equal illumination across the active area of a spatial light modulator, that is it is not necessary to provide the same output illuminance and illuminance profile from each light extraction feature. For example, such a pitch p of the light extraction features may be greater than 0.5 mm, preferably greater than 1 mm and more preferably greater than 2 mm.

Figure 2C:
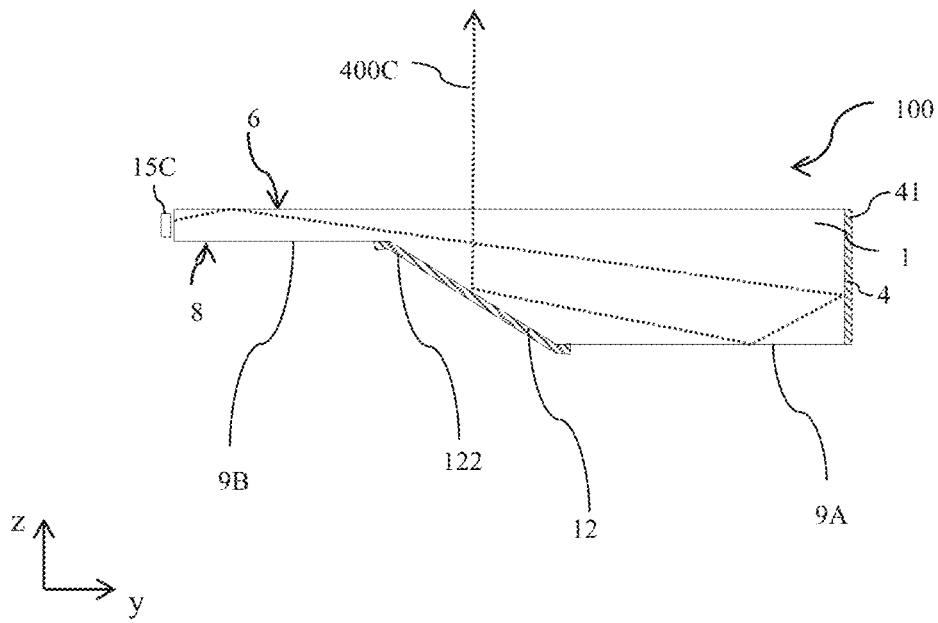
FIG. 2C is a schematic diagram illustrating in side view, an alternative waveguide for a directional illumination device.

The number of light extraction features 12 may be less than in such known displays. For example, number of light extraction features 12 may be 10 or less, may be 5 or less, or may even in some examples be a single light extraction feature 12 as illustrated in FIG. 2C hereinbelow.

The height h of the light extraction features 12 in a direction orthogonal to the first surface 6 (or the orthogonal to the optical axis and the lateral direction (z-axis)) may be greater than in such known displays. For example, such a height h of the light extraction features 12 may be greater than 0.25 mm, preferably greater than 0.5 mm and more preferably greater than 1 mm.

The rear reflector 300 comprises an array of reflective facets 310 arranged to reflect input light that is transmitted through the second guide surface 8 back through the waveguide 1 to exit through the first guide surface 6. Further facets 312 are arranged between respective adjacent facets 310. The reflective surface of the facets 310, 312 may be formed by a moulded optical structure and a reflective coating 311 such as aluminium or silver.

The formation of the output illumination profile will now be described. Returning to FIG. 1, the light source 15e provides light ray 400C that is guided without loss along the waveguide 1 by means of surface 8 and intermediate regions 10 towards the centre (in the lateral direction) of the reflective end 4. The reflected light is reflected at feature 12 and directed towards the output of the device 100 through the first surface 6 of the waveguide 1.

Optical cone 26Ce around the light ray 400C has an angular size AON in the direction orthogonal to the lateral direction (that is the y-axis) that is determined by the size of the light source 15e, the refractive index of the waveguide 1 and the focal length of the reflective end 4.

Optical cone 26Ce has a profile in the lateral direction with an angular size that is determined by the profile of the light extraction features 12 of the waveguide 1 and facets 310 of the rear reflector 300 as will be described further hereinbelow.

Light ray 401 is guided within the waveguide 1 and refracted by the feature 12 such that the light falls on to the facet 310 of the rear reflector and directed towards the output of the device 100 through the first and second surfaces 6, 8 of the waveguide 1. The angular profile of illumination in the z-y plane is an addition of the angular profile for light rays 400, 401 and will be further described hereinbelow.

In the present embodiments light is output from at least one region of the waveguide 1. The angular profile may be common for light output from within each region. In the arrangement of FIG. 1, the region of the waveguide 1 is the entirety of the waveguide 1 and the illumination device 100 has a common light output angular profile across the waveguide 1. Advantageously high output efficiency and high brightness may be achieved.

As illustrated in FIG. 2B the light extraction features 12 are straight and have no optical power in a direction laterally across the waveguide 1. Considering light ray 400T, that is near the top edge of the waveguide 1, the reflective end 4 provides light ray within the waveguide 1 that is parallel to the ray 400C after reflection from the reflective end 4. The light ray 400T is parallel to the light ray 400C on output from the waveguide 1. Thus optical cone 26Te has substantially the same angular profile as cone 26Ce but is offset in the lateral direction by a distance that is the same as the offset of the reflected rays 400C, 400T within the waveguide 1 after reflection from the reflective end 4.

In the far field, such as in an illuminated scene as will be described further hereinbelow, the total output cone from across the waveguide 1 has a size that is determined by the height of the waveguide 1 and the angular spread of the individual optical cones 26a-n. The height of the waveguide 1 is typically much smaller than the angular spread $\Delta\theta_x$. Advantageously a narrow cone angle may be provided by each light source of the array 15a-n.

In the present embodiments it is desirable to provide structured illumination profiles in the far field, however there is no requirement to provide uniform illumination across surface of waveguide 1.

The present embodiments refer to a backlight for a headlight comprising an illumination system to provide controllable light cones with desirable angular profiles of illuminance in the far field. By way of comparison with the present embodiments, known displays such as 3D displays and privacy displays incorporate imaging waveguides to illuminate a transmissive spatial light modulator arranged between the imaging waveguide and observer. Such imaging waveguides for displays provide an image of individual light sources at an optical window at a window distance from the display. Such optical windows are typically positioned at or near a nominal observer viewing distance, such as 500 mm from the display. An observer located within an optical window sees a uniformly illuminated image across the area of the waveguide. Thus in a display application it is desirable to provide uniform illumination across the area of the waveguide, however there is no requirement to provide structured illumination profiles within the optical windows.

In the present embodiments it is undesirable to provide optical windows at a finite window distance as they would expand the size of the illumination profile in the far field, and blur the structured illumination profile. Thus the present embodiments comprising non-imaging waveguides are different in structure and operation to imaging waveguides for use in display applications.

By way of comparison with the illustrative embodiment above, the step sizes of an imaging waveguide for illumination of a spatial light modulator desirably have a pitch of 0.25 mm and a step height of approximately 0.5 microns to achieve desirable image uniformity across the spatial light modulator without visible Moiré beating with the pixels of the spatial light modulator. Such features undesirably are expensive to manufacture with high yield and suffer from diffractive scatter.

Alternative structures for the illumination device will now be described.

FIG. 2C is a schematic diagram illustrating in side view, an alternative stepped waveguide for a directional illumination device 100.

The directional illumination device 100 comprises one light extraction feature 12, arranged to extract input light by deflecting the input light 400C as it is guided back along the waveguide 1 after reflection at the reflective end 4 in directions causing the deflected light to exit through the first guide surface 6; and guiding regions 9A, 9B to guide light along the waveguide 1 without extraction.

By way of comparison with FIG. 2A, FIG. 2C comprises a single step with light extraction feature 12 with a reflective coating material 122 as will be described further below with reference to FIG. 10B. The coating material 122 may comprise a metallic coating such as silver or aluminium or may be an adhered multilayer reflective material such as ESR™ from 3M Corporation. The coating material 122 may be provided with some overlap of the guiding regions 9A, 9B, to reduce tolerancing for the coating process and minimise loss of guided light, advantageously increasing efficiency.

The rear reflector 300 is omitted, advantageously reducing cost and complexity. Such a structure may be conveniently fabricated with high precision of the step 12, increasing accuracy of illumination output cone 26. Light is not transmitted through the light extraction feature 12 so advantageously light loss to high output angles may be reduced.

Figure 2D:
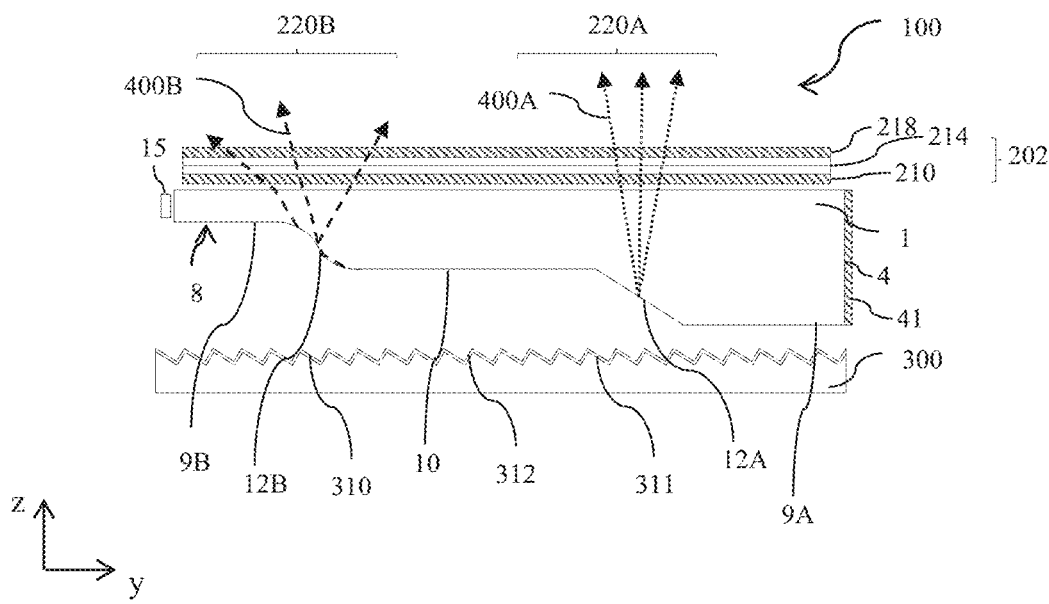
FIG. 2D is a schematic diagram illustrating in side view, an alternative waveguide for a directional illumination device.

FIG. 2D is a schematic diagram illustrating in side view, an alternative stepped waveguide for a directional illumination device 100. By way of comparison with FIG. 2A, FIG. 2D illustrates only two steps along the waveguide 1. Advantageously such a structure may be conveniently fabricated with desirable step shapes profiles that may be different. The output light cones 400A, 400B may have different angular profiles in the direction orthogonal to the lateral direction. Advantageously desirable structure of the output illumination profile may be achieved.

In the alternative embodiment of FIG. 2D, a further optional liquid crystal shutter 202 is also provided across at least one portion of the waveguide 1, comprising polarisers 210, 218 and liquid crystal layer 214. In operation, regions 220A, 220B may be operated to control the relative proportion of light that is transmitted from the light extraction features 12A, 12B respectively. The illuminance provided in respective output illuminance cones 26A, 26B may be controlled to advantageously achieve a modification of the output luminance profile in the direction orthogonal to the lateral direction.

In the embodiments of FIGS. 2C-D, the rear reflector may have a pitch.

Figure 3A:
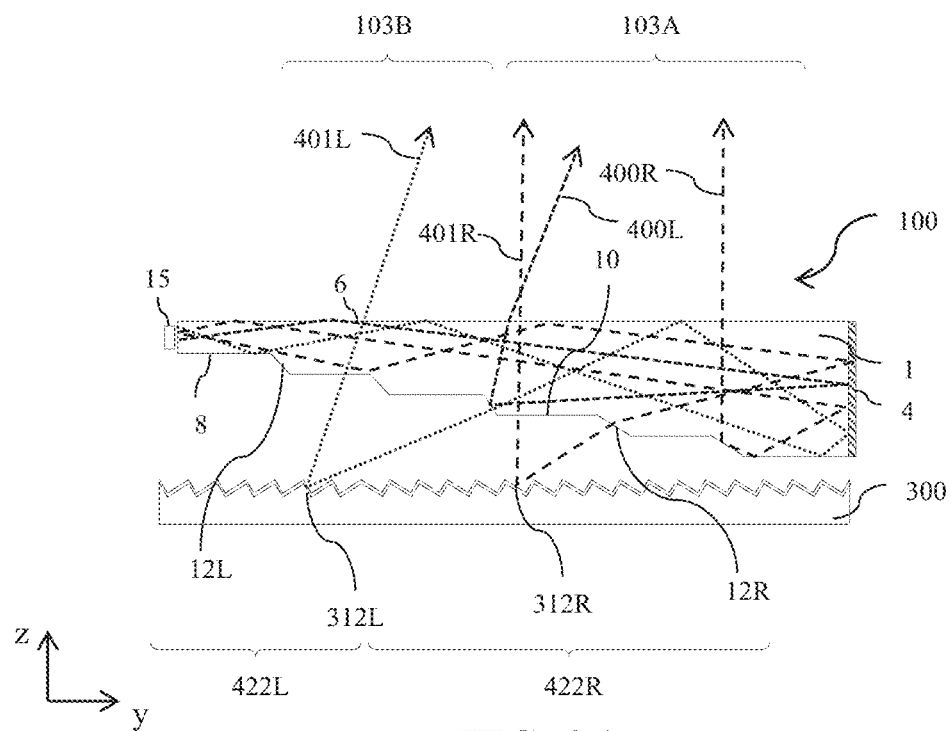
FIG. 3A is a schematic diagram illustrating in side view, an alternative directional illumination device.

FIG. 3A is a schematic diagram illustrating in side view, an alternative directional illumination device 100. Features of the embodiment of FIG. 3A not discussed in further detail may be assumed to correspond to the features with equivalent reference numerals as discussed above, including any potential variations in the features.

In comparison to the embodiment of FIG. 2A, the light extraction features 12 of the waveguide 1 have different orientations in different regions of the waveguide 1. In region 103A, features 12R have surface normal direction that is tilted from the plane in which the waveguide extends by a first angle. In region 103B, features 12L have surface normal direction that is tilted from the plane in which the waveguide extends by a second angle that is different to the first angle.

Further, the facets 312 of the rear reflector 300 have different orientations in different regions of the rear reflector 300. In region 422R, facets 312R have surface normal direction that is tilted from the plane in which the waveguide extends by a first angle. In region 422L, facets 312L have surface normal direction that is tilted from the plane in which the waveguide extends by a second angle that is different to the first angle.

In other words, across the respective regions 103A, 103B of the region of the waveguide 1, the light extraction features 12R, 12L have different profiles so that the output illumination directions into which light is directed from the different regions 103A, 103B have different intensity distributions along a length perpendicular to the lateral directions for respective waveguides 1A, 1B, in which the output illumination directions provided by cones 26 are distributed.

In operation illustrative light rays 400R, 401R are directed in a first direction from the first regions 103A, 422R and light rays 400L, 401L are directed in a second direction from the second regions 103B, 422L. As will be illustrated further hereinbelow desirable structural features can advantageously be provided in the output illumination profiles.

In further alternative embodiments, the profiles of the light extraction features 12 of the waveguide 1 may vary across the waveguide 1 and/or the profiles of the facets 312 of the rear reflector may vary across the rear reflector 300. Advantageously increased structure of output illumination profile may be achieved as will be described further hereinbelow.

Figure 3B:
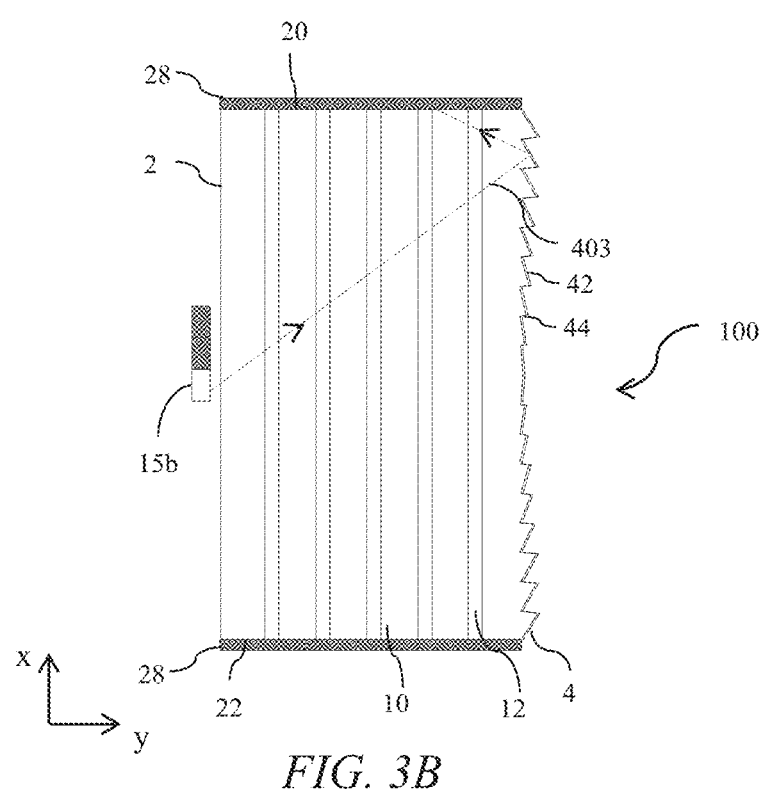
FIG. 3B is a schematic diagram illustrating in front view an alternative directional stepped waveguide with a Fresnel facetted reflective surface.

FIG. 3B is a schematic diagram illustrating in front view an alternative directional stepped waveguide 1 with a Fresnel facetted reflective surface 4. Features of the embodiment of FIG. 3B not discussed in further detail may be assumed to correspond to the features with equivalent reference numerals as discussed above, including any potential variations in the features.

In comparison to the embodiment of FIG. 2B, that has a curved reflective end, the reflective end 4 is provided by a Fresnel mirror comprising facets 42, 44. The sag of the reflective end 4 is reduced and advantageously size of the waveguide reduced. The facets 42, 44 of the Fresnel mirror may conveniently provide different control of the direction of reflected light across its width in comparison to curved surfaces. Aberrations may be reduced and advantageously improved control of output illumination profile may be achieved.

FIG. 3B further shows that light absorbing layer 28 may be provided on the sides 20, 22 and may further or alternatively be provided on the surfaces 6, 8 near to the sides 20, 22. Light rays 403 from off-axis light source 15b that are reflected by the reflective end 4 and directed towards the sides 20, 22 are absorbed by the layer 28. Light absorbing layer 28 may comprise for example an adhered tape such as a black tape or a coating such as black paint. Advantageously stray light may be reduced and fidelity of individual optical cones 26 increased.

Other arrangements of waveguide 1 will now be described.

Figure 3C:
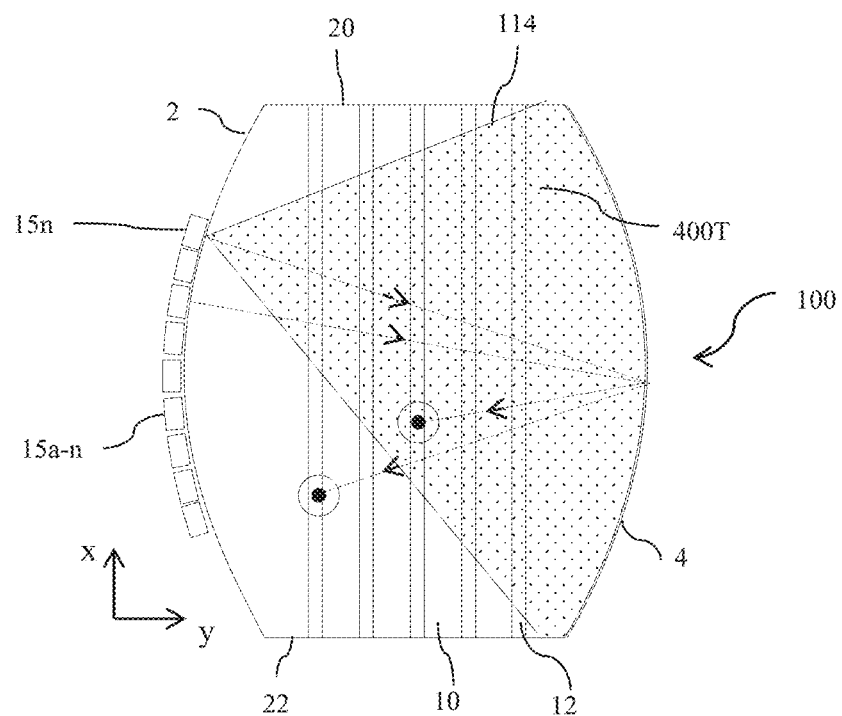
FIG. 3C is a schematic diagram illustrating in front view an alternative directional stepped waveguide with a curved input surface.

FIG. 3C is a schematic diagram illustrating in front view an alternative directional stepped waveguide 1 with a curved input side 2. Features of the embodiment of FIG. 3C not discussed in further detail may be assumed to correspond to the features with equivalent reference numerals as discussed above, including any potential variations in the features.

In comparison to the waveguide 1 of FIG. 2B, in the alternative embodiment of FIG. 3C, the input side 2 is curved with a concave shape.

Light cone 114 within the waveguide 1 is provided by the refraction of light from the substantially Lambertian output of the light source 15n, and for a smooth surface has a half angle substantially equal to the critical angle within the material of the waveguide 1.

The curvature of the input side 2 may have a centre of curvature that is at or near to the centre of the reflective end 4. In operation light that is output normal from each of the light sources 15a-n is directed towards the centre of the reflective end 4. Advantageously increased efficiency of output and reduced stray light is achieved.

It may be desirable to minimise blurring between light cones 26a-n across the respective fan of cones.

Figure 3D:
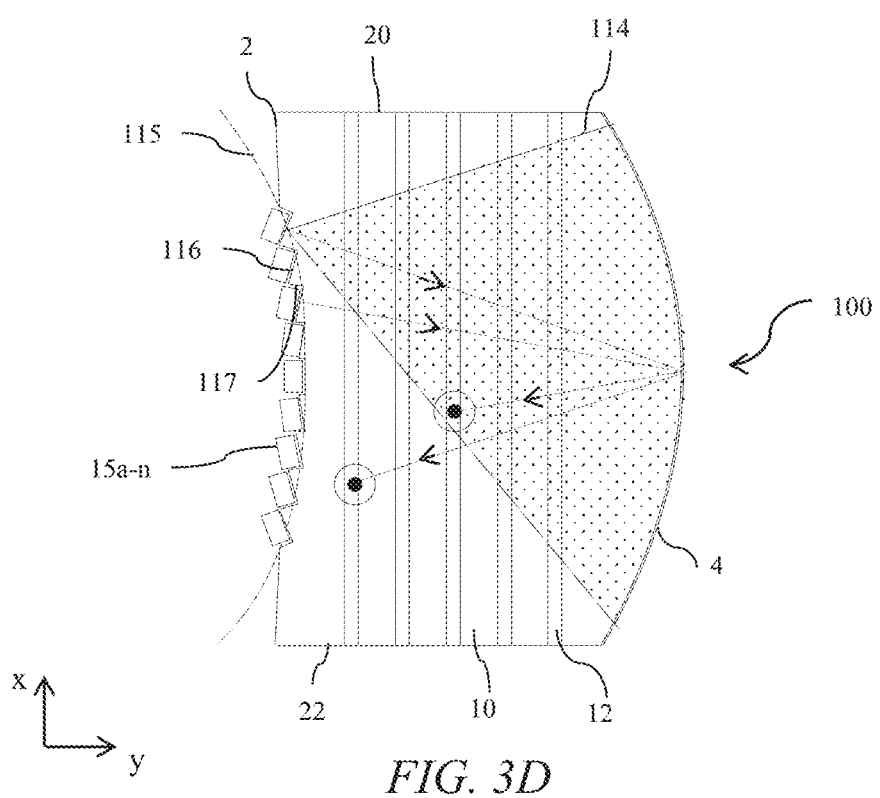
FIG. 3D is a schematic diagram illustrating in front view an alternative directional stepped waveguide with a stepped input surface.

FIG. 3D is a schematic diagram illustrating in front view an alternative directional stepped waveguide 1 with a stepped input surface 2. Features of the embodiment of FIG. 3D not discussed in further detail may be assumed to correspond to the features with equivalent reference numerals as discussed above, including any potential variations in the features.

In comparison to the arrangement of FIG. 3C, the input side 2 is curved with a convex shape, illustrated by locus 115. Further the input side 2 is stepped such that light that is output normal from each of the light sources 15a-n is directed towards the centre of the reflective end 4. Advantageously increased efficiency of output and reduced stray light is achieved.

In operation, the reflective end 4 may have aberrations such that the focal length varies with off-axis source 15 location. In the embodiments of FIG. 2B and FIG. 3B, aberrations of the curved surface of the reflective end 4 increase the line spread function width, such that in the optical cones 26, blurring between the cones 26 with off-axis location.

By way of comparison, in FIG. 3D, the increase in line spread function width with off-axis location may be reduced, achieving reducing blurring between off-axis cones 26. Advantageously increased definition of off-axis cones 26 may be achieved. In other embodiments, the locus 115 may be concave in comparison to the convex locus of FIG. 3D.

Arrangements of light sources 15 at the input side 2 of the waveguide 1 will now be described.

Figure 4A:
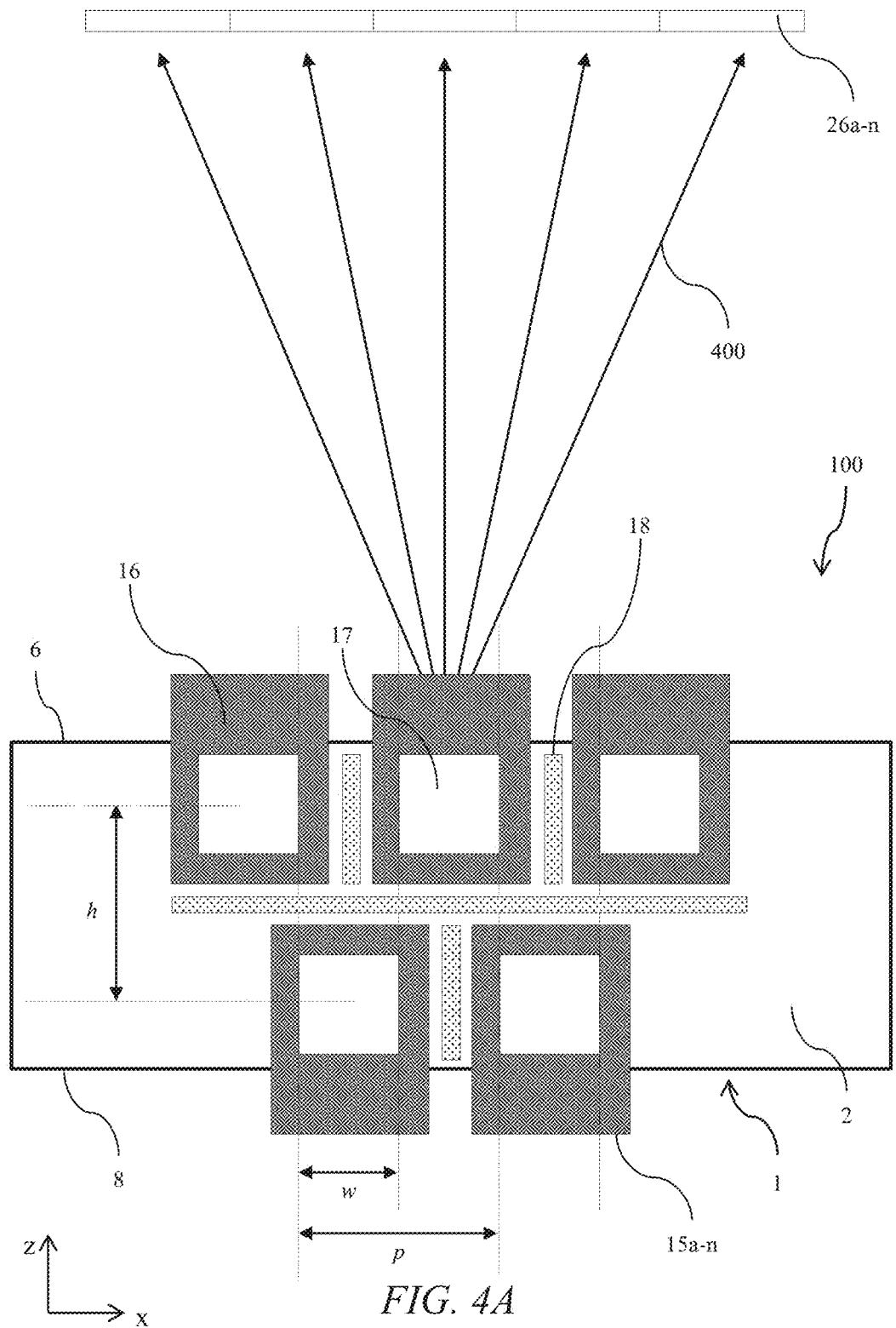
FIG. 4A is a schematic diagram illustrating in end view an arrangement of light sources and waveguide.

FIG. 4A is a schematic diagram illustrating in end view an arrangement of light sources 15 and waveguide 1. Features of the embodiment of FIG. 4A not discussed in further detail may be assumed to correspond to the features with equivalent reference numerals as discussed above, including any potential variations in the features.

The light sources 15a-n each comprise a package 16 and light emitting region 17 that may be a white light emitting region or may be some other colour, for example red for rear vehicle external lights. The colour of the light sources 15a-n may be the same across the array. Advantageously the output illumination profiles may have uniform colour.

In an alternative embodiment the colour of the light sources 15a-n may vary with lateral location across the input side 2. For example some light sources may have different colour temperatures or peak wavelengths, such that the angular profiles may vary in colour with angle. Advantageously different regions of the illuminated scene may be provided with different colours to increase visual differentiation of scenes.

Typically light source packages 16 arranged in a linear array have gaps between the emitting regions 17.

It would be desirable to provide a uniform illumination profile across adjacent cones 26. Such a uniform profile may be provided by providing at least some of the light sources 15 that are contiguous in the direction laterally across waveguide 1. At least some of the light sources 15 are separated by distance h in the direction perpendicular to the direction laterally across the waveguide 1 (x-axis). The light sources 15 are arranged in two rows and are offset so that the pitch p of the light sources 15 is twice the width w of the emitting regions. Advantageously the emitting regions 17 are contiguous in the direction laterally across waveguide 1 and optical cones 26a-n are provided with contiguous angular profiles.

Continuing the illustrative embodiment above, for a transparent material of the waveguide 1 of refractive index 1.5, the emitting region 17 of light sources 15 are arranged with a width w of 0.65 mm and pitch p of 1.3 mm to achieve a 1° width $\Delta\theta_x$ of angular cone 26 for each illuminated light source 15.

Further the packages 16 have non-emitting regions that may be larger than the thickness of the waveguide 1. Such non-emitting regions may be provided to extend away from the surfaces 6, 8. Advantageously desirable sized heat-sink and control components may be provided within the packages 16 while achieving contiguous angular profiles of cones 26.

In a further embodiment further light sources 18 may be arranged between the light sources 15a-n. In embodiments described hereinbelow some light sources 15 may not be illuminated for example to prevent dazzle to oncoming drivers or pedestrians. Such light sources 18 could be used to provide a warning to observers in the dazzle region that they have been seen, or could be used for emergency signalling purposes. Light sources 18 may have a different colour to light sources 15a-n, for example may be red, blue, magenta or a different white colour temperature. The additional light sources 18 may comprise different spectral outputs compared to the spectral output of the white light spectrum of the sources 15a-n that may be a second white light spectrum different from the first white light spectrum, red light, orange light, green light and/or infra-red light.

It may be desirable to increase the resolution of addressing of the illumination structure, that is increase the number of light cones 26a-n.

Figure 4B:
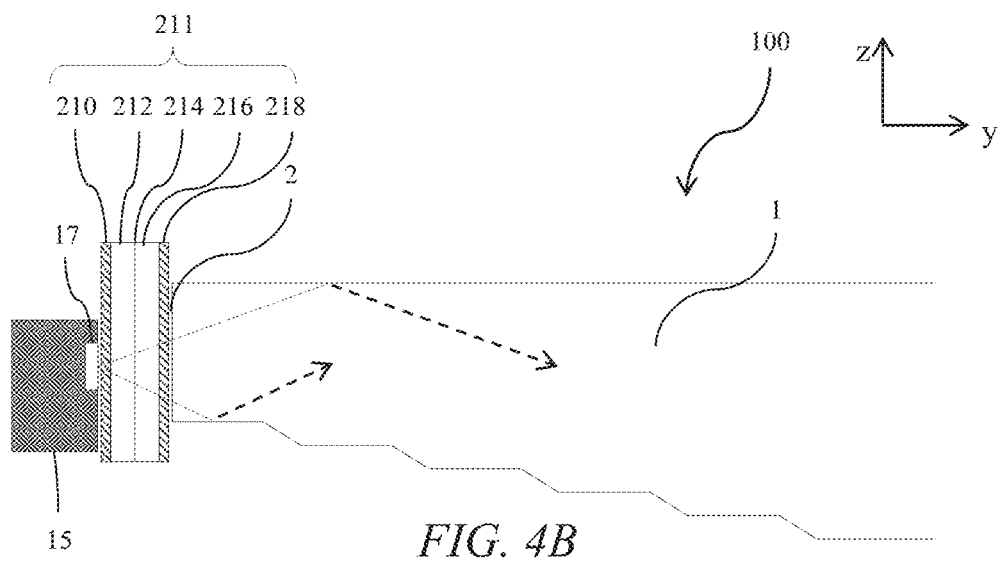
FIG. 4B is a schematic diagram illustrating in side view an arrangement of light sources, liquid crystal shutter and waveguide.
Figure 4C:
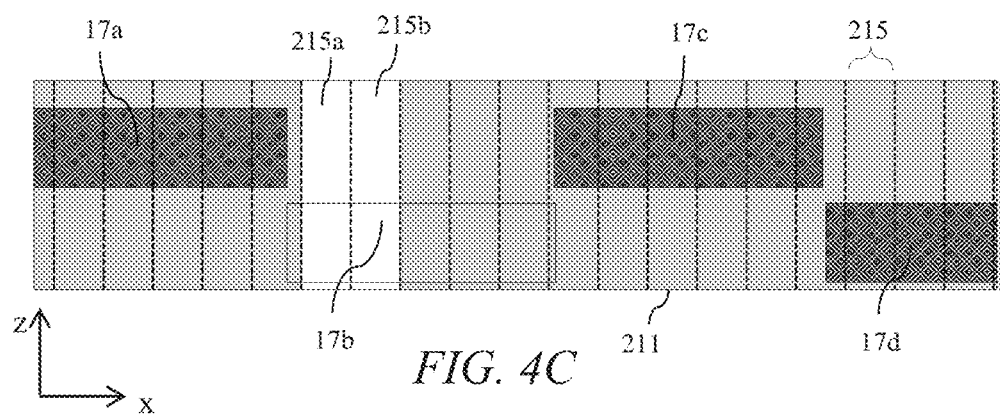
FIG. 4C is a schematic diagram illustrating in end view an arrangement of light sources and liquid crystal shutter.

FIG. 4B is a schematic diagram illustrating in side view an arrangement of light sources 15, liquid crystal shutter 211 and waveguide 1; and FIG. 4C is a schematic diagram illustrating in end view an arrangement of emitting apertures 17a-d of light sources 15a-d and liquid crystal shutter 17 comprising an array of addressable regions 215.

Liquid crystal shutter 211 comprises polarisers 210, 218 that have crossed directions of electric vector transmission, transparent support substrates 212, 216 and liquid crystal layer 214. The liquid crystal shutter further comprises an array of addressable regions 215 across the lateral direction that are provided by patterned transparent electrodes such as ITO formed next to the liquid crystal layer 214 and are controlled by an array of addressing electrodes to control the voltage across the liquid crystal layer 214.

In the illustrative embodiment of FIG. 4C, in operation light source 17b is illuminated and addressable regions 215a, 215b are driven in transmission state while other addressable regions of the array of addressable regions 215 are driven in light blocking state.

Increased angular resolution of light cones 26 output from the illumination device 100 may advantageously be achieved. Further increased smoothness of greyscale profiles may be provided with reduced diffusion, achieving increased efficiency.

It may be desirable to provide higher resolution cones 26 for some of the output angles as will be described further with respect to FIG. 12C hereinbelow.

Figure 4D:
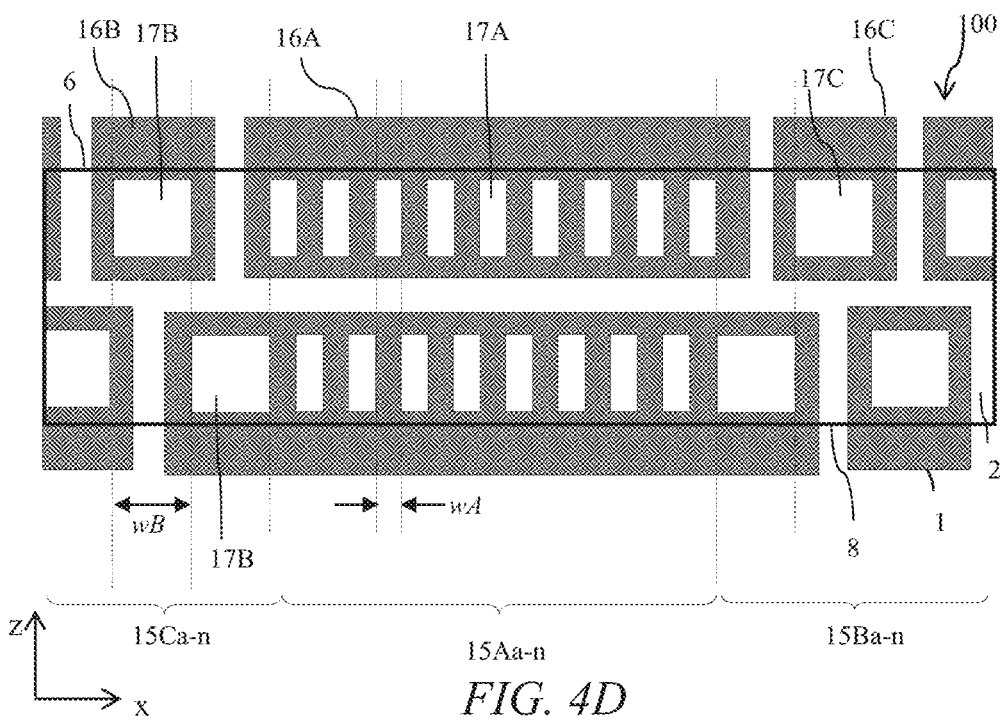
FIG. 4D is a schematic diagram illustrating in end view an arrangement of light sources with different lateral widths and the waveguide.

FIG. 4D is a schematic diagram illustrating in end view an arrangement of light sources 15 with different widths, aligned with the waveguide 1. Features of the embodiment of FIG. 4D not discussed in further detail may be assumed to correspond to the features with equivalent reference numerals as discussed above, including any potential variations in the features.

In comparison to the arrangement of FIG. 4A, the alternative embodiment of FIG. 4D comprises emitting regions 17 of the light sources 15 that are provided with different widths $w_A$ and $w_B$ in the lateral direction. The light sources 15Aa-n have a width $w_A$ of emitting region 17A that is smaller than the width $w_B$ of emitting region 17B, 17C of the light sources 15Ba-n and 15Ca-n that are arranged outside the light sources 15Aa-n in the lateral direction, that is the light sources 15Aa-n are arranged between the light sources 15Ba-n and 15Ca-n.

In the alternative embodiment of FIG. 4D, the packages 16A comprise emitting apertures 17A, 17B. Advantageously the light sources 17B provide light output that is contiguous in the lateral direction.

The light sources 15Aa-n may be provided at least in part by micro-LEDs, that is light emitting material such as gallium nitride with a chip size that is less than 300 micrometres, preferably less than 200 micrometres, and more preferably less than 100 micrometres. Advantageously light cones density 26Aa-n with high density in the lateral direction may be achieved as will be described further with respect to FIG. 12C hereinbelow.

The light sources 15Ba-n may be provided by larger chip sizes for example greater than 300 micrometres. Advantageously the cost and complexity of the light source packages 16 and control system may be reduced.

In other embodiments the height of the light emitting area 17 of the light sources 15a-n (in the direction orthogonal to the lateral direction) may vary across the input direction. Light sources 15 with high luminous flux output may be driven with reduced current. Advantageously output efficiency may be increased.

In other embodiments, the width in the lateral direction of the emitting regions 17 of the light sources 15a-n may be different across the input side 2 so that the pitch of optical cones 26 varies and the width Δθx varies of the optical cones 26 varies with angle.

The width of light sources 15 may be increased in regions of the input side where low resolution of addressability of optical cones 26 is acceptable. Advantageously cost and complexity may be reduced. The width of light sources 15 may be reduced in regions of the input side 2 where high resolution of addressability of optical cones 26 is desirable. Advantageously increased precision of beam directionality may be provided. The light sources 15a-n may be driven with different currents.

It may be desirable to increase the addressable resolution of the array of light sources 15a-n.

Figure 4E:
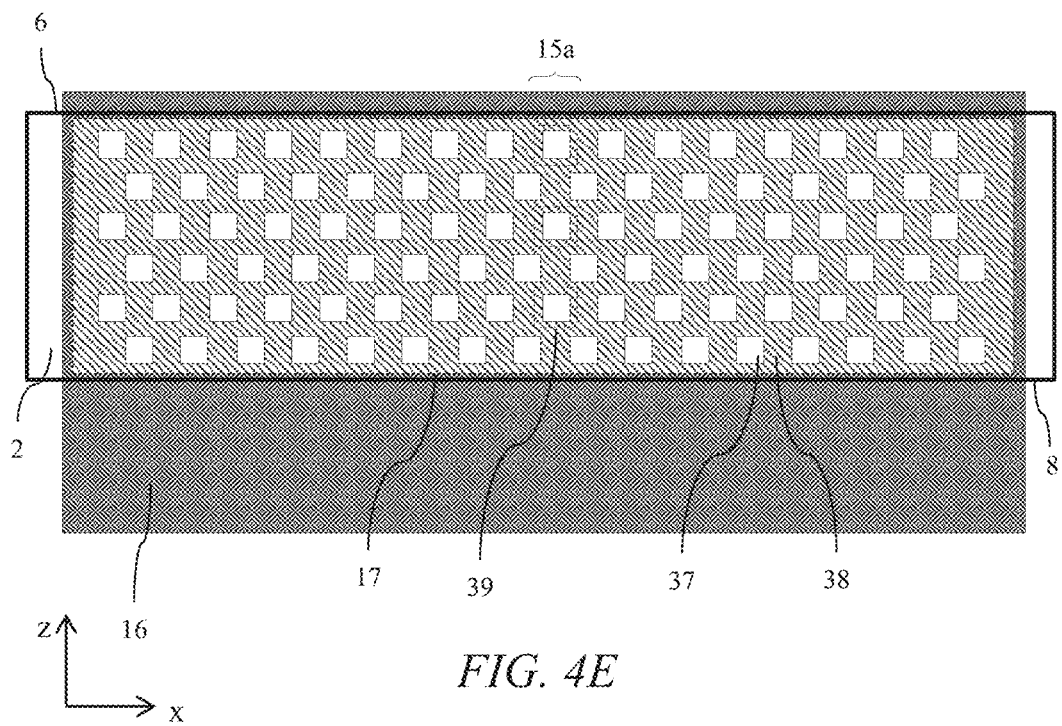
FIG. 4E is a schematic diagram illustrating in end view an arrangement of micro-LED light sources, a colour conversion material and the waveguide.

FIG. 4E is a schematic diagram illustrating in end view an arrangement of micro-LED light sources 15a-n and the waveguide 1. Features of the embodiment of FIG. 4E not discussed in further detail may be assumed to correspond to the features with equivalent reference numerals as discussed above, including any potential variations in the features.

A single package 16 is illustrated comprising emitting region 17 that comprises an array of micro-LEDs 37 and a colour conversion layer 38 arranged over and between the micro-LEDs. The micro-LEDs 37 may be arranged on a monolithic substrate or may be transferred to a separate substrate by mass transfer.

Light source 15a comprises a column of micro-LEDs and associated colour conversion material 38. An emitting region 39 is provided by respective micro-LED 37 and neighbouring colour conversion material 38.

In an alternative embodiment (not shown) the colour conversion material 38 may alternatively be provided in columns that is separated between adjacent light sources 15a-n to advantageously reduce leakage within the colour conversion material.

Advantageously increased resolution of addressability may be achieved.

Figure 4F:
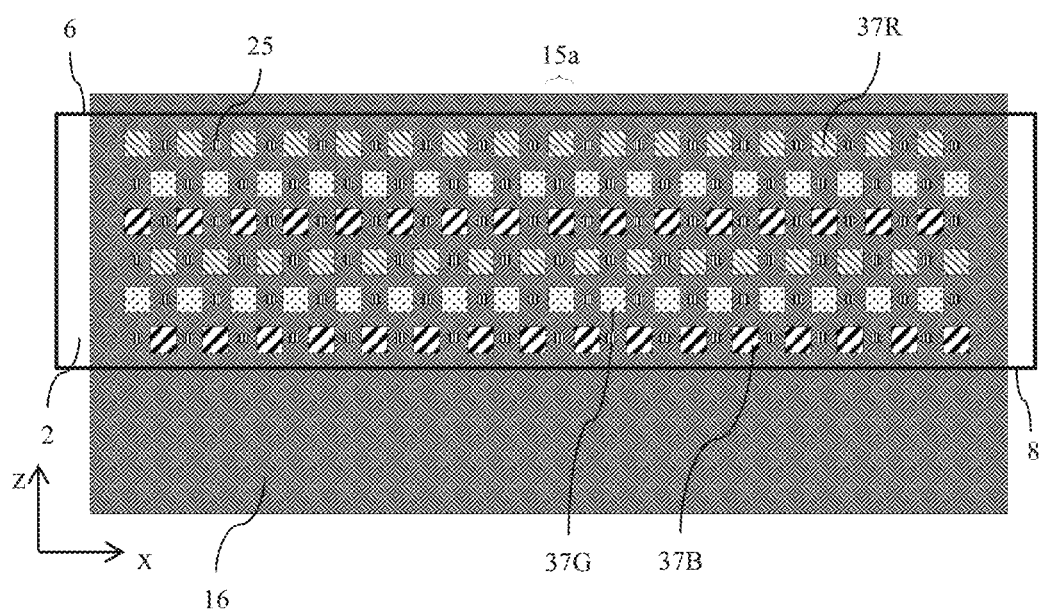
FIG. 4F is a schematic diagram illustrating in end view an arrangement of red, green and blue micro-LED light sources and the waveguide.

FIG. 4F is a schematic diagram illustrating in end view an arrangement of red, green and blue micro-LED light sources 37R, 37G, 37B and the waveguide 1. Features of the embodiment of FIG. 4E not discussed in further detail may be assumed to correspond to the features with equivalent reference numerals as discussed above, including any potential variations in the features.

In comparison to the arrangement of FIG. 4E no colour conversion layer is provided and reduced mixing between adjacent light sources 15a-n within the colour conversion layer is achieved. Advantageously cross talk between angular cones 26a-n is reduced.

Infra-red emitters 25 may be provided between the light sources. Such emitters 25 can provide controllable illumination for cameras and sensors without producing glare or affecting the vision of the oncoming drivers.

The infra-red emitters may be operated at the same time as the visible emitters or multiplexed so they operate at a different time and for different illumination directions.

Whilst the above headlights may be provided with visible light, in alternative embodiments the light sources 15a-n may comprise visible or non-visible light emitters such as infra-red or ultra-violet light emitters.

As an alternative to mixed wavelength light sources 15a-n, 25 of FIG. 4F each light source 15a-n of the array of light sources may comprise an optical output that comprises a white light spectrum, an infra-red light spectrum or an ultraviolet light spectrum. In an alternative embodiment the light sources 15a-n may be provided as infra-red emitters. The infra-red output light may be directed into selectable and controllable light cones as described elsewhere herein. Such light cones may be arranged to provide enhanced night-time illumination and may be used for detection of the ambient environment in cooperation with infra-red detection means such as infra-red cameras.

Such infra-red illumination may be arranged to reduce illumination of oncoming or foregoing vehicles, to reduce glare to infra-red sensors in oncoming or foregoing vehicles. Glare to oncoming or foregoing infra-red sensors may be reduced, that can be compared in function to reducing glare to the eyes of users for visible light. Advantageously improved signal to noise of night-time environment recognition for other vehicles may be achieved.

The embodiments above may typically use light sources 15a-n that comprise light emitting diodes. Advantageously high scene illuminance may be achieved over a wide field of view.

In alternative embodiments the light sources 15a-n may additionally or alternatively comprise an array of laser diode illuminators. Advantageously scanned laser beams may be provided by means of control of the array 15a-n. Such scanned laser beams may be used for scene illumination in visible or non-visible illumination, for example in an infrared spectral band.

In other embodiments, light sensors may be provided at the input side 2 of the waveguide 1. Advantageously the output of the light sources 15a-n may be calibrated. Further light that is captured from ambient environment may be measured.

Figure 5A:
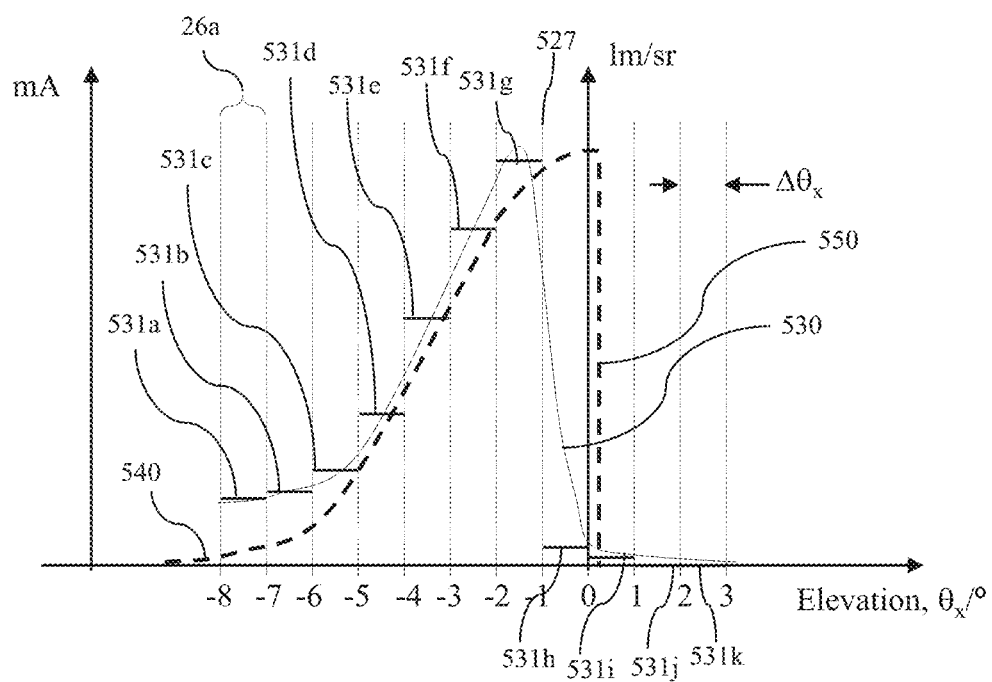
FIG. 5A is a schematic graph illustrating a variation of output luminous intensity with angle in the lateral direction of the waveguide.

FIG. 5A is a schematic graph illustrating a variation profile 530 of output luminous intensity (measured in lumens per steradian) with angle $\theta_x$ in the lateral direction of the waveguide 1 for a direction along the axis 699 of the vehicle 600 described with reference to FIG. 8B.

For illustrative purposes the output is divided into angular cones 26 that are 1° in angular width. Each angular cone 26 is addressed by a single light source of the array 15a-n.

Referring to the embodiment of FIG. 4A, the light sources have emitting region 17 that has the same width, that is for equal drive power the luminous flux is the same from each LED.

Referring to FIG. 5A, levels 531a-k represents the drive profile of current level of the light sources 15a-k to achieve the optical profile 530 of luminous intensity output from the illumination device. The optical profile 530 is diffused by additional diffusers to provide smoothing of profile shape and no visible stepping.

Such profile comprises illumination edge 527 and will be described below with regards to FIGS. 18A-B. Advantageously the output profile may be controlled with desirable luminance profile for illumination in a dipped beam configuration as will be described further below.

In another embodiment profile 540 may be provided with a hard cut-off horizon 550 at or near zero degrees elevation $\theta_x$. Such a profile may advantageously achieve maximum range for visibility of road ahead as will be described further hereinbelow.

Figure 5B:
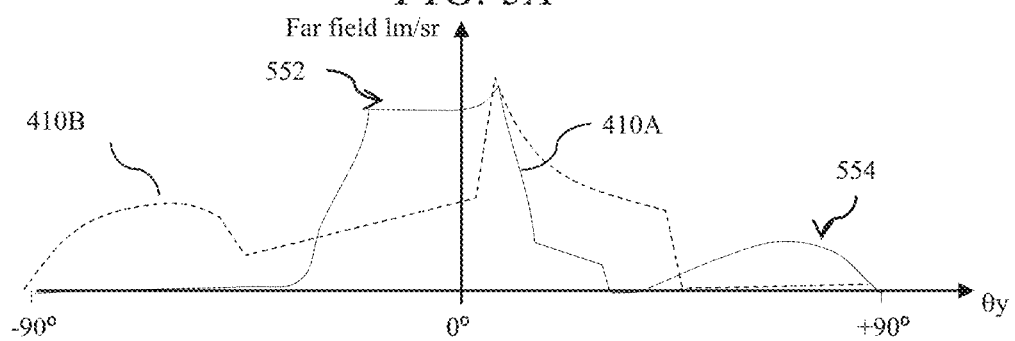
FIG. 5B is a schematic graph illustrating a variation of output luminance with angle in a directional parallel to the lateral direction of the waveguide.

FIG. 5B is a schematic graph illustrating a variation of output luminance with angle $\theta_y$ in a directional parallel to the lateral direction of the waveguide 1. Profile 410 is provided by refraction and reflection at light extraction features 12 of the waveguide 1 and reflective facets 312 of the rear reflector 300, including total internal reflection of light in and from the waveguide 1. More specifically the angles and shapes of the light extraction features 12 of the waveguide 1 and facets 312 of the rear reflector contribute to the distribution of luminous intensity and luminous intensity profile 410A may be shaped by desirable selection of feature 12, 312 surface shape profiles. Profile 410A may comprise a first peak region 552 for head-on illumination and an offset peak 554 for kerb illumination. Advantageously illumination over a wide angular field may be achieved.

Further, as illustrated in FIG. 3A regions 103A, 103B and 422R, 422L of the waveguide 1 and rear reflector 300 may have different shape profiles. Output profiles 410A, 410B may be provided from the regions 103A, 103B respectively. The total angular profile for illumination from the illumination device 100 is provided by addition of the profiles 410R, 410L. Advantageously desirable illumination profiles in the direction orthogonal to the lateral direction may be provided.

FIG. 5B illustrates a hot spot region 552 that is substantially aligned to the direction of travel and region 554 provides a further hot spot for kerb illumination.

An illustrative illumination profile fora typical dip beam will now be further described.

Figure 6A:
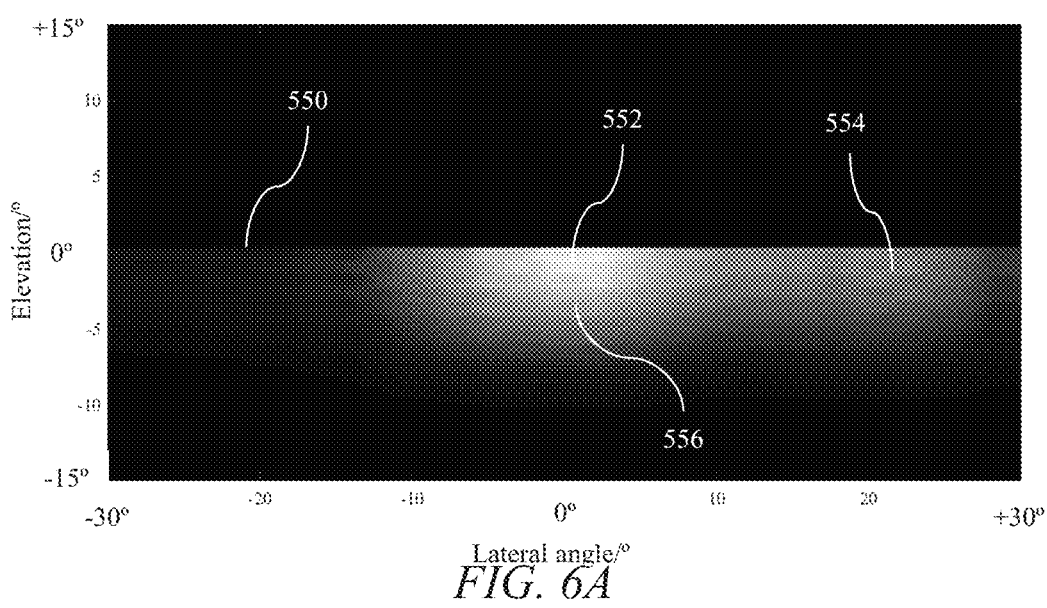
FIG. 6A is a simulated image illustrating the variation with lateral angle and elevation of illuminance onto a screen placed in the far field of an illustrative illumination device of FIG. 1.
Figure 6B:
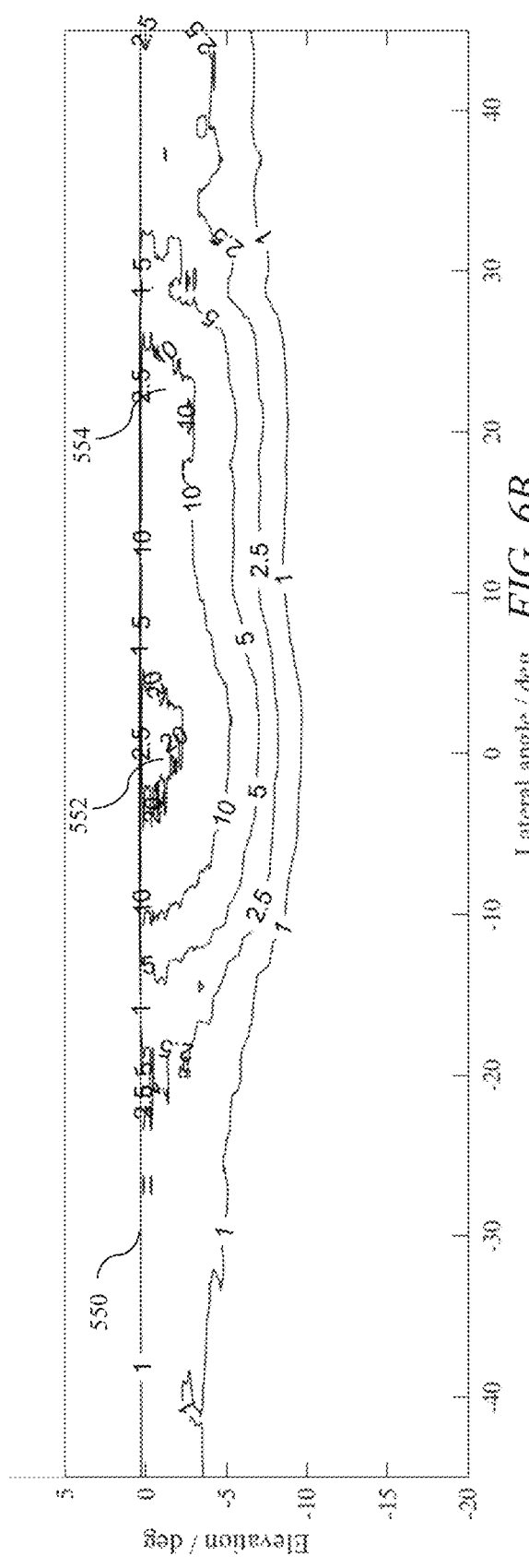
FIG. 6B is a schematic graph illustrating the variation with lateral angle and elevation of illuminance onto a screen placed in the far field of an illustrative illumination device of FIG. 1.

FIG. 6A is a simulated image and FIG. 6B is a schematic graph illustrating the variation with lateral angle and elevation of illuminance onto a screen placed in the far field of an illustrative illumination device 100 of FIG. 1 and provided by the illustrative luminous intensity profile 540 of FIG. 5A and the lateral angular output profile 410A of FIG. 5B.

Referring to FIGS. 6A-B, horizon 550 is provided with illuminance at lower elevations and substantially no illuminance at higher elevations. Advantageously the road surface ahead may be illuminated, and oncoming drivers may not be dazzled.

By control of light source selection in array 15a-n the elevation of the horizon 550 may advantageously be adjusted. For example, the horizon 550 may be selected to adjust for different road slope angles or car loading.

In other embodiments as described elsewhere herein, the horizon may be provided at higher elevations when no oncoming vehicles are detected. Tuning of horizon location may further be provide by mechanical adjustment of the light sources 15a-n with respect to the waveguide 1 as illustrated in FIG. 7B, below.

Figure 6C:
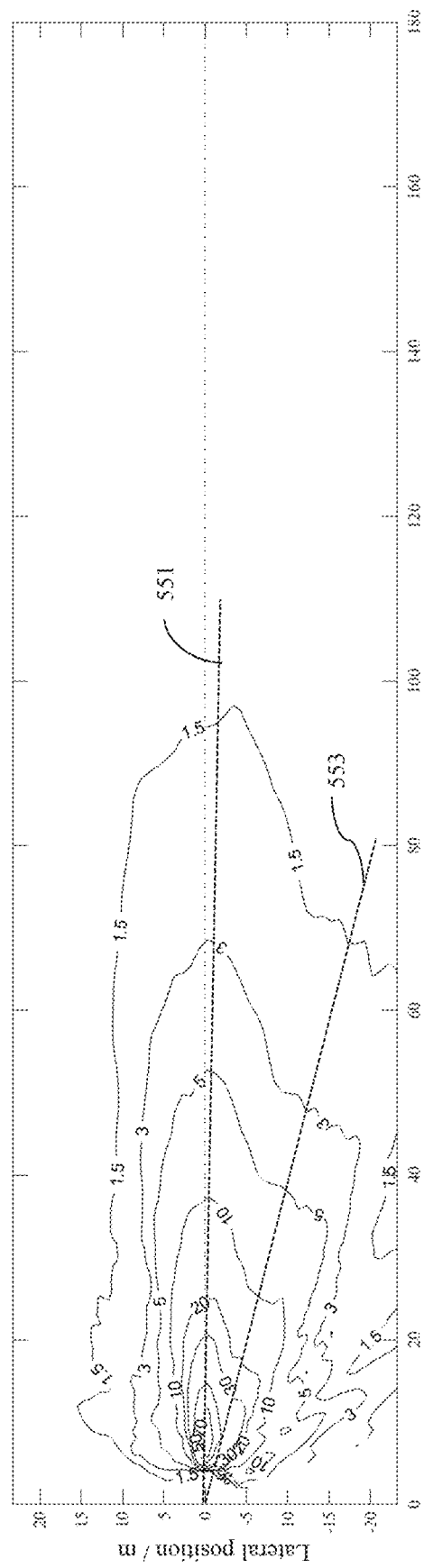
FIG. 6C is a schematic graph illustrating the variation of illuminance at a road surface for the far field illumination profile of FIG. 6B with a headlight positioned 0.75 m above the road surface.

FIG. 6C is a schematic graph illustrating the variation of illuminance at a road surface for the far field illumination profile of FIG. 6B with a headlight positioned 0.75 m above the road surface. FIG. 6C illustrates contours of illuminance measured in lux (lm/m$^2$) onto a vertical screen if it were to be positioned on the road surface in front of the vehicle. Illumination direction 551 is illuminated by hot spot 552 of FIG. 5B and illumination direction 553 is illuminated by hot spot 554 of FIG. 5B. Advantageously the distance for desirable illumination in the forwards direction is maximised while desirable kerb illumination is provided for both sides of the vehicle with increased illuminance on the near side kerb (for a right hand drive vehicle).

Figure 7A:
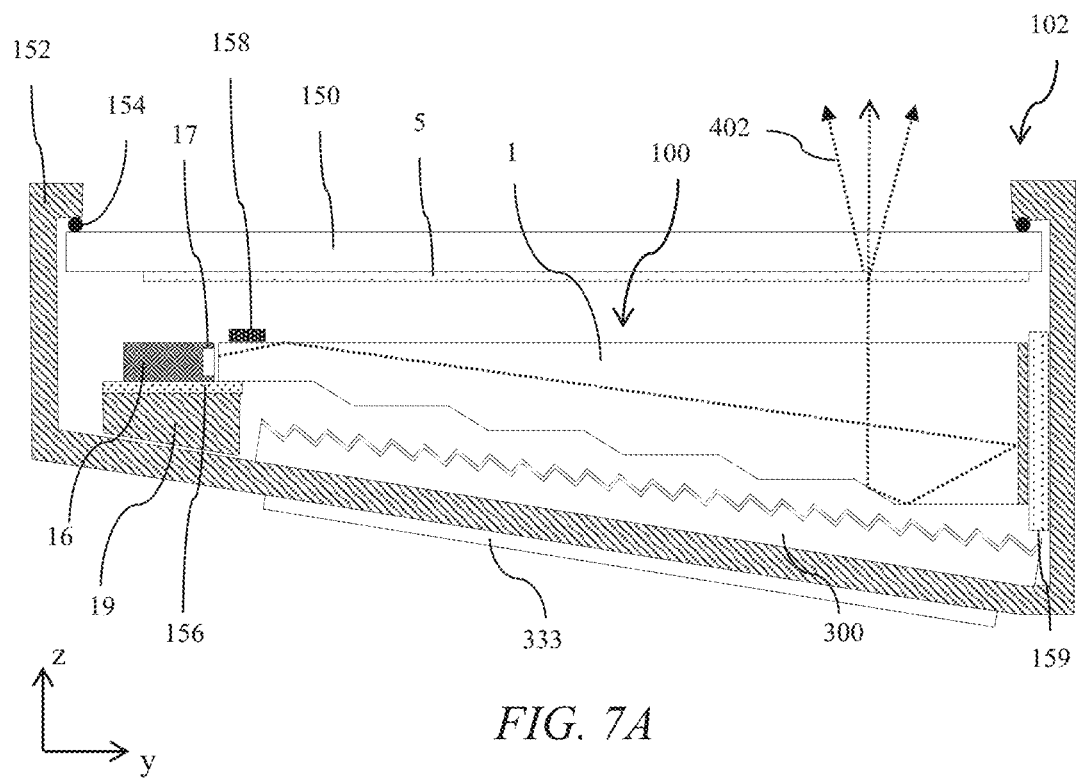
FIG. 7A is a schematic diagram illustrating in side view a vehicle external light comprising: a housing for fitting to a vehicle, and an illumination device mounted on the housing; and a transmissive cover extending across the first light guiding surface of the waveguide.
Figure 7B:
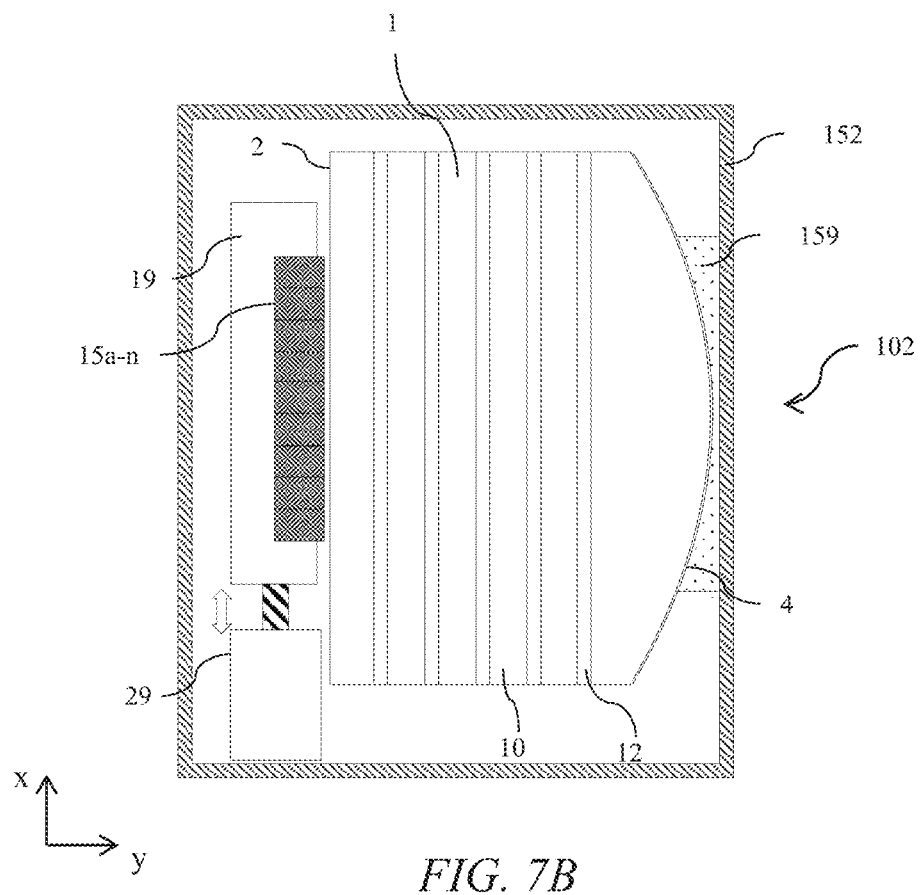
FIG. 7B is a schematic diagram illustrating in top view a vehicle external light further comprising a transducer to modify the position of the light source array 15a-n with respect to the lateral direction of the waveguide 1.

FIG. 7A is a schematic diagram illustrating in side view a vehicle external light 102 comprising: a housing 152 for fitting to a vehicle 600, and an illumination device 100 as described elsewhere herein that is mounted on the housing 152. Features of the embodiment of FIG. 7A not discussed in further detail may be assumed to correspond to the features with equivalent reference numerals as discussed above, including any potential variations in the features.

A transmissive cover 150 extends across the waveguide 1 and the illumination device 100 is a backlight for the transmissive cover 150. A diffuser 5 may be arranged on one surface of the transmissive cover 150. The diffuser 5 may be attached to the cover 150 or may be formed in the surface of the cover 150, for example by injection moulding. In operation, the cover 150 provides high transmission to incident light and further prevents water contacting the waveguide 1. The transmissive cover may typically be curved with desirable shapes to match the shape of the vehicle exterior for example to improve aerodynamic performance and cosmetic appearance.

Housing 152 is provided to support the illumination device 100 and provided with seals 154 to minimise water ingress. Rear reflector 300 may be mounted on the housing 152 to provide desirable flatness of support and advantageously minimise distortion of the optical cones 26. Seals 154 and cover 150 may alternatively or additionally be provided on the outside of housing 152.

The array of light sources 15a-n may be provided as an LED lightbar 156 comprising an array of LED packages 16 mounted on a circuit board such as a metal core printed circuit (MC-PCB) board, or mounted on a flexible printed circuit which may incorporate one or more heat spreading metal layers. Housing 152 may further be provided for attachment of the LED lightbar 156, and may provide a heat-sink. Advantageously LED junction temperature may be reduced and efficiency and lifetime increased.

Support members such as members 159 and adhesive tapes 159 may be provided to achieve mechanical alignment of the waveguide 1 to the LED lightbar 156.

A heater 333 may be provided on the housing 152 or within the housing 152 to provide de-misting and de-icing of the cover 150. Waste heat from the light sources may be directed to the transparent cover 150 for example by means of the housing 152. Further, heater elements such as transparent resistive coatings may be formed on the cover 150 to minimise fogging.

In operation some of the light that is reflected from the reflective end 4 may return to the input side. Some of this light incident on the input side 2 may be reflected at the input side 2 and packages 16 of the LEDs 15a-n and be directed back towards the reflective end 4. Such light may then be extracted in undesirable directions in the illumination profile. Light absorbing material 158 may be provided on the waveguide 1 near to the input side 2 and may be provided on waveguiding surfaces 6, 8 and/or input side 2. Light that is reflected from the reflective end 4 and is not output at features 12 may be absorbed by material 158. Advantageously stray light is reduced and the fidelity of the optical cones 26 increased.

It may be desirable to provide fine tuning of the direction of optical output from the vehicle external light 102.

FIG. 7B is a schematic diagram illustrating in top view a vehicle external light 102 further comprising an actuator 29 to modify the position of the light source array 15a-n with respect to the lateral direction of the waveguide 1. Features of the embodiment of FIG. 7B not discussed in further detail may be assumed to correspond to the features with equivalent reference numerals as discussed above, including any potential variations in the features.

The illumination device 100 further comprises an actuator system 29 arranged to drive movement of the array of light sources 15a-n relative to the waveguide 1 in the x-direction laterally across the waveguide 1. The actuator system 29 has a resolution which is smaller than an average pitch w of the light sources in the x-direction laterally across the waveguide 1.

In operation, the desirable beam direction may be determined for example by means of calibrated internal position sensors, for example a Moiré fringe grating, or external sensors including but not limited to a camera, or during a calibration of pointing direction. Actuator 29 is arranged to mechanically translate the light source array with respect to the lateral direction across the input side 2 of the waveguide 1. The actuator 29 may comprise a piezo-electric actuator, a voice coil motor, a servo motor, a stepper motor or other known mechanical actuators.

Such an embodiment may provide addressability of alignment that is higher than the addressability provided by the separation of the individually controllable light sources 15a-n. In an illustrative embodiment each of the light sources 15a-n may have a pitch of 750 micrometres and the waveguide 1 may be arranged to provide illumination of an angular cone of width 1° in the lateral direction for each of the light sources. Such pointing direction may be provided by mechanical alignment of the light sources 15a-n with respect to the lateral direction.

Continuing the illustrative embodiment, a translation of 75 micrometres may provide beam pointing adjustment of 0.1°. In a dip beam mode of operation advantageously the distance at which desirable illuminance onto the road surface is achieved may be increased without risk of dazzle to oncoming drivers. Further the range of the dip or high beam may be finely adjusted by the actuator's movement to dynamically compensate for changes in the vehicle attitude from loading or acceleration, and/or the topography of the road surface, (for example going uphill or downhill). Such adjustment may be determined by a control system in conjunction with sensors such as cameras or signals from GPS and mapping data.

Further, the light sources 15a-n may age at different rates, such that desirably the illuminance distribution may be recalibrated from time to time. The embodiment of FIG. 7B may be used to vary which of the light sources 15a-n has maximum illuminance. For example a translation of 3 mm may adjust the central light source location by four light sources. Sources that have been used with low output luminous flux may then be used to deliver the high illuminance part of the beam. Advantageously brightness and longevity of the illumination apparatus 100 may be increased.

In comparison with known beam pointing adjustments that provide movement of substantial parts of the illumination apparatus, the mechanical movements of the light sources 15a-n are small and may act on low mass components. Cost and complexity may be reduced.

Illustrative arrangements of vehicle external lights 102 will now be described.

Figure 8A:
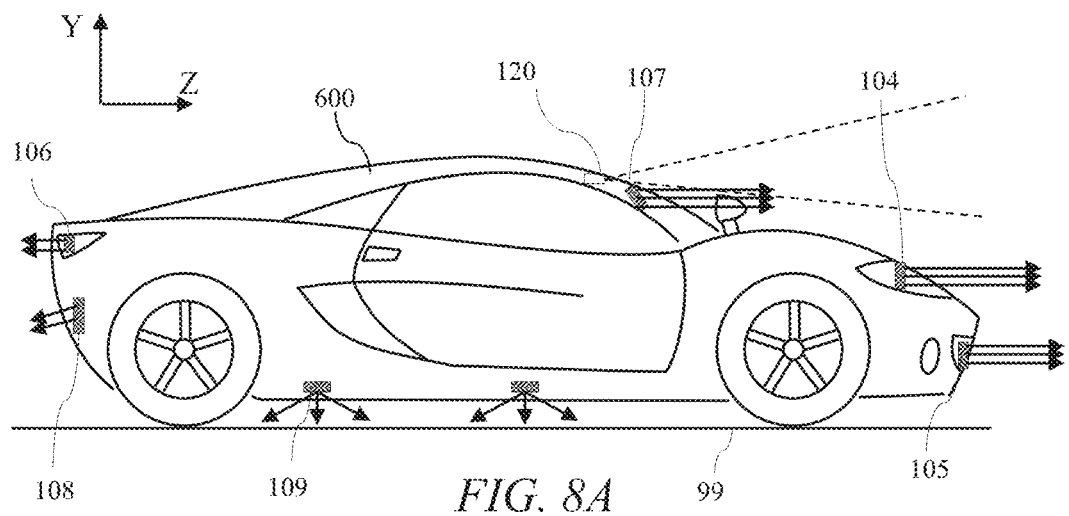
FIG. 8A is a schematic diagram illustrating in side view a vehicle comprising vehicle external lights of the present embodiments.
Figure 8B:
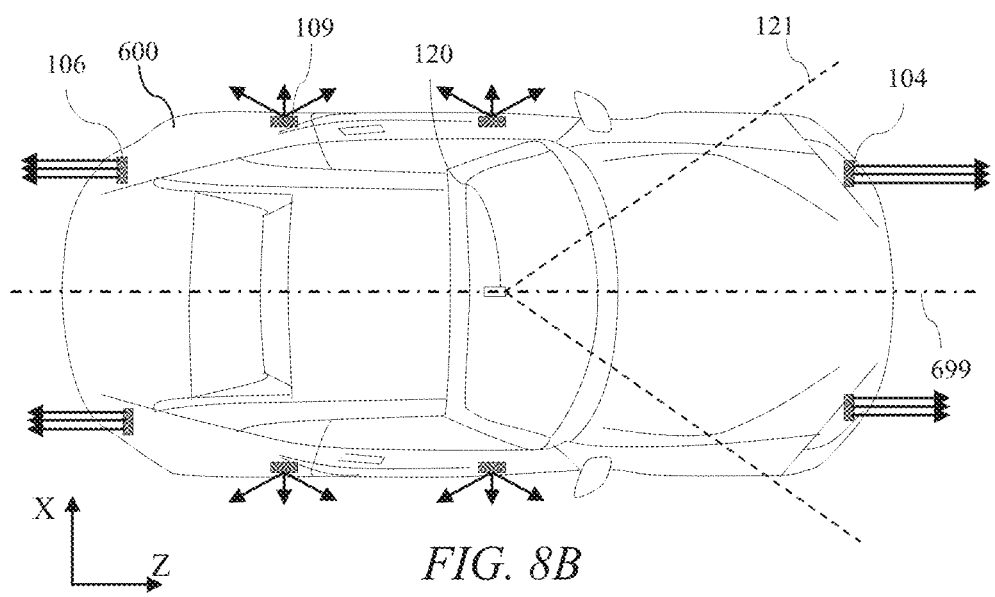
FIG. 8B is a schematic diagram illustrating in top view a vehicle comprising vehicle external lights of the present embodiments.

FIG. 8A is a schematic diagram illustrating in side view a vehicle 600 comprising vehicle external lights 102 at locations 104-108 or the vehicle 600; and FIG. 8B is a schematic diagram illustrating in top view a vehicle 600 comprising vehicle external lights 102 of the present embodiments.

The vehicle external lights 102 of the present embodiments have thin profile and may provide reduction of illumination device volume in comparison to known illumination structures.

Vehicle headlights 104 comprise a vehicle external light 102 wherein the output luminous flux is at least 100 lumens, preferably at least 300 lumens and most preferably at least 600 lumens. The headlights 104 may comprise uniform white light sources.

The array of light sources 15a-n may comprise at least two light sources with different spectral outputs. The two different spectral outputs may comprise two of: a first white light spectrum, a second white light spectrum different from the first white light spectrum, red light, orange light, and/or infra-red light.

Alternatively white and orange light sources 15a-n may be provided on the input side 2 of waveguide 1 and the headlight 104 may further operate as a direction indicator. The headlight may be dimmed or extinguished in the region for which visibility of the indicator function is desirable. Advantageously reduced number of light sources and increased area of output for indicators may be achieved.

A fog light 105 may be mounted low down on the vehicle 600. Fog light 105 may have reduced blue spectral content compared to headlight 104 to reduce scatter in fog.

A vehicle reversing (or back-up) light 108 comprises a vehicle external light 102 and white light sources 15a-n. A rearward facing light 106 comprising the vehicle external light 102 of claim 28 wherein the light sources 15a-n provide red light.

Alternatively red, orange and white light sources may be provided on the input side 2 of the waveguide 1. In one mode of operation red light may be provided for braking and fog light purposes. In another mode of operation a rear reversing light may be provided. In another mode of operation a direction indicator function may be provided.

Camera 120 may be provided with field of view illustrated by image capture cone 121. As will be described below, image data from camera 120 may be used to determine output illumination profiles in the illuminated scene.

In another embodiment the vehicle external light 107 may be provided next to or on the windscreen of the vehicle 600. The output of some or all of the illumination devices 100 of the present embodiments may comprise white light sources and/or infra-red light sources. Infra-red sources can be used to illuminate the illuminated scene with illumination that may be scanned. Advantageously the vehicle external light can achieve enhanced signal to noise ratio for the camera 120 used to monitor the road scene.

In another embodiment at least one vehicle external light 109 may be provided to illuminate the road surface 99 near to the doors of the driver and passengers. Increased illumination for an occupant leaving or entering the vehicle at night may be achieved, advantageously achieving increased safety.

The present embodiments advantageously achieve significant reduction of volume of vehicle external lights. It may be desirable to further reduce the volume of the vehicle that is occupied and to modify cosmetic appearance.

Figure 8C:
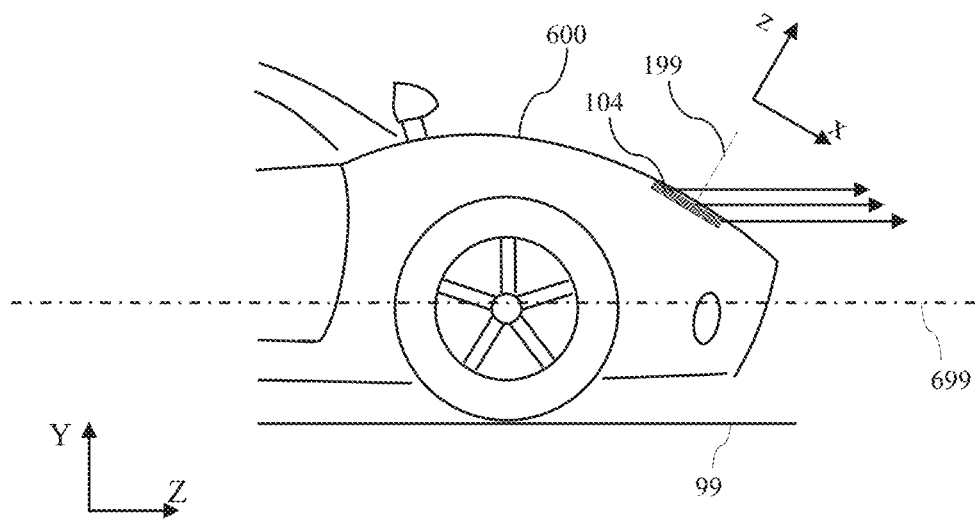
FIG. 8C is a schematic diagram illustrating in side view part of a vehicle comprising vehicle external lights that are mounted with tilted orientations.

FIG. 8C is a schematic diagram illustrating in side view part of a vehicle 600 comprising vehicle external lights 102 that comprise headlights 104 that are mounted with tilted orientations.

In the present figures, the coordinate system denoted by small letters x, y, z is in the frame of the directional illumination device 100, and the coordinate frame denoted by capital letters X, Y, Z is in the frame of the vehicle 600. The coordinate frame x, y, z is not typically aligned to the coordinate frame X, Y, Z, that is the illumination device 100 is typically rotated in the vehicle 600 as illustrated for example in FIG. 8C. The lateral direction in the present embodiments is the direction in which the optical cones 26 are controlled, and thus the x-axis direction in FIG. 1.

Vehicle external lights 102 may have features 12, 312 with profile shapes that are arranged to provide nominal output directions in the lateral direction that are offset from the normal 199 to the illumination device 100. The headlight 104 or other vehicle external lights 102 may be arranged with orientations that are similar to body panel orientations. Advantageously volume of the vehicle external lights 102 may be reduced.

Figure 9A:
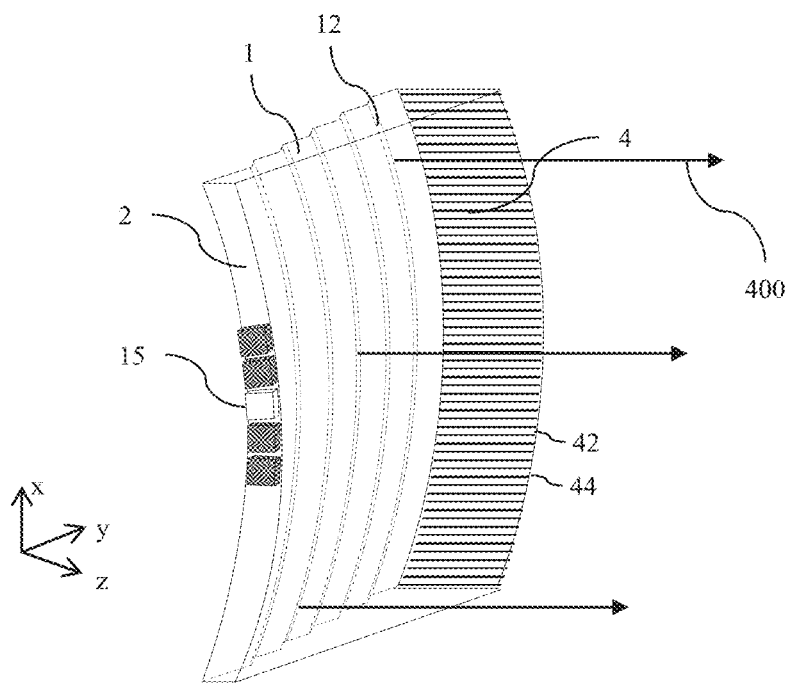
FIG. 9A and FIG. 9B are schematic diagrams illustrating in front perspective views curved waveguides and light source arrays.
Figure 9B:
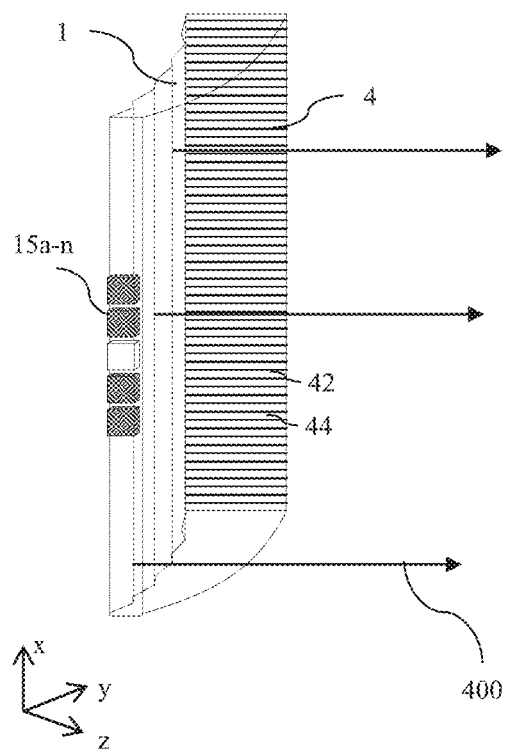

FIGS. 9A-B are schematic diagrams illustrating in front perspective views curved waveguides 1 and light source arrays 15. Features of the embodiments of FIGS. 9A-B not discussed in further detail may be assumed to correspond to the features with equivalent reference numerals as discussed above, including any potential variations in the features.

In each embodiment the waveguide 1 is non-planar. Guided light within the waveguide remains trapped until incidence with features 12 and advantageously the waveguide function is similar to that illustrated in FIG. 1. Advantageously the volume of the vehicle external lights 102 may be reduced in comparison the planar waveguides of FIG. 1 and FIG. 8A for example.

In the alternative embodiment of FIG. 9A a Fresnel reflector is arranged at the reflective end 4.

The waveguide 1 is non-planar and the plural light extraction features 12 are curved to achieve a common output illumination direction as illustrated by rays 400 across at least part of the waveguide 1. In other words the light extraction features 12 of the waveguide 1 are curved to achieve a common output illumination direction across at least part of the waveguide 1, that is rays 400 are parallel across the waveguide 1.

In the alternative embodiment of FIG. 9B the light extraction features 12 of the waveguide 1 have modified profiles (in a similar manner to that illustrated in FIG. 3A) across the waveguide 1 to achieve a common output illumination direction across at least part of the waveguide 1, that is rays 400 are parallel across the waveguide 1.

In the embodiments of FIGS. 9A-B the rear reflector 300 (not shown) may be curved to match the waveguide 1 curvature. Alternatively the waveguide 1 may have a curvature that is different to the curvature of the rear reflector 300. The difference of curvatures may be used to provide further modification of the far field luminance profile 410 for example as illustrated in FIG. 5B. Advantageously desirable luminance profiles 410 may be achieved.

It would be desirable provide further optical functionality of a vehicle external light 102.

Figure 10A:
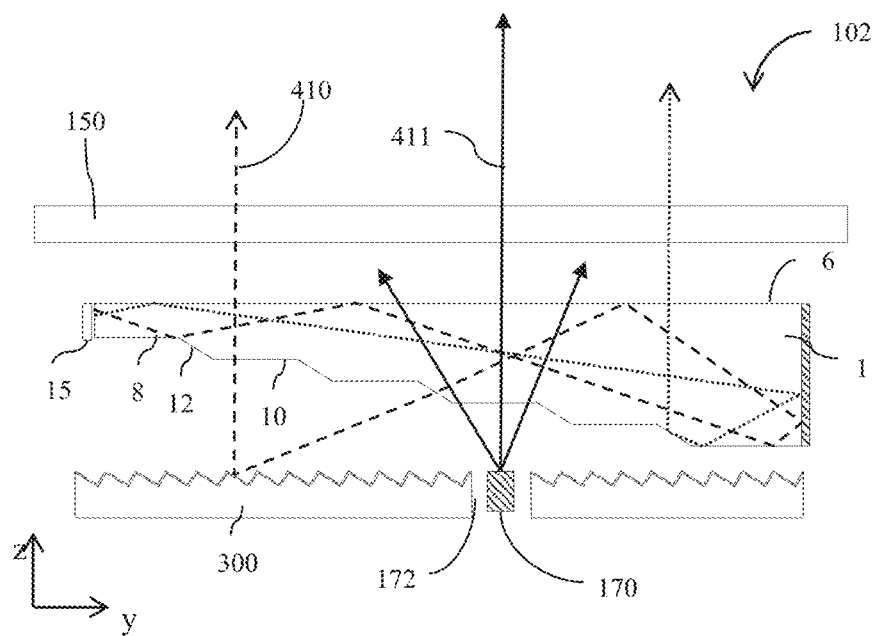
FIG. 10A is a schematic diagram illustrating in side view an alternative directional illumination device comprising an additional light source.

FIG. 10A is a schematic diagram illustrating in side view an alternative directional illumination device 100 comprising an additional light source 170. Features of the embodiment of FIG. 10A not discussed in further detail may be assumed to correspond to the features with equivalent reference numerals as discussed above, including any potential variations in the features.

The waveguides 1 of the present disclosure have surfaces 6 and features 10 that are substantially parallel. Further in the plane in which the waveguide 1 extends, the ratio of the area of the light extraction features 12 to the area of the features 10 is relatively small; in the illustrative example, the facet area is approximately 8% of the pitch of the features 10, 12. Further for light that passes through the waveguide 1 after incidence at the light extraction features 12, small refractive deflections are provided.

Additional light sources 170 may be provided to direct light rays 411 through the waveguide 1. Such light sources 170 may for example be indicator lamps, such as orange lamps that may desirably provide a wide angular spread for visibility from wide viewing angles, such as a Day Run Light. Light sources 170 may be patterned to achieve a decorative or visual effect.

Apertures 172 may be provided in the rear reflector 300 for light rays 411 to pass through or for light sources 170 to be arranged. The waveguide 1 may provide light output from around the aperture 172 so that advantageously efficiency and light cone 26 structure may not be substantially degraded.

Advantageously a compact integrated vehicle external light may comprise multiple illumination functions, reducing total size and complexity.

Figure 10B:
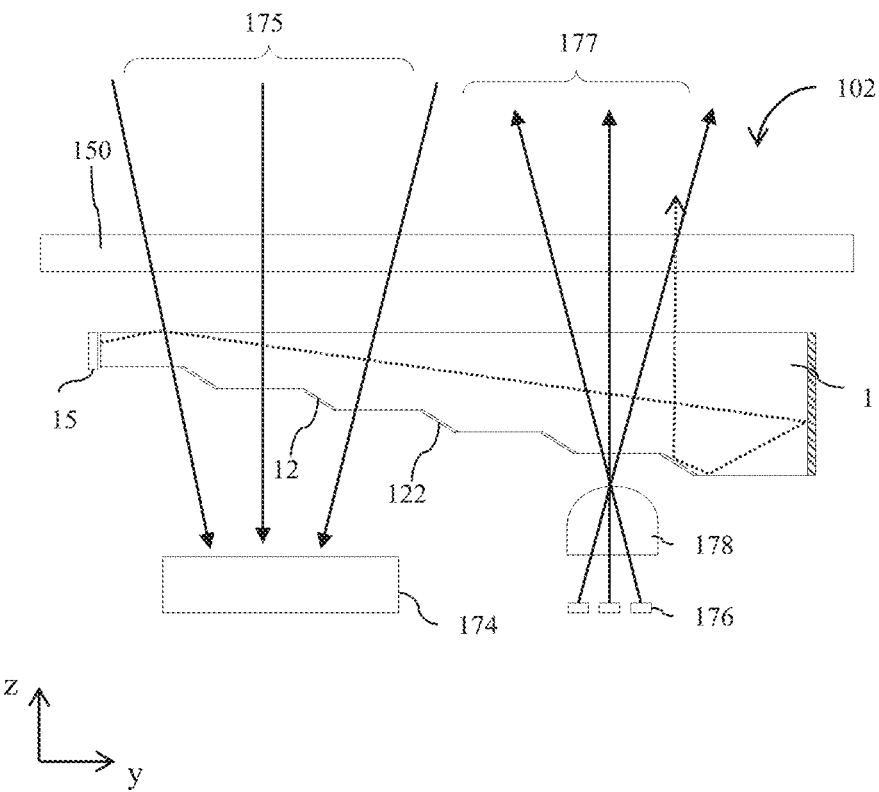
FIG. 10B is a schematic diagram illustrating in side view an alternative directional illumination device comprising an additional directional controlled light source and a sensor apparatus.

FIG. 10B is a schematic diagram illustrating in side view an alternative directional illumination device 100 comprising an additional directional controlled light source 176, 178 and a sensor apparatus 174. Features of the embodiments of FIG. 10B not discussed in further detail may be assumed to correspond to the features with equivalent reference numerals as discussed above, including any potential variations in the features.

In the alternative embodiment of FIG. 10B, the rear reflector 300 is omitted. Optional reflective coatings 122 such as metal coatings are provided at the light extraction features 12. In the illustrative embodiments of the present embodiment, the feature size is 400 microns in width, such coatings may be conveniently formed in alignment with the light extraction features. Advantageously high efficiency is achieved. Further light that passes through the waveguide 1 is transmitted without deflection at the light extraction features 12 and advantageously stray light is reduced.

In comparison to the wide angle source 170 of FIG. 10A, FIG. 10B illustrates another alternative embodiment wherein an array of light sources 176 and projection lens 178 may be arranged to provide illumination through the waveguide 1. The array of light sources 176 may be an LED array such as a 1D or 2D array. The array of light sources 176 may be controlled to advantageously provide further illumination structure to the illuminated scene as will be described further hereinbelow.

FIG. 10B illustrates another alternative embodiment wherein a sensor apparatus 174 is provided to receive external light that is transmitted through the surfaces 6, 8 of the waveguide 1. Such a sensor may be a visible light camera of other optical scanning sensor such as an infra-red detector.

Advantageously the multiple optical devices may be integrated into a common vehicle external light 102 while achieving high efficiency of controlled illumination.

A control system for a vehicle 600 will now be described.

Figure 11:
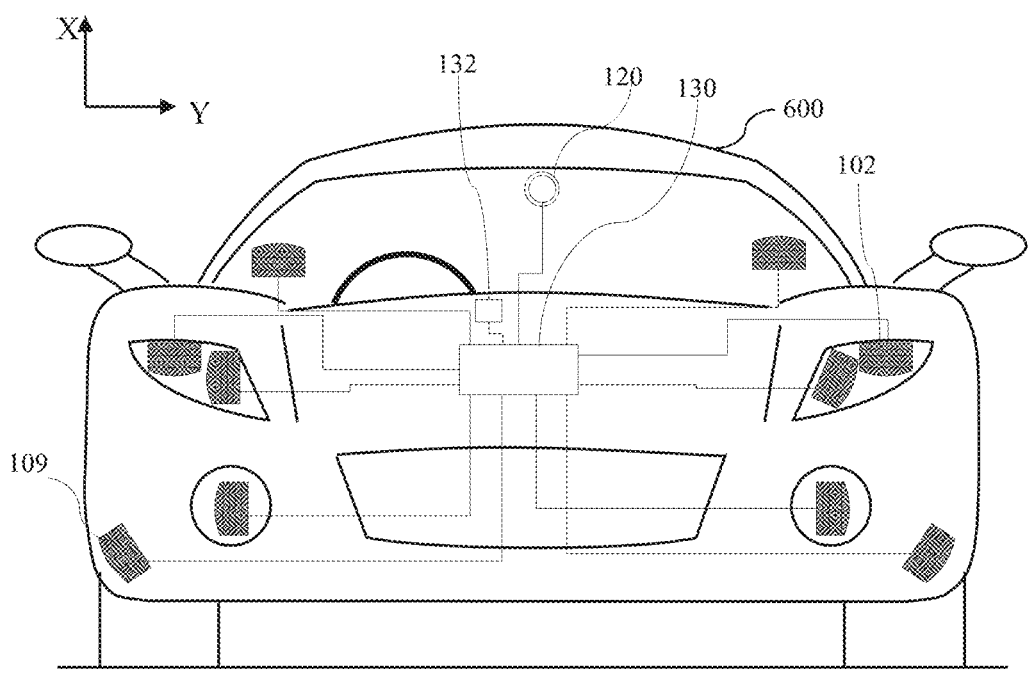
FIG. 11 is a schematic diagram illustrating in front view vehicle external lights and a control system for vehicle external lights.

FIG. 11 is a schematic diagram illustrating in front view a vehicle 600 comprising vehicle external lights 102, a camera 120 and a control system 130 for vehicle external lights 102. Features of the embodiments of FIG. 11 not discussed in further detail may be assumed to correspond to the features with equivalent reference numerals as discussed above, including any potential variations in the features.

The directional illumination device 100, further comprises a control system 130 arranged to selectively control the light sources 15. Information from camera 120 and from other control data 132 is passed to control unit 130. The control system 130 provides control of which light sources 15a-n are illuminated for each vehicle external lights 102.

The control data 132 may provide information on vehicle loading, vehicle acceleration or deceleration, left-hand or right-hand driving conditions, ambient light levels and other data related to control of vehicle external lights 102. The camera 120 may be provided with image recognition processors that provide location of other vehicle lights, road directions, kerb locations and street furniture for example as will be described further below.

Advantageously the illumination output may be directed to regions of importance and dazzle for oncoming users reduced.

Further the control system may provide additional illumination for signalling or communication with pedestrians or with other vehicles.

Figure 12A:
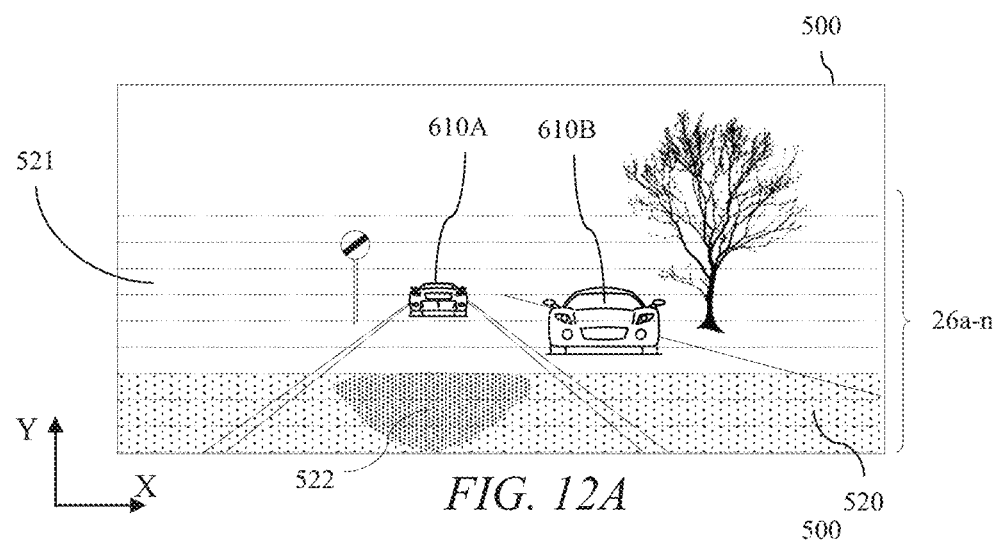
FIG. 12A is a schematic diagram illustrating a view of an illuminated driving scene for an illumination profile to provide a dipped beam illumination for light cones that are extended in the horizontal direction.

FIG. 12A is a schematic diagram illustrating a view of an illuminated driving scene 500 for an illumination profile to provide a dipped beam illumination region 520 with light cones 26a-n that are extended in the vertical direction. Features of the embodiments of FIGS. 12A-C not discussed in further detail may be assumed to correspond to the features with equivalent reference numerals as discussed above, including any potential variations in the features.

Optical cones 26a-n are provided by at least one waveguide 1 of at least one vehicle external light 102. Vehicles 610A that are ahead and oncoming vehicles 610B may be identified by the camera 120 and control system 130.

The illumination profile comprises region 522 that is ahead on the road and the region 520 is for surrounding scenery. Region 521 is a non-illuminated region or in an alternative embodiment may be a region that is illuminated with reduced illuminance, for example to provide a low dazzle region but with some residual illuminance.

The regions 520, 522 may be illuminated by control of the output structure from the waveguide 1 and rear reflector 300. In alternative embodiments such as illustrated in FIG. 11B for example, one of the regions 520, 522 may be illuminated by the waveguide 1 and the other of the regions 520, 522 may be illuminated by a different light source such as LED array 176 and projection lens 178. Advantageously increased control of illumination patterns may be achieved.

In operation, the light sources 15a-n that are illuminated are selected to prevent glare to oncoming driver in vehicle 610B.

In the case that the array of light sources 15a-n of FIG. 1 for example comprises white light spectral output then glare may be reduced to the eyes of occupants and visible light sensors of foregoing vehicle 610A and oncoming vehicle 610B. Advantageously increased visibility of the surrounding environment may be achieved.

In the case that the array of light sources 15a-n of FIG. 1 for example comprises infra-red light, glare to the infra-red light sensors of infra-red light sensors such as cameras and other photodetectors of foregoing vehicle 610A and oncoming vehicle 610B may be reduced. In the case that the array of light sources 15a-n comprises mixed light output light sources as illustrated in FIG. 4F for example then both glare to occupants and detectors may be reduced. Advantageously signal to noise ratio of detected ambient light by vehicles 610A, 610B may be increased.

Further, the loading or acceleration and deceleration of the vehicle may alter the overall beam angle in the vertical direction. Such beam angle may be adjusted by means of electrical control of which light sources 15a-n are illuminated. Mechanical movement of the vehicle external light 102 for beam pointing may be omitted, advantageously reducing cost and complexity.

In another mode of operation, an identified hazard such as a pedestrian may be illuminated such that the pedestrian has high visibility of the vehicle and further has some indication that the vehicle control systems are aware of their location. The illumination of the pedestrian may be in a different colour of illumination as described elsewhere with respect to FIG. 4A or with a particular temporal or spatial illumination pattern. Advantageously the safety of the pedestrian's interaction with the vehicle 600 may be increased.

Figure 12B:
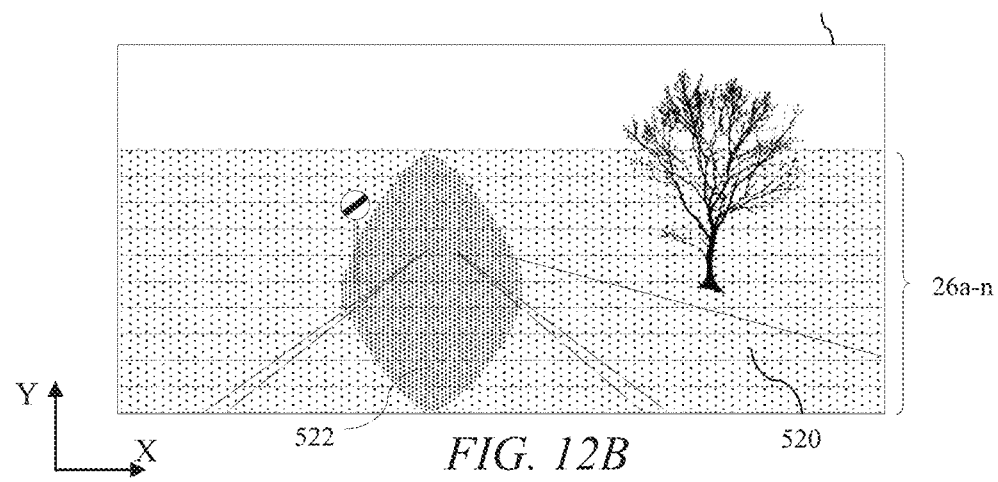
FIG. 12B is a schematic diagram illustrating a view of an illuminated driving scene for an illumination profile to provide a full beam illumination.

FIG. 12B is a schematic diagram illustrating a view of an illuminated driving scene 500 for an illumination profile to provide a full beam illumination region 520. The area of region 520 is increased and the area of region 522 may be increased, and the illumination profile as illustrated in FIG. 5A may be modified. Advantageously desirable full beam illumination profiles may be achieved.

In a further mode of operation when the vehicle 600 is parked a courtesy light function may be provided to illuminate nearby people, such as returning or departing vehicle occupants while reducing dazzle. Advantageously visibility of the area around the vehicle 600 may be increased. The lighting directionality may be provided in temporal or spatial patterns as a courtesy or cosmetic lighting function.

Figure 12C:
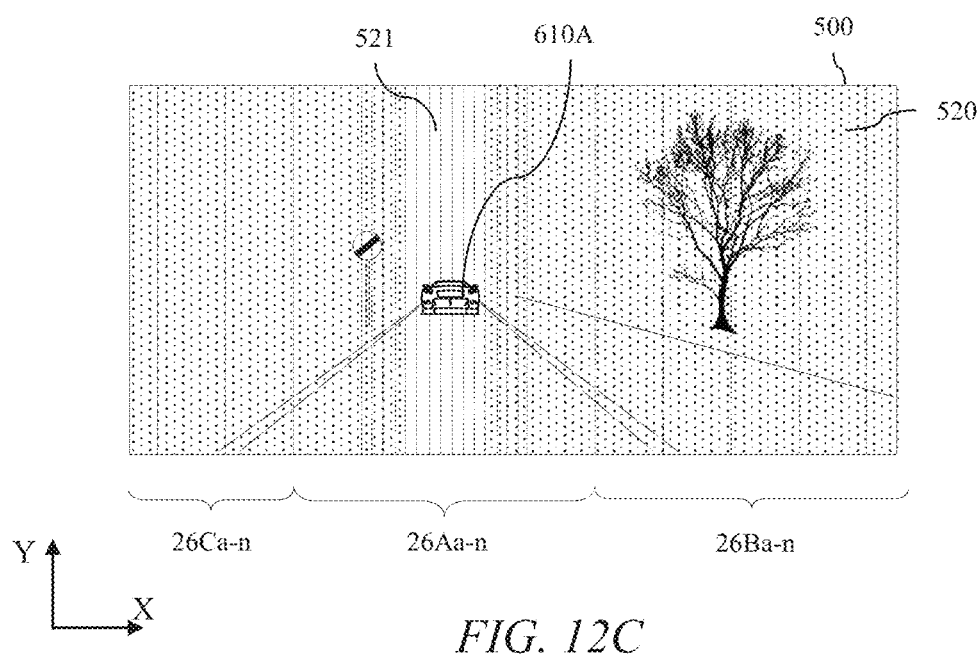
FIG. 12C is a schematic diagram illustrating a view of an illuminated driving scene for an illumination profile with light cones that are extended in the vertical direction.

FIG. 12C is a schematic diagram illustrating a view of an illuminated driving scene 500 for an illumination profile with light cones 26 that are extended in the vertical direction. FIG. 12C is an alternative embodiment in which the waveguide 1 is arranged to be oriented such that the lateral direction (x-axis) of the waveguide 1 is parallel to the vertical direction (Y-axis) of the illuminated scene 500, that is the waveguide 1 of FIG. 1 is rotated by 90 degrees and each of the optical windows 26a-n extend in the vertical direction.

Light cones 26Aa-n are provided with increased resolution, for example by means of control of the light sources 15Aa-n of FIG. 4D, in comparison to the light cones 26Ba-n and 26Ca-n by means of control of the light sources 15Ba-n and 15Ca-n respectively.

In operation, the illuminated region 520 is provided with light from the light sources 15Ba-n, 15Ca-n with relatively low angular resolution. Some of the light sources 15Aa-n are not illuminated to provide the non-illuminated region 521. Advantageously the resolution of the illumination may be increased in regions of high importance, such as near to head-on driving directions. Regions of the road around the vehicle 610A may be observed with increased illuminance without dazzling the driver of vehicle 610A.

Figure 13:
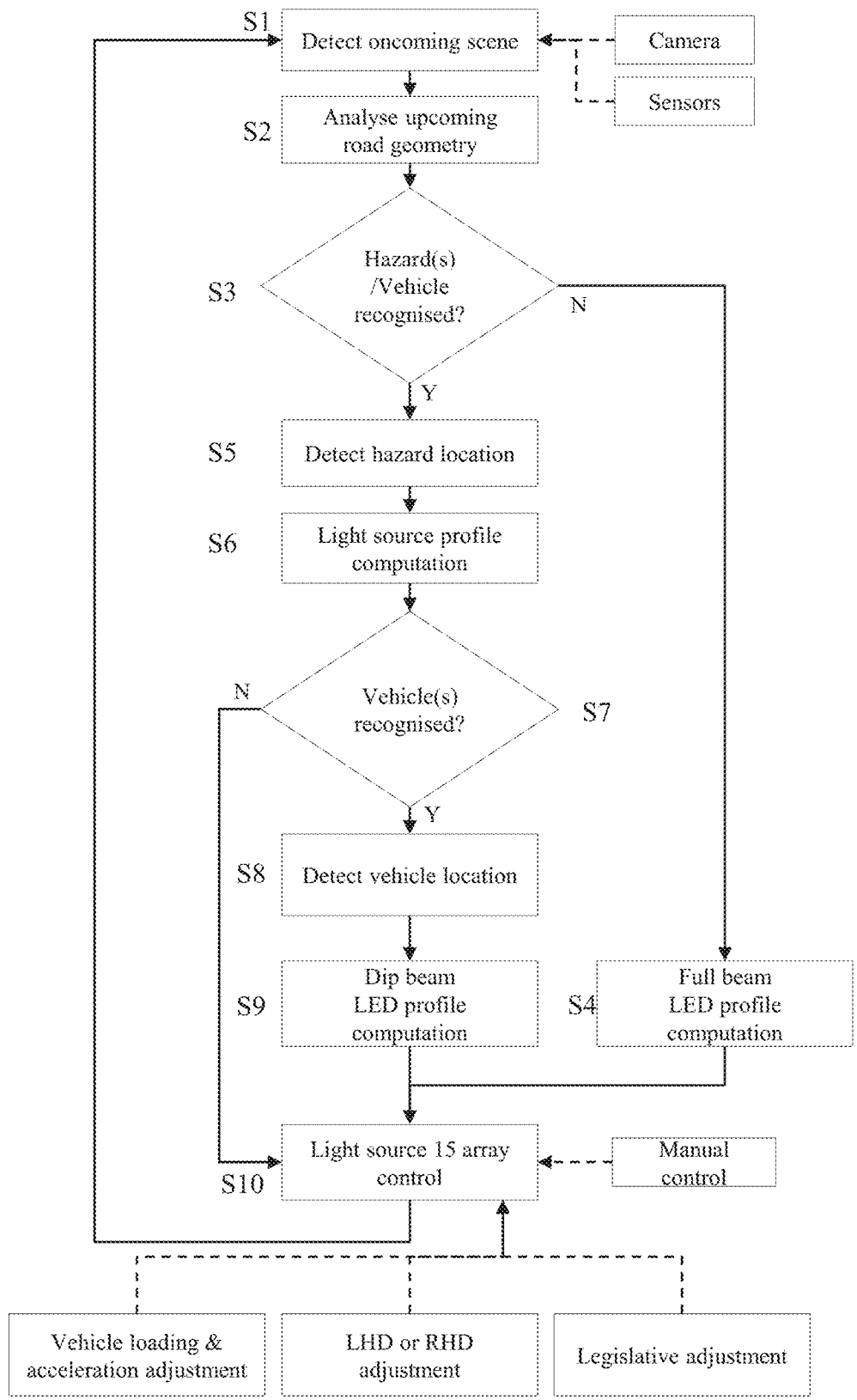
FIG. 13 is a flow chart for control system of vehicle external lights.

FIG. 13 is an illustrative flow chart for control system 130 of vehicle external lights 102 by control system 130.

In a first step S1 a camera and other sensors such as GPS, LIDAR, RADAR infra-red and other known sensors are used to detect the road scene. In a second step S2 the road scene is analysed. In a third step S3 vehicle hazards are identified and in a fourth step S4 if no hazard is identified an appropriate full beam light source 15 control pattern is selected.

In the case in which a hazard (such as a pedestrian in the road) is identified in a fifth step S5, then in a sixth step S6 a light source profile is calculated to provide suitable illumination of or signalling to the hazard.

In a seventh step S7 for the case in which other vehicles 610A, 610B as illustrated in FIG. 12A are identified then the vehicle location(s) is identified in an eighth step S8 and a dip beam profile undertaken in a ninth step S9.

In a tenth step S10 the information from steps S1-S9 is combined with control data 132 including but not limited to vehicle loading adjustment, left hand drive or right hand drive and legislative requirements to provide control of light source array(s) 15 of vehicle external lights 102.

Such control of steps S1-S9 may be overridden or may be replaced by manual control, with the driver selecting between dip beam and full beam operation.

Advantageously a vehicle 600 may be provided with desirable illumination for a variety of road scenes, further examples of which will be described hereinbelow.

Figure 14A:
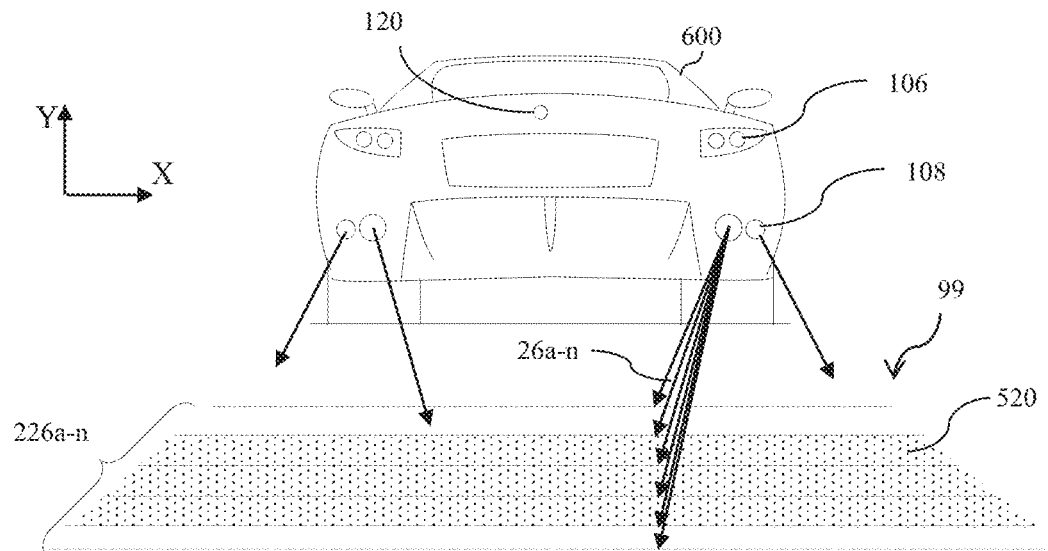
FIG. 14A is a schematic diagram illustrating in rear view vehicle external lights.

FIG. 14A is a schematic diagram illustrating in rear view a vehicle 600 and vehicle external lights 102 that are reversing lights 108. Features of the embodiment of FIG. 14A not discussed in further detail may be assumed to correspond to the features with equivalent reference numerals as discussed above, including any potential variations in the features.

Optical cones 26a-n provide illumination region 520 on the rear ground or road surface 99, wherein region comprises illumination regions 226a-n that may be individually controllable or may have a fixed pattern.

Camera 120 may be used to detect hazards of particular importance such that they are clearly illuminated and visible to the driver by way of the rear view mirror or back-up (reversing) camera 120. Advantageously hazard perception for reversing may be increased and risk reduced.

The operation of side lights 109 to achieve increased safety for occupants entering or leaving the vehicle 600 or for passing traffic will now be described.

Figure 14B:
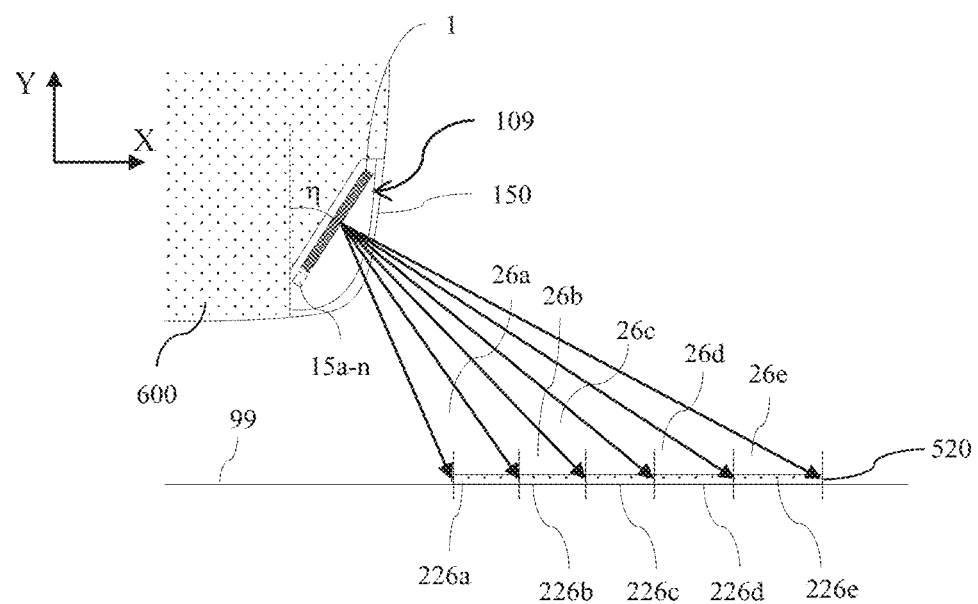
FIG. 14B is a schematic diagram illustrating in side view a vehicle external light.

FIG. 14B is a schematic diagram illustrating in side view a vehicle external light 109 of FIGS. 8A-B. Features of the embodiment of FIGS. 14A-B not discussed in further detail may be assumed to correspond to the features with equivalent reference numerals as discussed above, including any potential variations in the features.

In the embodiment of FIG. 14B, waveguide 1 is provided at an angle η to the Y-axis and provides illumination optical cones 26a-n from respective light sources 15a-n that are directed towards the ground or road surface 99 to provide illumination region 520 comprising sub-regions 226a-n. Transmissive cover 150 may be provided with a curved shape to match the body panel of the vehicle 600.

The side light 109 may be provided in the sill, in the door, in the rear view mirror or other convenient location on the vehicle that is arranged to provide illumination of the road surface 99.

The regions 226a-n may be individually controllable or may be provided with a fixed illumination pattern that is determined at least by the arrangement of light sources 15a-n and waveguide 1 and control system.

Some of the regions 226a-n may be illuminated, and others may have no illumination to maximise contrast of an illumination pattern, for example to provide a zebra crossing appearance at the road surface. The illuminated pattern of regions 226a-n may be fixed or may vary with time, for example to provide communication from the vehicle to pedestrians or other road users, for example communicating a warning or an or indication of the vehicle advanced driver assistance system (ADAS) driving level, or an indication of the medical distress of the driver.

In an illustrative warning condition, a vehicle door close to the illumination regions 226 may be about to open, which may be hazardous to proximate cyclists, pedestrians or other road users. At least some of the illumination regions 226a-n may change in illuminance, colour or may be different colours in order to communicate information to the at risk individual or vehicle.

Illumination may be provided that highlights hazards in the nearby region, for example kerbs, drains, debris or potholes.

No illumination in some regions 226a-n may for example be provided by turning off respective light sources 15a-n or by omitting light sources that would be arranged to illuminate the respective regions. Advantageously cost may be reduced.

The variation with the angle n of the shape of the illumination patterns provided by light cones 26a-n on the road surface 99 will now be described further.

Figure 15A:
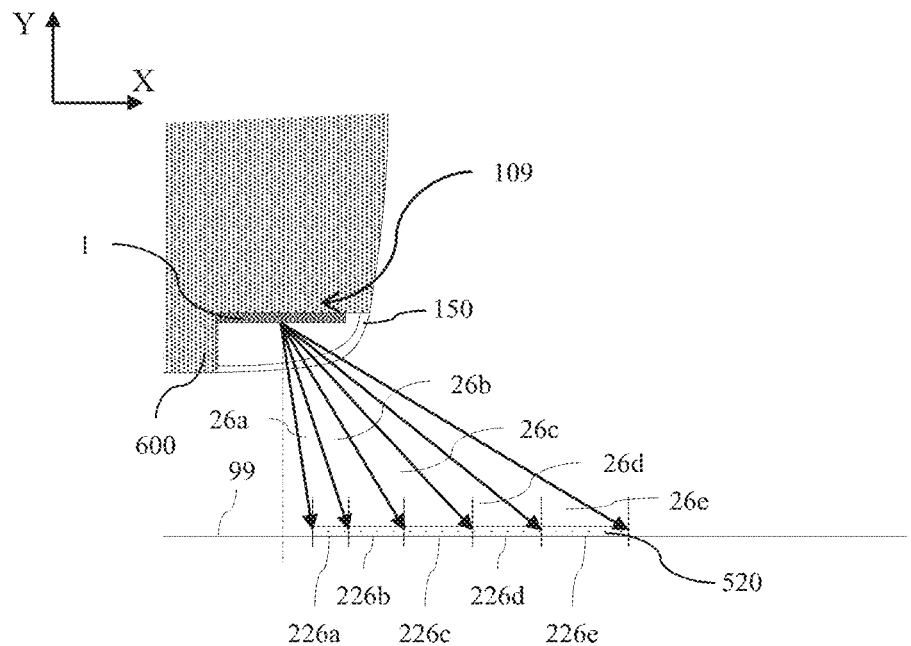
FIG. 15A is a schematic diagram illustrating in side view operation of a vehicle external light wherein the waveguide is arranged horizontally.
Figure 15B:
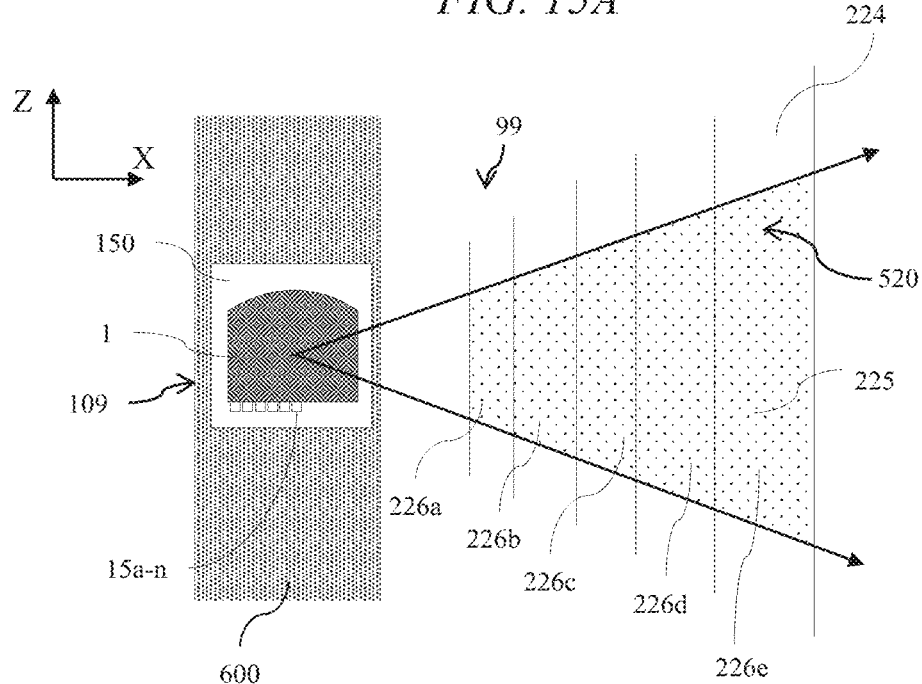
FIG. 15B is a schematic diagram illustrating in top view operation of a vehicle external light wherein the waveguide is arranged horizontally.

FIG. 15A is a schematic diagram illustrating in side view operation of a vehicle external light wherein the waveguide is arranged horizontally; and FIG. 15B is a schematic diagram illustrating in top view operation of a vehicle external light wherein the waveguide is arranged horizontally, that is r is ninety degrees. Features of the embodiment of FIGS. 15A-B not discussed in further detail may be assumed to correspond to the features with equivalent reference numerals as discussed above, including any potential variations in the features.

Illustrative optical cones 26a-e provide illumination regions 226a-e at the road surface 99 that are linear and elongate and may have high luminance regions 225 and reduced luminance regions 224 along the length of the respective regions 226 as described elsewhere herein.

In embodiments comprising light sources 15a-n that have equal width, the width of the regions 226a-n at the road surface 99 may vary with distance from the light 109.

In an alternative embodiment, the width or number of the light sources 15a-n to provide each illumination region 226a-n may be varied such that the illumination regions 226a-n have the same width, or some other desirable pattern of illumination widths. The width, number or illumination profile along the input side 2 of the waveguide 1 of the light sources 15a-n may be further controlled to provide compensation for variation in aberrations of the optical system of the vehicle external light 109.

Figure 15C:
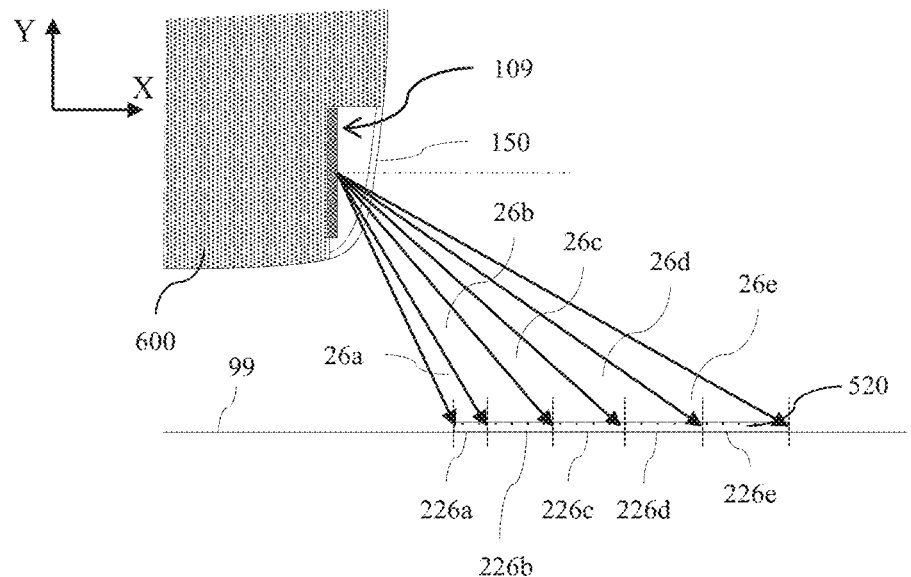
FIG. 15C is a schematic diagram illustrating in side view operation of a vehicle external light wherein the waveguide is arranged vertically.
Figure 15D:
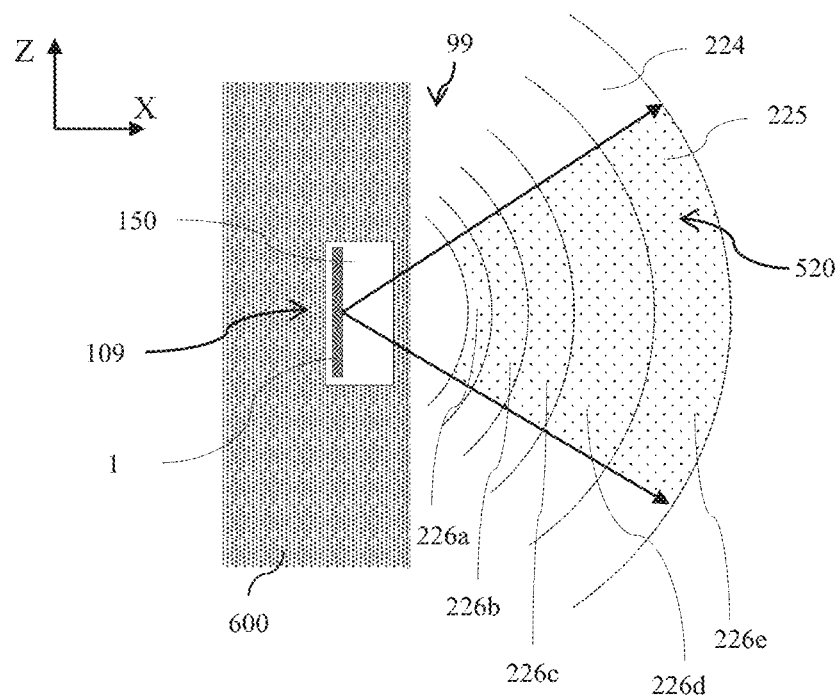
FIG. 15D is a schematic diagram illustrating in top view operation of a vehicle external light wherein the waveguide is arranged vertically.

FIG. 15C is a schematic diagram illustrating in side view operation of a vehicle external light wherein the waveguide is arranged vertically; and FIG. 15D is a schematic diagram illustrating in top view, operation of a vehicle external light wherein the waveguide is arranged vertically, that is r) is zero degrees. Features of the embodiment of FIGS. 15C-D not discussed in further detail may be assumed to correspond to the features with equivalent reference numerals as discussed above, including any potential variations in the features.

By way of comparison with FIGS. 15A-B, the illumination regions 226a-n have an annular shape as the light cones 26a-n are incident with the road surface 99. Advantageously the illumination pattern may be provided around the entrance point to the vehicle 600, achieving increased localisation of the passenger.

Intermediate angles η provide intermediate curvatures of the illumination regions 226a-n. The angle h may be selected to provide optimised appearance of the output, and may further be provided to minimise the aberrations at a desirable illumination region 226.

The operation of a headlight apparatus will now be further described. In cases in which headlight intensity is reduced for oncoming vehicles 610B it may be desirable to increase visibility of the vehicle 600 to other road users.

Figure 16:
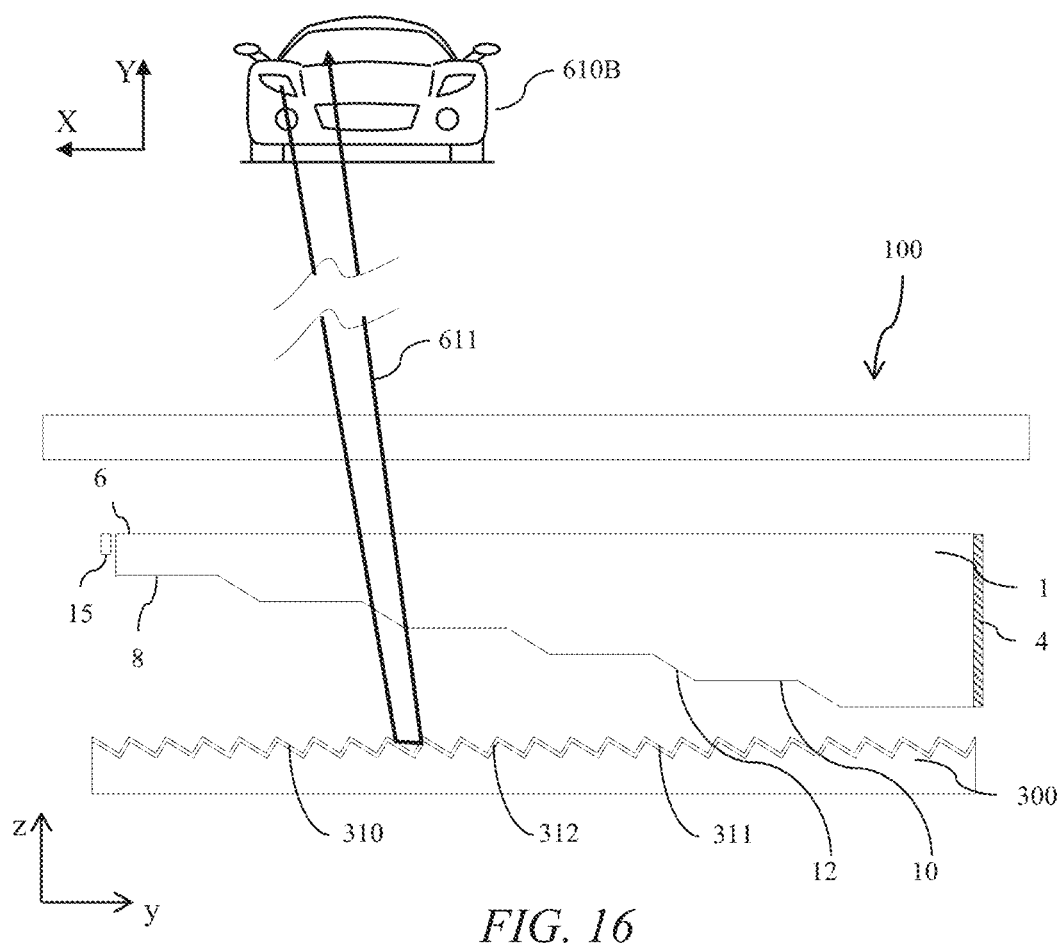
FIG. 16 is a schematic diagram illustrating reflection from a directional illumination device.

FIG. 16 is a schematic diagram illustrating reflection of light rays 611 from a directional illumination device 100. Features of the embodiment of FIG. 16 not discussed in further detail may be assumed to correspond to the features with equivalent reference numerals as discussed above, including any potential variations in the features.

The facets 310, 312 of the rear reflector 300 are arranged so that in at least one direction, light rays 611 from headlights of oncoming vehicle 610B are substantially retroreflected back towards the vehicle 610B. For example the angle between the facets 310, 312 may be 90 degrees so that the rear reflector acts as a retroreflector in at least one axis.

Advantageously visibility of the headlight 600 is increased in cases where no illumination is directed towards the vehicle 610B.

It may be desirable to provide further control of the structure of illumination profile in light cones 26a-n.

Figure 17A:
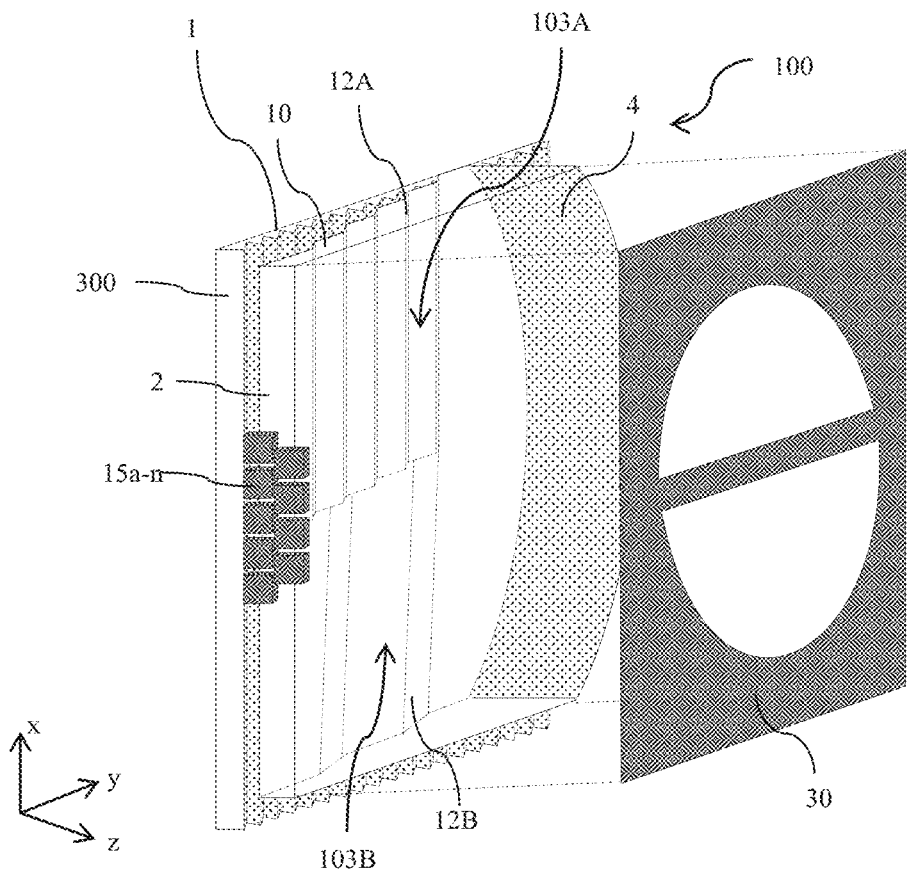
FIG. 17A is a schematic diagram illustrating in front perspective view a directional illumination device comprising a stepped waveguide with curved reflective surface and a facetted rear reflector wherein the waveguide comprises first and second sub-regions with different facet arrangements.
Figure 17B:
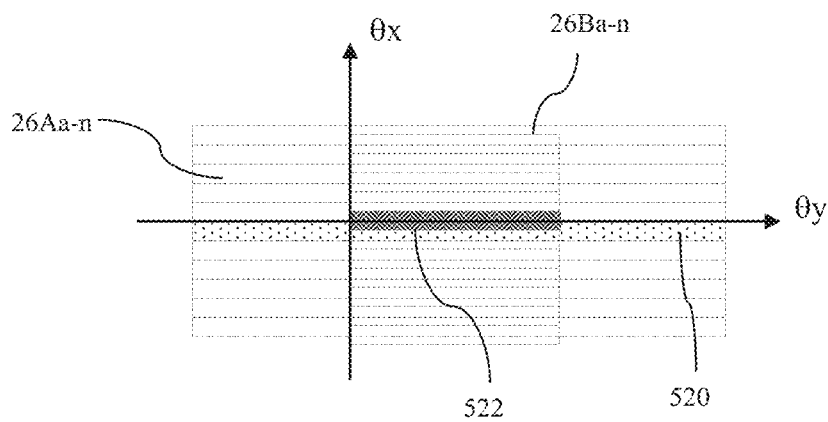
FIG. 17B is a schematic graph illustrating a variation of output luminance with polar angle for the arrangement of FIG. 17A.

FIG. 17A is a schematic diagram illustrating in front perspective view a directional illumination device 100 comprising a stepped waveguide 1 with curved reflective surface 4 and a facetted rear reflector 300 wherein the waveguide 1 comprises first and second sub-regions 103A, 103B with different light extraction feature arrangements 12A, 12B; and FIG. 17B is a schematic graph illustrating a variation of output luminance with polar angle for the arrangement of FIG. 17A. Features of the embodiments of FIGS. 17A-B not discussed in further detail may be assumed to correspond to the features with equivalent reference numerals as discussed above, including any potential variations in the features.

In one alternative embodiment, across respective sub-regions 103A, 103B of the region of the waveguide 1, the light extraction features 12A, 12B are configured differently. In the embodiment of FIGURE the facets 12A have increased surface normal tilt from the normal to the surface 6 compared to the light extraction features 12B. Advantageously different luminous intensity profiles may be provided in the direction Oy orthogonal to the lateral direction 9x. As illustrated in FIG. 17B the different shape of the light extraction features 12A, 12B provides different profiles of optical cones 26Aa-n, 26Ba-n for each respective illuminated light source 15a-n in the direction orthogonal to the lateral direction.

FIG. 17A further illustrates a mask 30 with apertures that may be aligned with the regions 103A, 103B. Advantageously cross talk between the two sets of optical cones 26Aa-n, 26Ba-n may be reduced.

Across the respective sub-regions 103A, 103B of the region of the waveguide 1, the light extraction features 12 extend in different directions for respective regions so that the output illumination cones 26 into which light is directed from the different regions 103A, 103B is offset. The light extraction features 12B are rotated within the plane in which the waveguide 1 extends compared to the light extraction features 12A. As illustrated in FIG. 17B the different rotations of features 12A, 12B in the x-y plane provides a shift between the two sets of cones 26Aa-n, 26Ba-n in the lateral direction, $\theta_x$. In this manner, desirable profiles may be provided which in overlap have high luminous intensity region 522 and reduced luminous intensity in region 520.

In combination, the overlap provided by such shift can advantageously achieve desirable structural features in the output illuminance profiles 520, 522 as will now be further described.

Figure 18A:
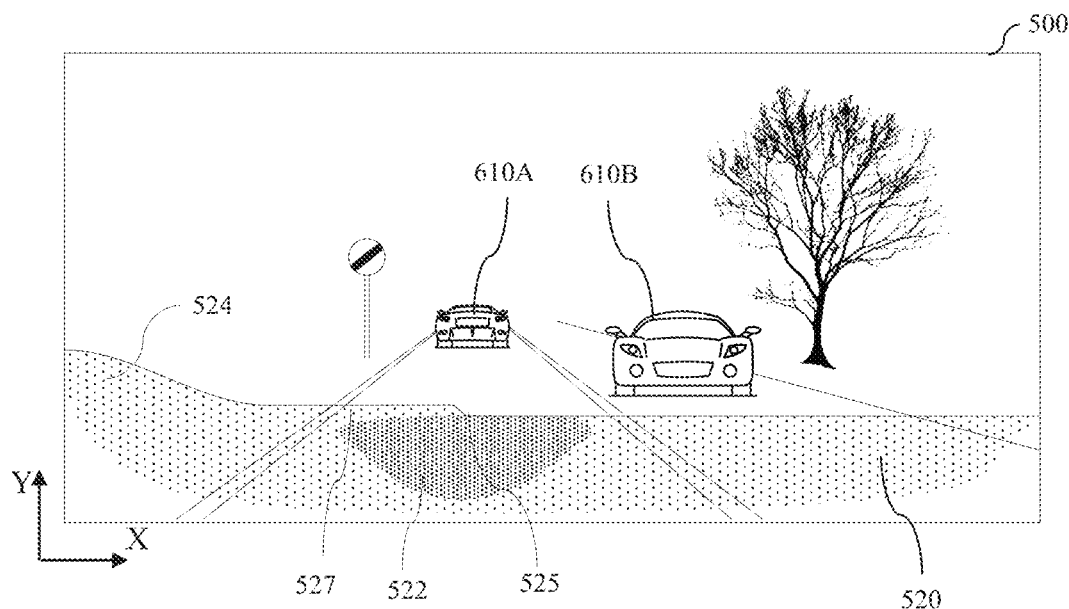
FIG. 18A is a schematic diagram illustrating a view of an illuminated driving scene for an illumination profile to provide a structured dipped beam illumination.
Figure 18B:
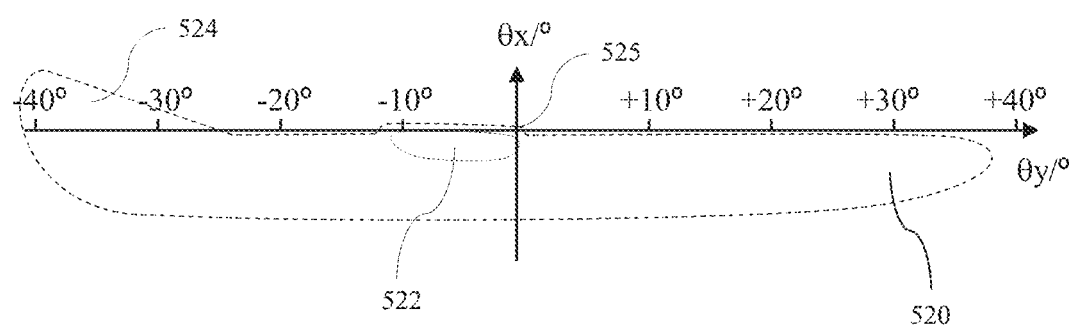
FIG. 18B is a schematic graph illustrating a variation of output profile with polar angle for the arrangement of FIG. 17A.

FIG. 18A is a schematic diagram illustrating a view of an illuminated driving scene 500 for an illumination profile to provide a structured dipped beam illumination 520; and FIG. 18B is a schematic graph illustrating a variation of output profile with polar angle for the arrangement of FIG. 17A. Features of the embodiments of FIGS. 18A-B not discussed in further detail may be assumed to correspond to the features with equivalent reference numerals as discussed above, including any potential variations in the features.

A desirable output luminance region 520 provides an illumination profile 530 with edge 527 such as illustrated in FIG. 5A. Further the region 520 profile 530 comprises a shoulder 525 that can be used for illumination profile alignment in manufacture and servicing for example. A high luminance region 522 provides a hot-spot directed in front of the vehicle onto the road while surrounding features are illuminated by reduced luminance region 520 that may comprise a 'kick-up' illumination region directed at the kerb-side.

The horizontal spread of the illumination profile (in the direction orthogonal to the lateral direction of the waveguide 1) may be provided by control of the shape of features 12 of waveguide 1, and rear reflector 300 facets 312 as described above that may further be provided from different regions 103A, 103B of the waveguide 1 as illustrated in FIGS. 17A-B.

It may be desirable to provide further control of the structure of output regions 520, 522 of the illumination apparatus.

Figure 19A:
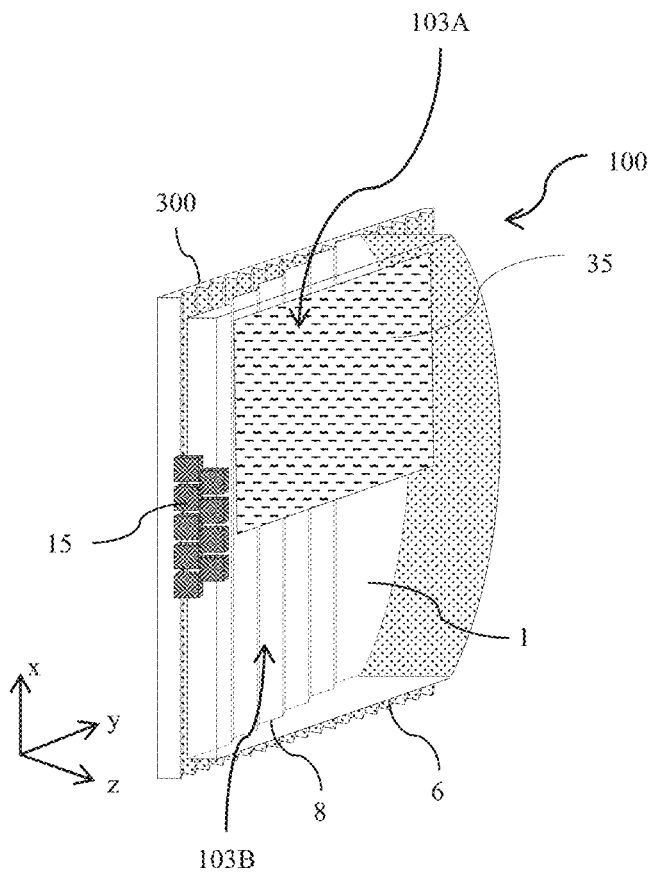
FIG. 19A is a schematic diagram illustrating in front perspective view a directional illumination device comprising a stepped waveguide with curved reflective surface and a facetted rear reflector further comprising a diffuser over part of the area of the waveguide.
Figure 19B:
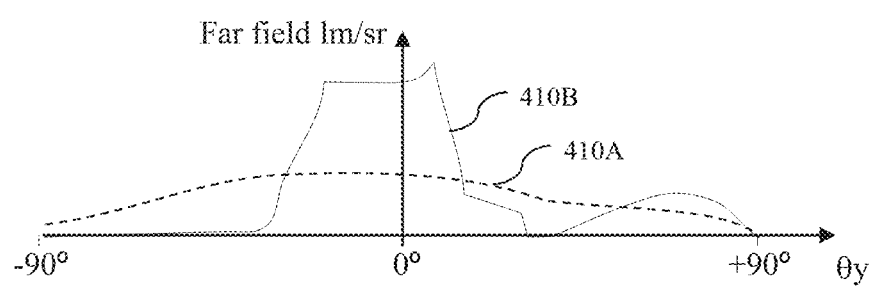
FIG. 19B is a schematic graph illustrating a variation of output luminance with angle in a directional parallel to the lateral direction of the waveguide for the arrangement of FIG. 19A.

FIG. 19A is a schematic diagram illustrating in front perspective view a directional illumination device 100 comprising a waveguide 1 with curved reflective surface 4 and a facetted rear reflector 300 further comprising a diffuser 35 over part of the area of the waveguide 1; and FIG. 19B is a schematic graph illustrating a variation of output luminance with angle in a directional parallel to the lateral direction of the waveguide for the arrangement of FIG. 19A. Features of the embodiment of FIGS. 19A-B not discussed in further detail may be assumed to correspond to the features with equivalent reference numerals as discussed above, including any potential variations in the features.

In the alternative embodiment of FIG. 19A, the directional illumination device 100 further comprises a diffuser 35 arranged across a partial region 103A of the first guide surface 6. The diffuser 35 is arranged to provide broadening of the angular distribution of light cones 26a-n for light from the first partial region 103A. The diffuser 35 may comprise a symmetric diffuser, or may comprise an asymmetric diffuser with low diffusion spreading in the lateral direction and high diffusion spreading in the direction orthogonal to the lateral direction. Asymmetric diffusers may comprise lenticular structures wherein the axis in which the lenticular structures are extended is in the lateral direction; or may comprise elongate light scattering microstructures wherein the axis in which the microstructures are elongate in in the lateral direction. Such a diffuser 35 may achieve desirable angular properties at the most common illumination optical cone 26 such as illustrated by profile 530 edge 527 in FIG. 5A and FIG. 18A. Advantageously high fidelity illumination may be provided.

In operation, light from the first partial region 103A is diffused by the diffuser 35 and provides an output profile 410A in the direction θy orthogonal to the lateral direction. Such profile may provide illumination of lower luminance such as illustrated by regions 520 in FIG. 12A. Light from the second partial region 103B is not diffused by the diffuser 35 and provides an output profile 410B in the direction θy orthogonal to the lateral direction. Such profile may provide illumination of higher luminance such as illustrated by regions 522 in FIG. 12A.

In alternative embodiments, the profile of the diffuser 35 may change across the plane in which the waveguide 1 is extended to achieve increased control of output.

Advantageously increased number of desirable structural elements may be achieved in the output illumination profile.

In embodiments herein with at least two partial regions 103A, 103B, the proportion of output profiles 410A, 410B changes with which of light sources 15a-n are illuminated. In an alternative embodiment the shape of the diffuser 35 region 103A may be provided to achieve desirable angular properties of region 522 with height in FIG. 12B. For example the diffuser may have a rectangular shape or may be a trapezium. Advantageously desirable shape of regions 522 of high luminance and regions 520 of reduced luminance that vary in the lateral direction may be provided.

It may be desirable to increase output luminance and to increase structure of illuminated profile.

Figure 20A:
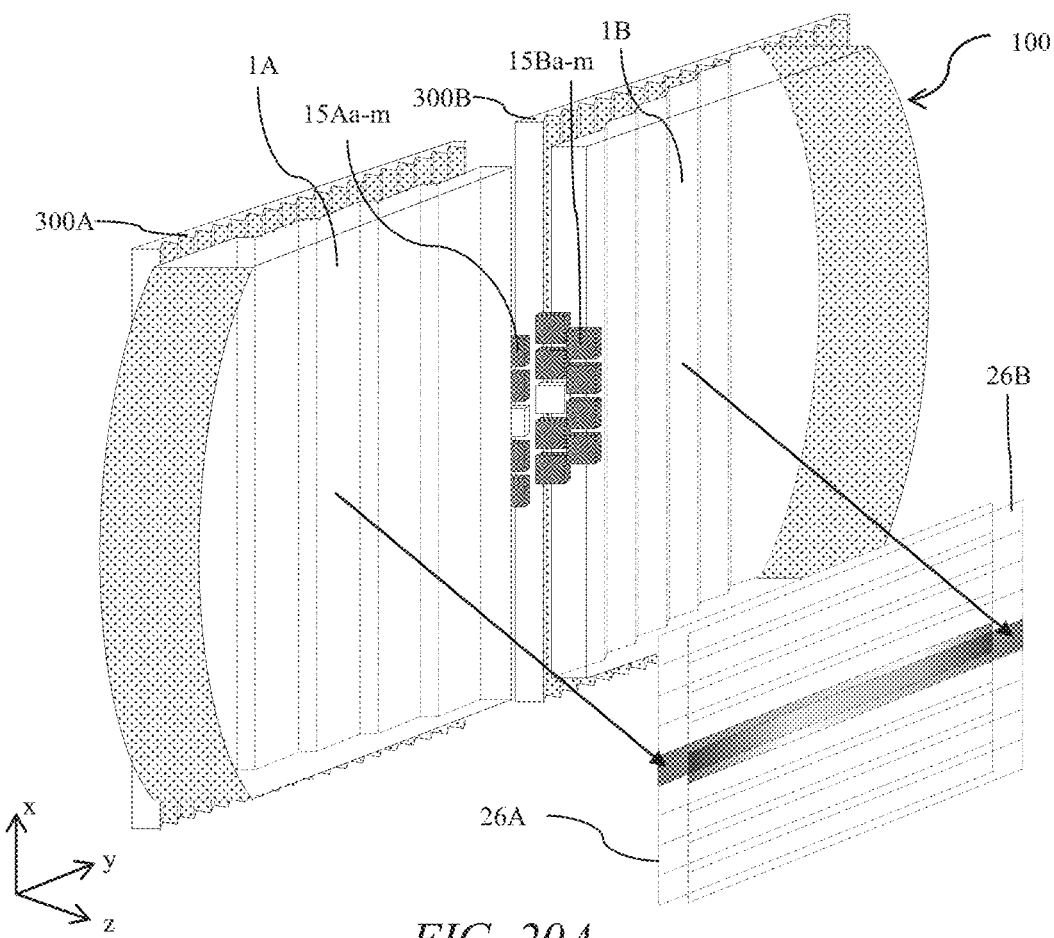
FIG. 20A is a schematic diagram illustrating in front perspective view a directional illumination device comprising two tiled stepped waveguides.

FIG. 20A is a schematic diagram illustrating in front perspective view a directional illumination device 100 comprising two tiled stepped waveguides 1A, 1B. Features of the embodiment of FIG. 20A not discussed in further detail may be assumed to correspond to the features with equivalent reference numerals as discussed above, including any potential variations in the features.

In the alternative embodiment of FIG. 20A, the directional illumination device 100 comprises: plural arrays of light sources 15; and plural waveguides 1A, 1B each comprising: an input surface 2; a reflective end 4; and first and second guide surfaces 6, 8 extending between the input surface 2 and the reflective end 4, wherein in respect of each waveguide: the light sources 15 of a respective array of light sources 15 are arranged to input light into the waveguide 1 through the input surface 2 and are disposed at different input positions in a direction laterally across the waveguide; and the first and second, opposed guide surfaces 6, 8 are arranged to guide input light from the input surface 2 to the reflective end 4 and back along the waveguide 1 after reflection at the reflective end 4, the waveguide 1 being arranged to extract input light as it is guided back along the waveguide 1 and to cause the extracted light to exit through the first guide surface 6; and the reflective end 4 has positive optical power in the direction laterally across the waveguide 1 and the waveguide 1 is arranged to direct the extracted light in respective output illumination directions distributed in a lateral direction in dependence on the input positions of the light sources 15 in the direction laterally across the waveguide, and wherein the first guide surface 6 of each waveguide 1A, 1B faces in a common direction.

In respect of each waveguide 1A, 1B: the first guide surface 6 is arranged to guide light by total internal reflection, and across a region of the waveguide, the second guide surface 8 comprises light extraction features 12 and intermediate regions 10 between the light extraction features 12, the light extraction features 12 being arranged to extract input light by deflecting the input light as it is guided back along the waveguide 1 after reflection at the reflective end 4 in directions causing the deflected light to exit through the first guide surface 6, the intermediate regions 10 being arranged to guide light along the waveguide 1A, 1B without extraction.

In the embodiment of FIG. 20A, the plural waveguides 1A, 1B are oriented so that the lateral directions for respective waveguides, in which the output illumination directions are distributed, are parallel and the plural waveguides 1A, 1B are adjacent and tiled and located in the same location of the vehicle 600, for example a headlight location. In alternative embodiments the plural waveguides 1A, 1B may be located at separate locations on the vehicle 600, for example left and right headlight locations.

In operation, arrays of optical cones 26Aa-n and 26Ba-m are provided by respective light source arrays 15Aa-n and 15Ba-m.

Rear reflectors 300A, 300B are provided to receive light from the second guiding surface 8 as described elsewhere herein.

The light sources 15A, 15B are illustrated between the two waveguides 1A, 1B. Advantageously a common mechanical, thermal and electrical connection apparatus may be provided for both light sources 15A, 15B reducing cost and complexity. Further reflected profiles 410A, 410B may be provided as further described for FIG. 20C below.

In an alternative embodiment (not shown) one of the light sources 15B may be arranged between the waveguides 1A, 1B and waveguide 1A may be arranged between the light source 15B and light sources 15A. The profiles 410A, 410B of FIG. 20C are not reflected and advantageously high angle illuminance in at least one direction may be reduced.

Referring to the control system 130 of FIG. 11 for use in the present embodiments comprising more than one waveguide, the control system 130 may be arranged to control the plural waveguides 1A, 1B together. Advantageously illuminance may be increased. Alternatively the waveguides 1A, 1B may be controlled independently so that control of output illuminance profile may advantageously be modified.

Figure 20B:
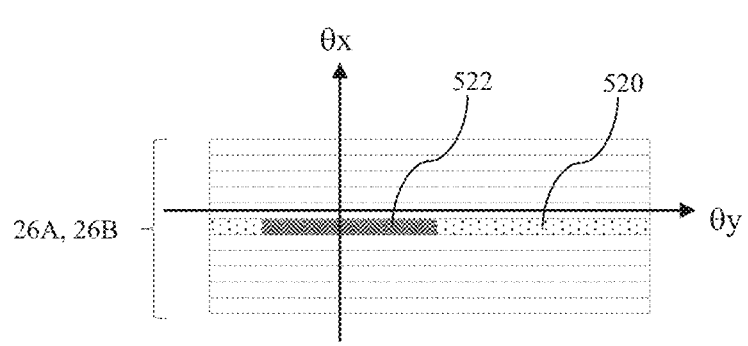
FIG. 20B is a schematic graph illustrating a variation of output luminance with polar angle for the arrangement of FIG. 17A.
Figure 20C:
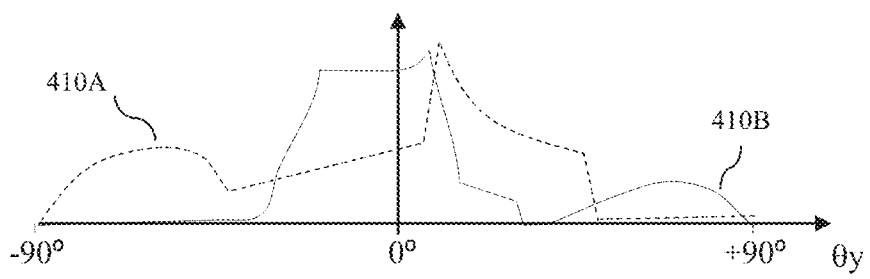
FIG. 20C is a schematic graph illustrating a variation of output luminance with angle in a directional parallel to the lateral direction for the waveguides of FIG. 20A.

FIG. 20B is a schematic graph illustrating a variation of output luminance with polar angle for the arrangement of FIG. 17A. Features of the embodiment of FIG. 20B not discussed in further detail may be assumed to correspond to the features with equivalent reference numerals as discussed above, including any potential variations in the features.

In comparison to the arrangements of FIG. 17A and FIG. 19A the optical cones 26Aa-n and 26Ba-m may be addressed independently. In this manner, control of the structure of illumination profile may be modified in the direction $\theta_y$ orthogonal to the lateral direction by selection of relative luminance of light sources 15Aa-n and 15Ba-m. Advantageously increased control of illuminance profiles 522, 520 may be increased as described elsewhere herein.

FIG. 20C is a schematic graph illustrating a variation of output luminance with angle in a directional parallel to the lateral direction for the waveguides of FIG. 20C. Features of the embodiment of FIG. 20A not discussed in further detail may be assumed to correspond to the features with equivalent reference numerals as discussed above, including any potential variations in the features.

Output profiles 410A, 410B in the direction $\theta_y$ orthogonal to the lateral direction may have different shapes by means of selection of profiles and shapes of features 12A, 12B of the waveguide 1 and of facets 312A, 312B of rear reflectors 300A, 300B and may be reflected about the normal to the waveguide 1. Advantageously increased control of illumination profile regions 520, 522 may be increased.

The plural waveguides are configured to provide output illumination directions having intensity distributions along a length perpendicular to the lateral directions for respective waveguides 1A, 1B, in which the output illumination directions are distributed, that are different for each waveguide 1A, 1B.

Examples of illuminated road scenes will now be provided.

Figure 21A:
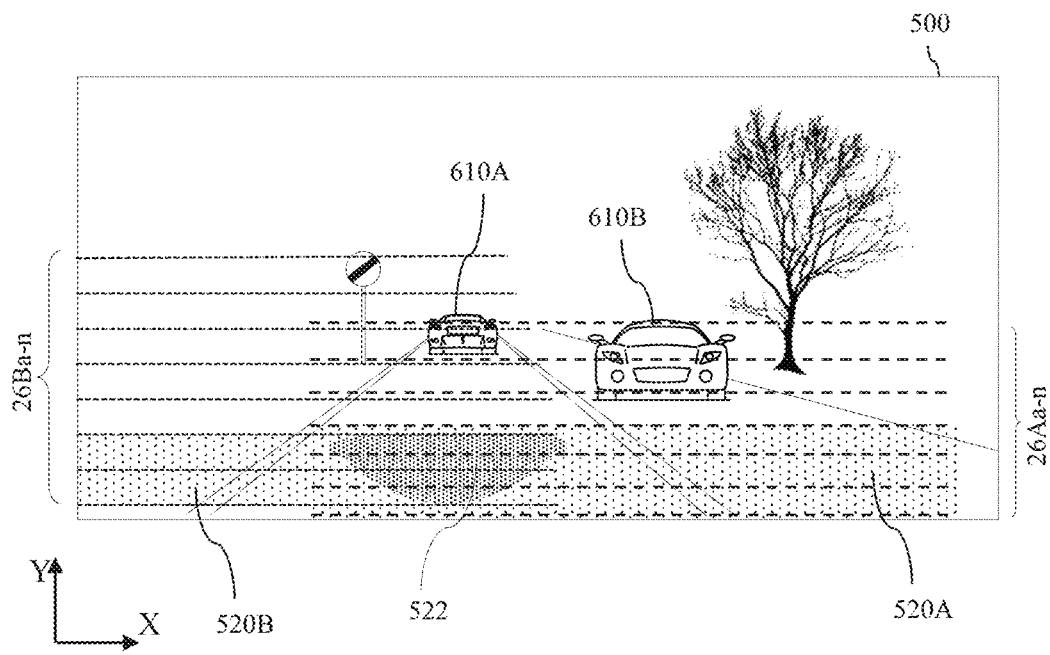
FIG. 21A is a schematic diagram illustrating a view of an illuminated driving scene for an illumination profile of the arrangement of FIG. 20A in a first mode of operation.

FIG. 21A is a schematic diagram illustrating a view of an illuminated driving scene 500 for an illumination profile of the arrangement of FIG. 20A in a first mode of operation. Regions 520A, 520B are illuminated in dip mode of operation when both vehicles 610A, 610B are present. Region 522 may be provided by overlap of the two beams such as illustrated in FIG. 20C.

Figure 21B:
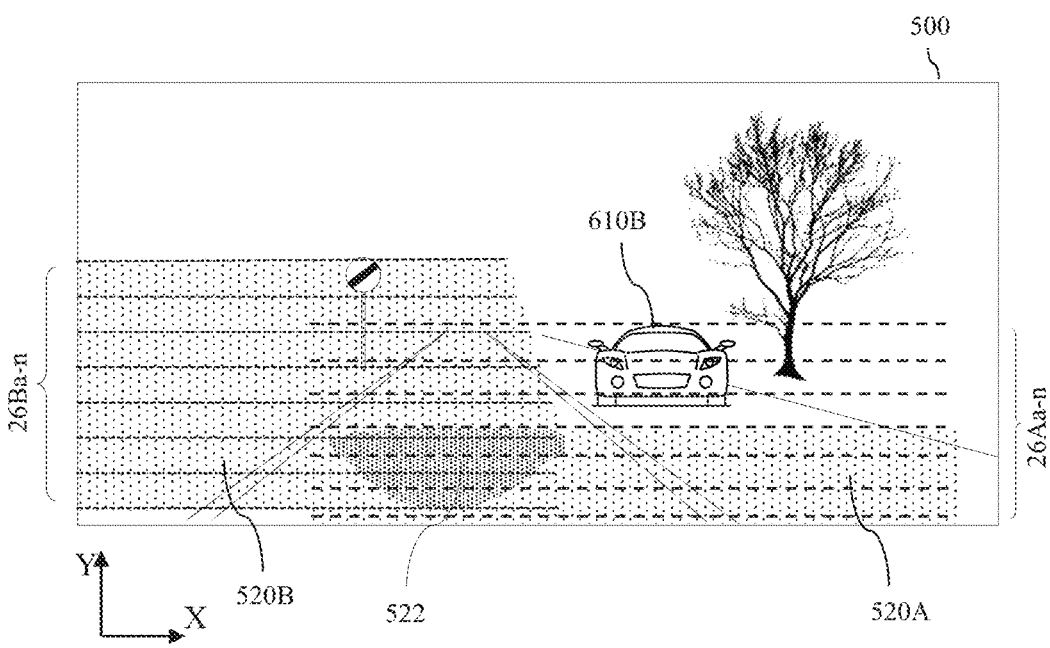
FIG. 21B is a schematic diagram illustrating a view of an illuminated driving scene for an illumination profile of the arrangement of FIG. 20A in a second mode of operation.

FIG. 21B is a schematic diagram illustrating a view of an illuminated driving scene 500 for an illumination profile of the arrangement of FIG. 20A in a second mode of operation.

Regions 520A is illuminated in dip mode of operation for vehicle 610B while region 512B has increased illumination area in comparison to FIG. 21A and increased visibility of road ahead, road furniture and kerb is achieved.

It may be desirable to reduce the area occupied by the illumination apparatus in comparison to the arrangement of FIG. 20A.

Figure 22A:
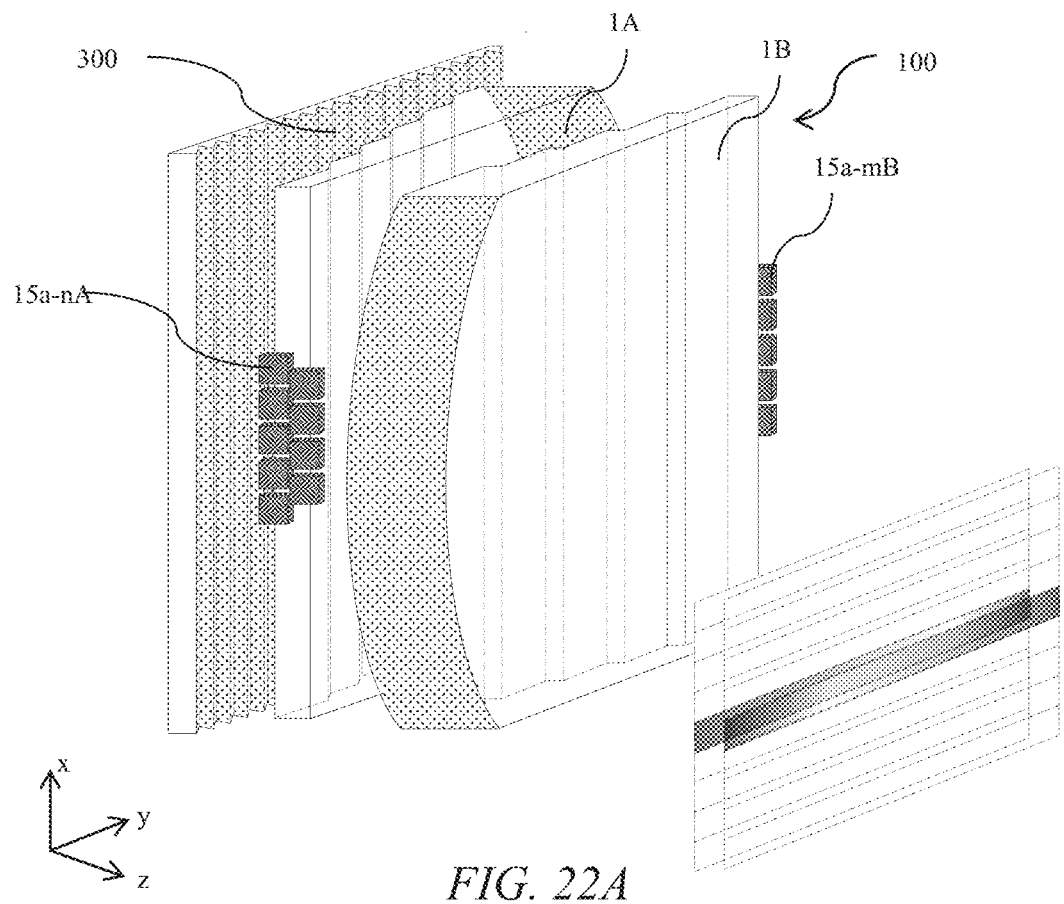
FIG. 22A is a schematic diagram illustrating in front perspective view a directional illumination device comprising two stacked stepped waveguides.
Figure 22B:
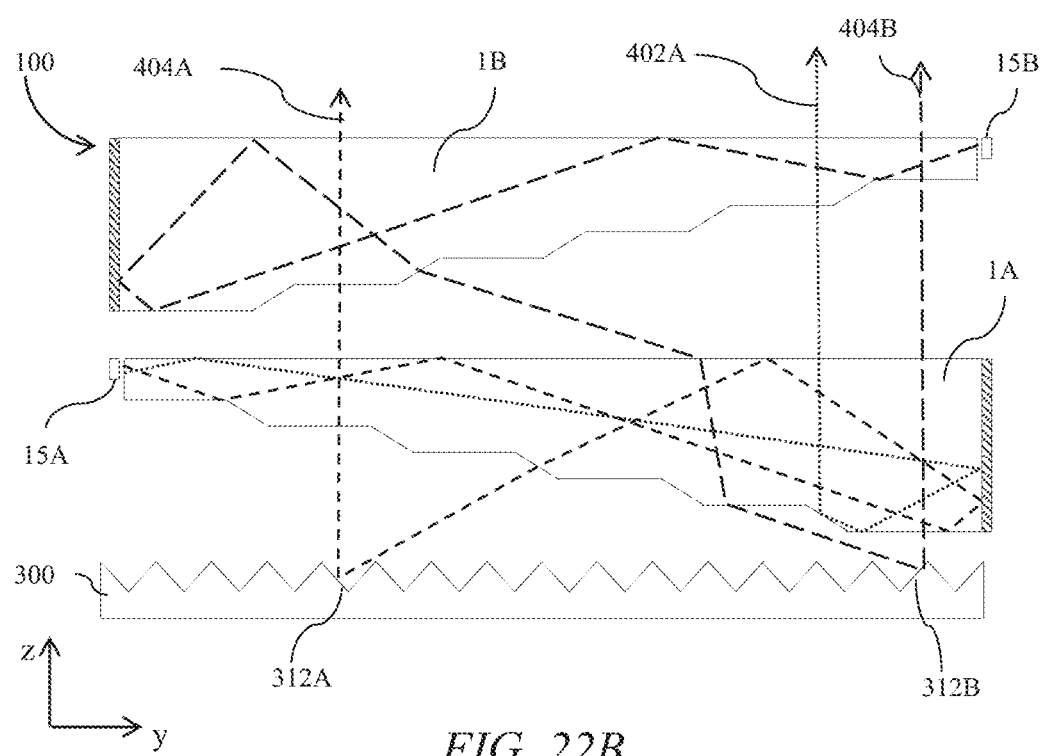
FIG. 22B is a schematic diagram illustrating in side view the directional illumination device of FIG. 22A.

FIG. 22A is a schematic diagram illustrating in front perspective view a directional illumination device 100 comprising two stacked stepped waveguides 1A, 1B; and FIG. 22B is a schematic diagram illustrating in side view the directional illumination device 100 of FIG. 22A. Features of the embodiment of FIGS. 22A-B not discussed in further detail may be assumed to correspond to the features with equivalent reference numerals as discussed above, including any potential variations in the features.

In the alternative embodiment of FIGS. 22A-B, the plural waveguides 1A, 1B are stacked and the plural waveguides 1A, 1B are oriented so that the lateral directions for respective waveguides 1A, 1B in which the output illumination directions are distributed, are parallel.

In operation, light rays 402A are output directly from waveguide 1A and light rays 404A are output after reflection by facets 312A of rear reflector 300. Light rays 402B are output directly from waveguide 1B and light rays 404B are output after reflection by facets 312B of rear reflector 300. Light rays 402B, 404B are substantially transmitted by waveguide 1A with high efficiency. Control of output profiles 410A, 410B may be modified as described for FIG. 20A.

Advantageously visible area of the illumination device 100 is reduced.

The illumination profiles described above achieve one dimensional electronic control of beam profiles 520, 522. It may be desirable to provide control of illuminance profiles in two dimensions for increased fidelity of beam control. Such beam control may be used for adaptive beam cornering or for illuminating ramps such as in multi-storey car parks.

Figure 23:
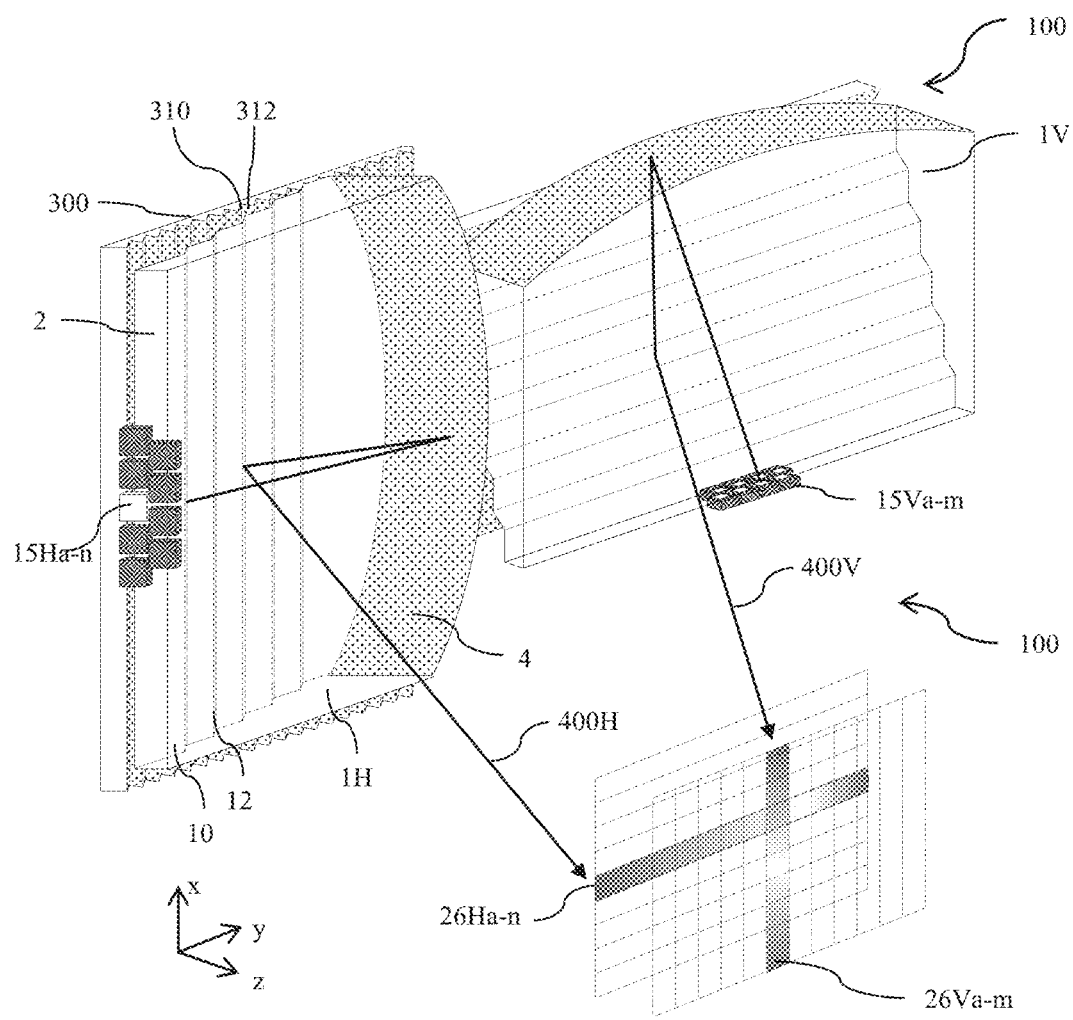
FIG. 23 is a schematic diagram illustrating in front perspective view a directional illumination device comprising two tiled stepped waveguides wherein the stepped waveguides are arranged in orthogonal orientations.

FIG. 23 is a schematic diagram illustrating in front perspective view a directional illumination device 100 comprising two adjacent tiled stepped waveguides 1H, 1V wherein the stepped waveguides 1A, 1B and rear reflectors 300A, 300B are arranged in orthogonal orientations. Features of the embodiment of FIG. 23 not discussed in further detail may be assumed to correspond to the features with equivalent reference numerals as discussed above, including any potential variations in the features. The plural waveguides 1H, 1V are tiled and the plural waveguides are oriented so that the lateral directions for respective waveguides 1H, 1V, in which the output illumination directions are distributed, are perpendicular.

In the alternative embodiment of FIG. 23, output cones 26Ha-n and 26Va-m provided by illumination of light source arrays 15Ha-n and 15Va-m are thus perpendicular.

The operation of the waveguides 1H, 1V and rear reflectors 300H, 300V is as described elsewhere herein.

In alternative embodiments (not shown), the waveguides 1H, 1V may be stacked and the rear reflector may comprise a first array of facets 312H, 310H and a second array of facets 312V, 310V perpendicular to the first array of facets 312H, 310H and formed in a common layer. Such a layer may be tooled by cutting the first array of facets 312H, 310H and cross cutting with the second array of facets 312V, 312H. The tool may be replicated to provide the common layer in a metallised polymer layer.

Various modes of operation of the illumination device 100 of FIG. 23 will now be described.

FIGS. 24A-E are schematic diagrams illustrating a view of an illuminated driving scene 500 for an illumination profile of the arrangement of FIG. 23 in different modes of operation. Features of the embodiments of FIGS. 24A-E not discussed in further detail may be assumed to correspond to the features with equivalent reference numerals as discussed above, including any potential variations in the features.

Figure 24A:
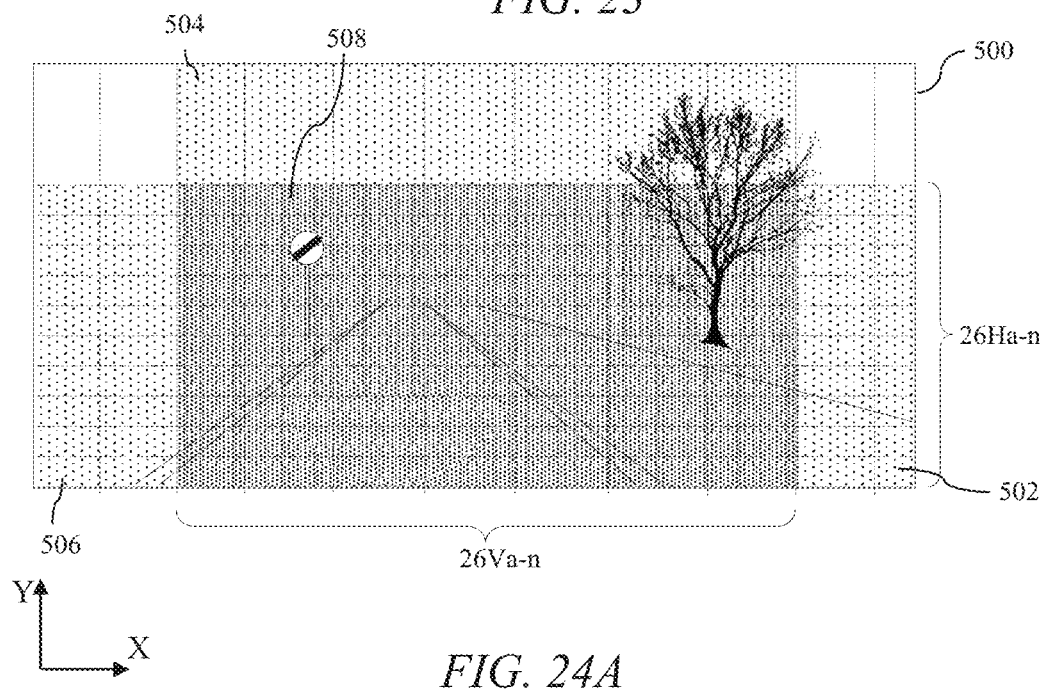
FIG. 24A, FIG. 24B, FIG. 24C, FIG. 24D, and FIG. 24E are schematic diagrams illustrating a view of an illuminated driving scene for an illumination profile of the arrangement of FIG. 23 in different modes of operation.

FIG. 24A illustrates full beam operation of both arrays of light cones 26Ha-n and 26Va-m. Advantageously a large region 508 may be illuminated with high illuminance by overlap of respective cones 26H, 26V. Illumination regions 502, 504 are formed in non-overlap regions of scene 500.

Figure 24B:
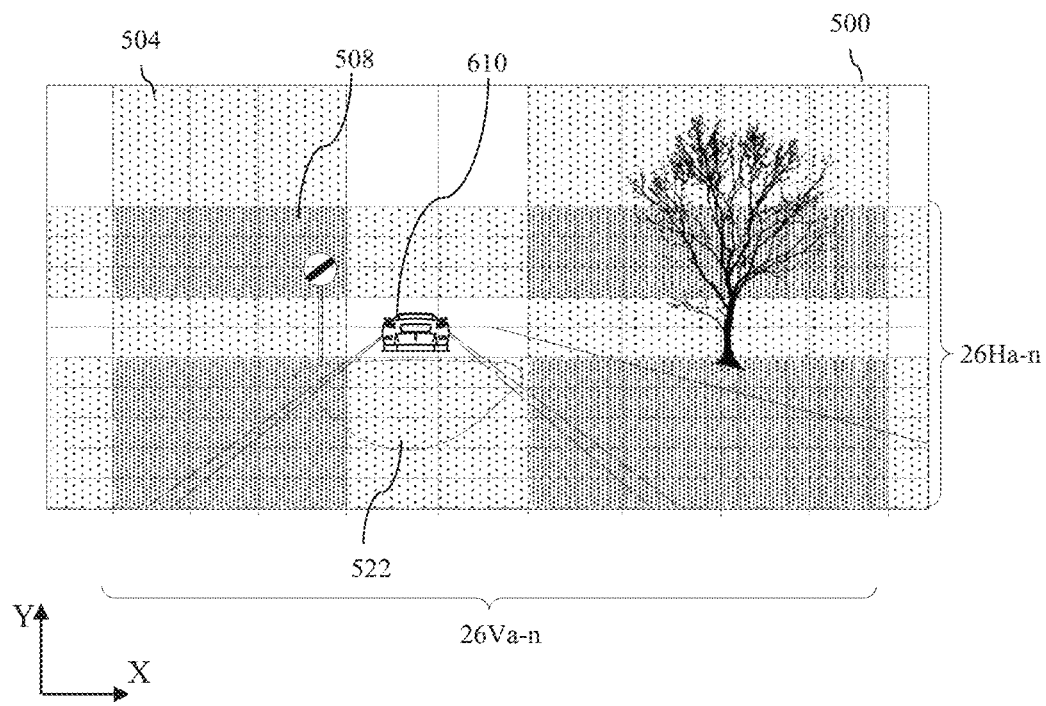
Figure 24C:
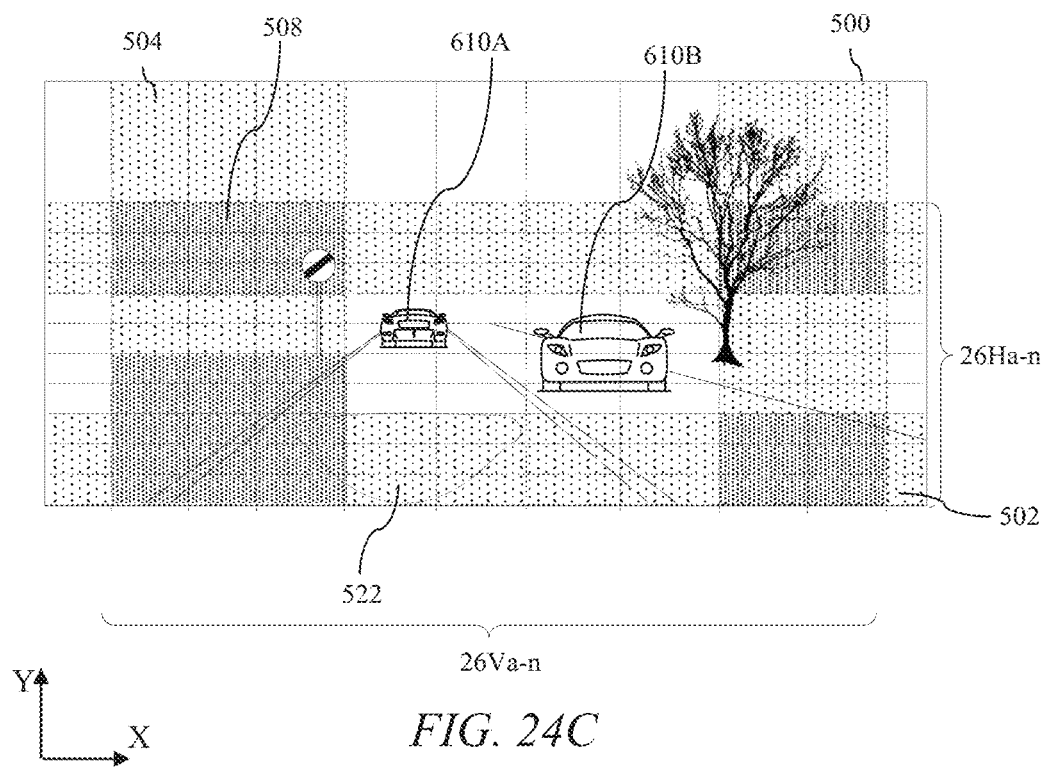

FIG. 24B illustrates anti-dazzle beam operation of both arrays of light cones 26Ha-n and 26Va-m for a vehicle 610A ahead and FIG. 24C illustrates anti-dazzle operation for both vehicles 610A, 610B.

Figure 24D:
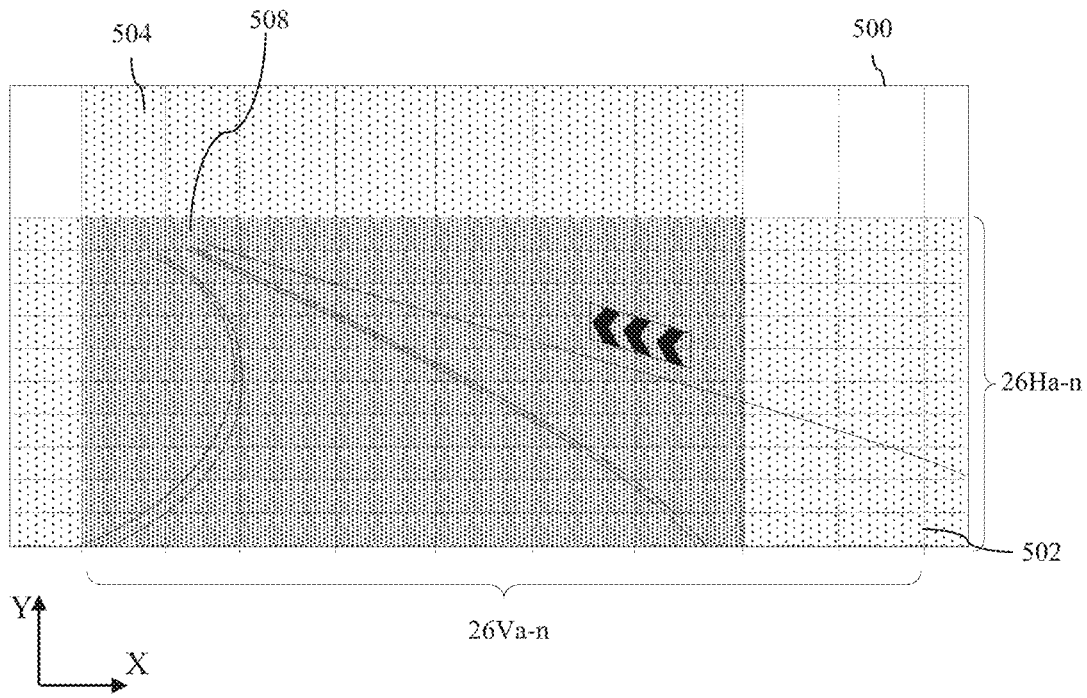
Figure 24E:
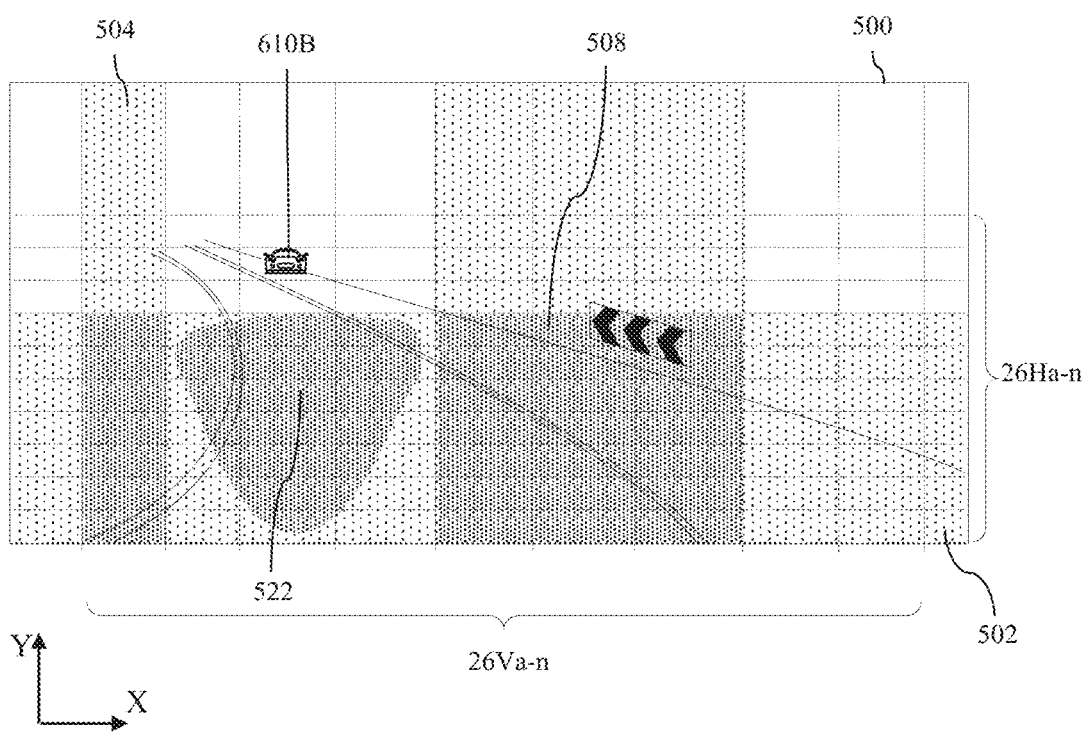

FIG. 24C illustrates beam steering operation of both arrays of light cones 26Ha-n and 26Va-m for a bend ahead in the road and FIG. 24D illustrates beam steering and anti-dazzle operation of both arrays of light cones 26Ha-n and 26Va-m for a bend ahead in the road with and oncoming vehicle 610B.

It may be desirable to provide rotated profiles 520 of illumination.

Figure 25A:
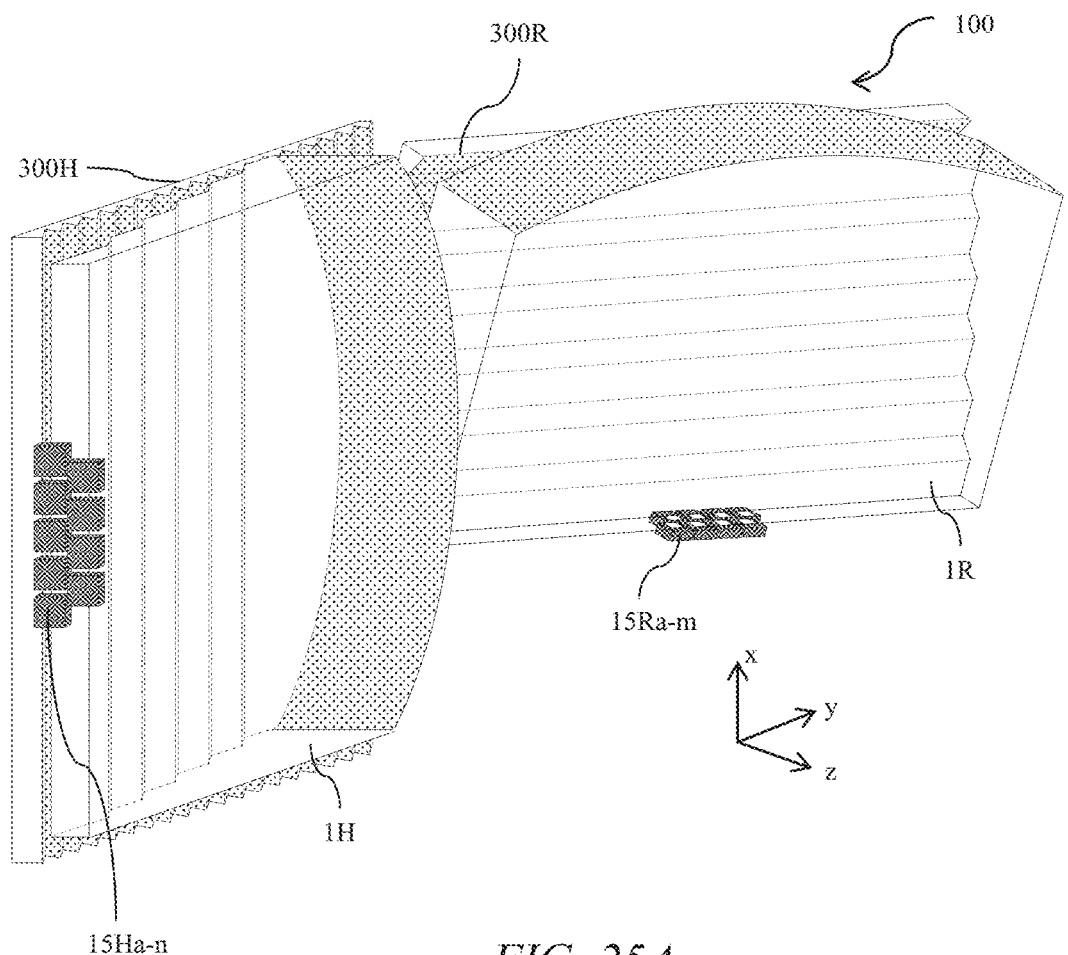
FIG. 25A is a schematic diagram illustrating in front perspective view a directional illumination device comprising two tiled stepped waveguides wherein the stepped waveguides are arranged with different rotations of orientations.
Figure 25B:
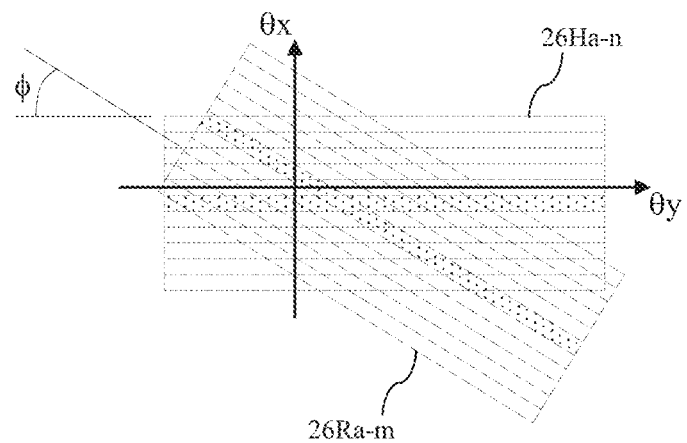
FIG. 25B is a schematic graph illustrating a variation of output luminance with polar angle for the arrangement of FIG. 25A.

FIG. 25A is a schematic diagram illustrating in front perspective view a directional illumination device 100 comprising two tiled stepped waveguides 1H, 1R wherein the stepped waveguides 1H, 1R are arranged with different rotations of orientations; and FIG. 25B is a schematic graph illustrating a variation of output luminance with polar angle for the arrangement of FIG. 25A comprising optical cones 26Ha-n and 26Ra-m illuminated by light source arrays 15Ha-n and 15Ra-m respectively. Features of the embodiment of FIG. 25A not discussed in further detail may be assumed to correspond to the features with equivalent reference numerals as discussed above, including any potential variations in the features.

In the alternative embodiment of FIG. 25A, the plural waveguides 1H, 1R are tiled and the plural waveguides are oriented so that the lateral directions for respective waveguides 1H, 1R, in which the output illumination directions are distributed, are at an acute non-zero angle.

In alternative embodiments (not shown), the waveguides 1H, 1R may be stacked and the rear reflector may comprise a first array of facets 312H, 310H and a second array of facets 312R, 310R at the acute non-zero angle ϕ to the first array of facets 312H, 310H and formed in a common layer. Such a layer may be tooled by cutting the first array of facets 312H, 310H and cutting with the second array of facets 312V, 312H at the acute non-zero angle 4. The tool may be replicated to provide the common layer in a metallised polymer layer. Advantageously area may be reduced.

Figure 25C:
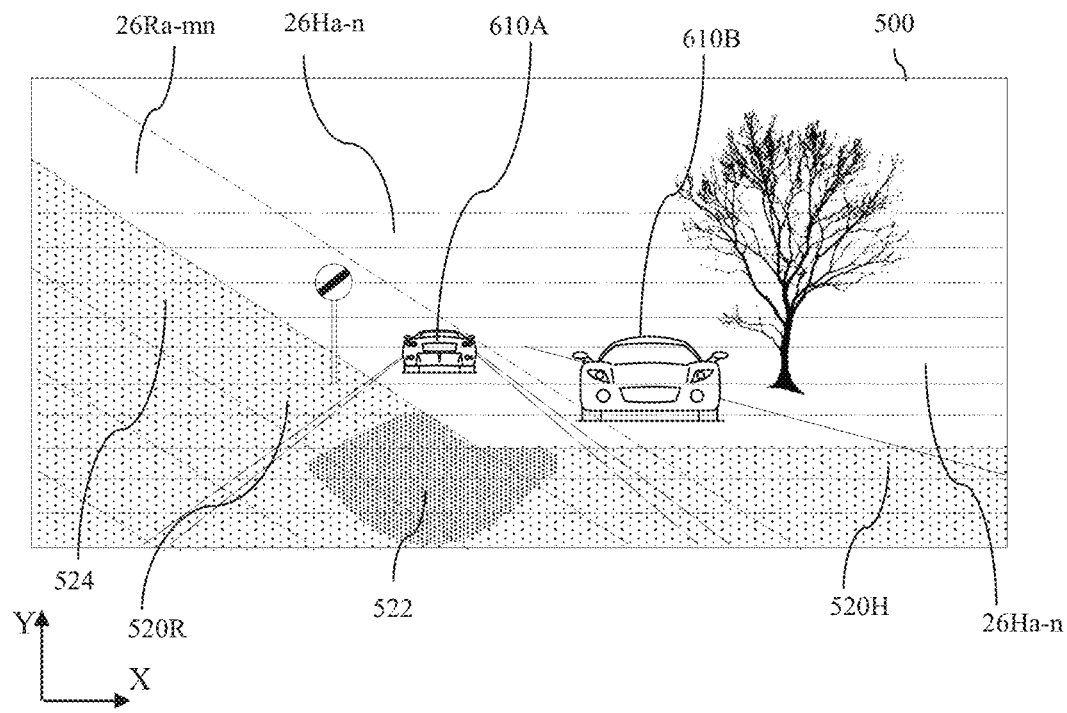
FIG. 25C and FIG. 25D are schematic diagrams illustrating a view of an illuminated driving scene for an illumination profile of the arrangement of FIG. 25A in different modes of operation.
Figure 25D:
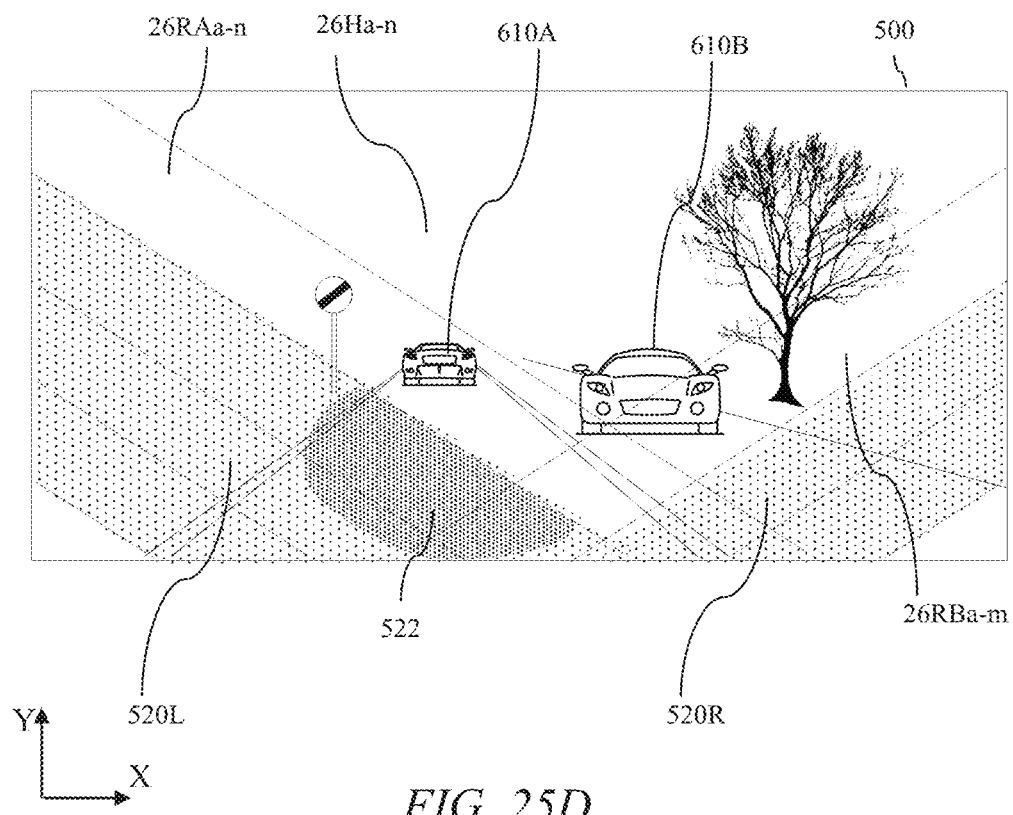

FIGS. 25C-D are schematic diagrams illustrating a view of an illuminated driving scene 500 for an illumination profile of the arrangement of FIG. 25A in different modes of operation.

In the alternative embodiment of FIG. 25C the illumination apparatus of FIG. 25A provides distributions 520H, 520R in a dipped beam mode that includes kick-up region 524 as illustrated in FIG. 18B.

In the alternative embodiment of FIG. 25D the illumination apparatus of FIG. 25A is modified with both waveguides 1 rotated from the horizontal to provide distributions 520RA, 520R2B from light sources 15RAa-n and 15RBa-m respectively. In the illustrated dipped beam mode illumination may be provided to avoid dazzle to both vehicles 610A, 610B. Advantageously enhanced kerb illumination may be provided for both sides.

In an alternative embodiment (not shown) further waveguides 1C may be provided to provide horizontal illumination profiles for example and further increase the structural control of output illumination.

It may be desirable to provide more focused output than that provided by the arrangement of FIG. 1.

Figure 26A:
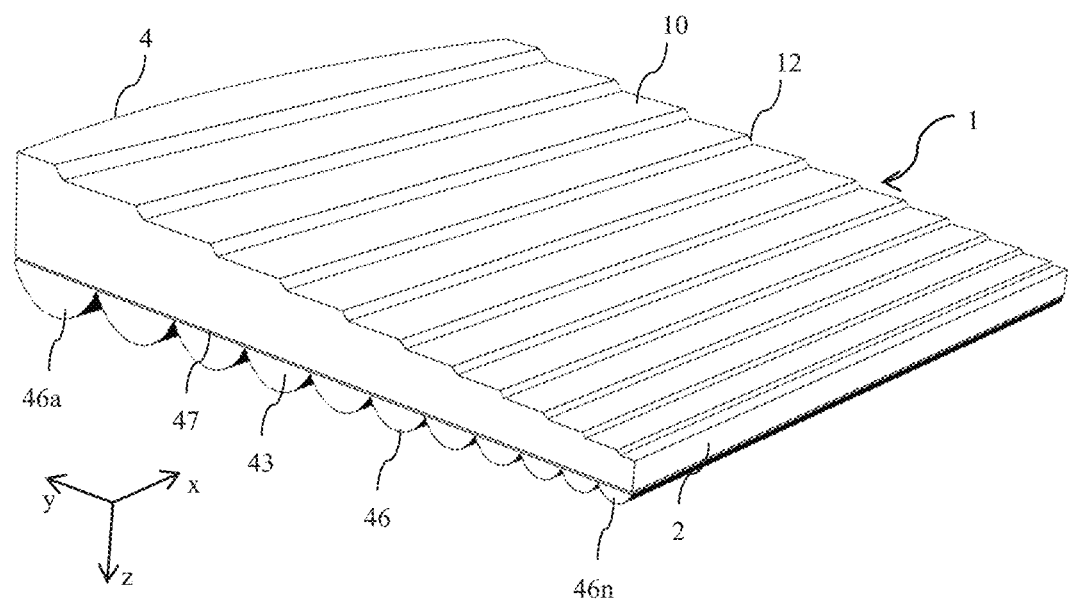
FIG. 26A is a schematic diagram illustrating in perspective rear view a stepped waveguide and aligned lens array.
Figure 26B:
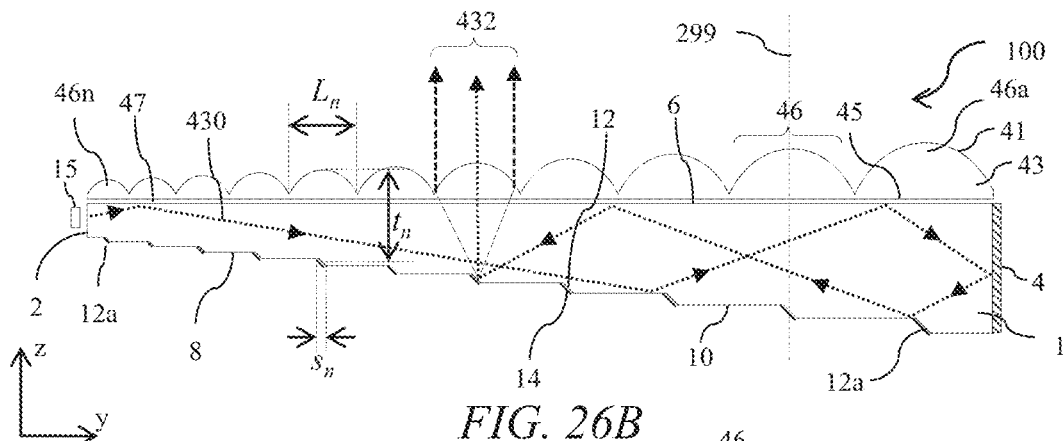
FIG. 26B is a schematic diagram illustrating in side view a directional illumination device comprising the stepped waveguide and aligned lens array of FIG. 26A.

FIG. 26A is a schematic diagram illustrating in perspective rear view a stepped waveguide 1 and aligned component 43 comprising elongate lens elements 46a-n; and FIG. 26B is a schematic diagram illustrating in side view a directional illumination device 100 comprising the stepped waveguide 1 and aligned component 43 of FIG. 26A. Features of the embodiment of FIGS. 26A-B not discussed in further detail may be assumed to correspond to the features with equivalent reference numerals as discussed above, including any potential variations in the features.

The directional illumination device 100 further comprises at least one elongate lens element 46 arranged in front of the first guide surface 6, the elongate lens element axis 299 being aligned with a light extraction feature 12 and arranged to control the distribution of the extracted light 432 in a direction (i.e. in the z-y plane) orthogonal to the lateral direction.

The at least one light extraction feature 12 comprises plural light extraction features 12a-n and the at least one elongate lens element 46 may comprise plural elongate lens elements 46a-n arranged in front of the first guide surface 6, each elongate lens element 46 being aligned with a respective light extraction feature 12a-n.

The plural elongate lens elements 46a-n may have optical powers that increase with increasing distance from the reflective end, such that the distribution of the extracted light from each light extraction feature in a direction orthogonal to the lateral direction is uniform for the extracted light from each respective light extraction feature 12a-n.

In the present disclosure the optical power of a respective elongate lens element 46 is determined by surface 41 profile and refractive index of material between the elongate lens element 46 and light extraction feature 12. The profile 41 of the elongate lens element may be spherical or may be aspherical. Advantageously aberrations may be controlled to provide a desirable output luminance profile. The profile 41 in the z-y plane may be common along the direction in which the elongate lens element 46 is extended or may change along the direction in which the elongate lens element 46 extends. The elongate lens element 46 may comprise a profile 41 that is cylindrical. In the present disclosure, cylindrical is not limited to a section of a cylinder but may define other shapes in a plane such as a Fresnel mirror shape and/or aspheric shape. The elongate lens element 46 may be an element of an array of lens elements 46a-n. The elongate lens elements 46a-n may be lenticular lens elements.

The plural elongate lens elements 46a-n may be provided in a common component 43 extending across the first guide surface 6. The elongate lens elements 46a-n are provided as an integrated body. Advantageously cost and complexity of assembly may be reduced.

The plural elongate lens elements 46a-n may be separate components. Advantageously tooling costs and complexity may be reduced.

Component 43 comprises an input side 45 that is planar. In other alternatives (not shown) the input side 45 may further comprise structured surface such as a further elongate lens array surface.

The at least one elongate lens element 46 is arranged in front of the first guide surface 6 with an air gap 47 therebetween. Air gap 47 is provided between the input side 45 of the lens array and the second light guiding surface 8 of the waveguide 1. Advantageously light guiding within the waveguide 1 is not changed by the component 43.

The output surface 41 of the component 43 comprises an array of elongate lens elements 46. For each elongate lens element 46, the output surface 41 curvature, the width Ln of each lens 46 of the component 43 and the width $s_n$ of the light extraction features 12 vary in the y-direction, corresponding to the change of thickness $t_n$.

In operation, each lens of the component 43 may be arranged to provide an optical cone 432 provided by light rays 430 with substantially the same angular size in the y-direction. Advantageously the luminous intensity may be maximised and far field illuminance of an object correspondingly maximised as will be further described hereinbelow with respect to FIG. 26G.

Alternatively the angular size of the output light cones 26 from each elongate lens element 46 may be arranged to vary along the waveguide 1 to achieve desirable illumination characteristics in the far field.

It may be desirable to reduce the complexity of fabrication of the component 43 and waveguide 1 second light guiding surface 8.

Figure 26C:
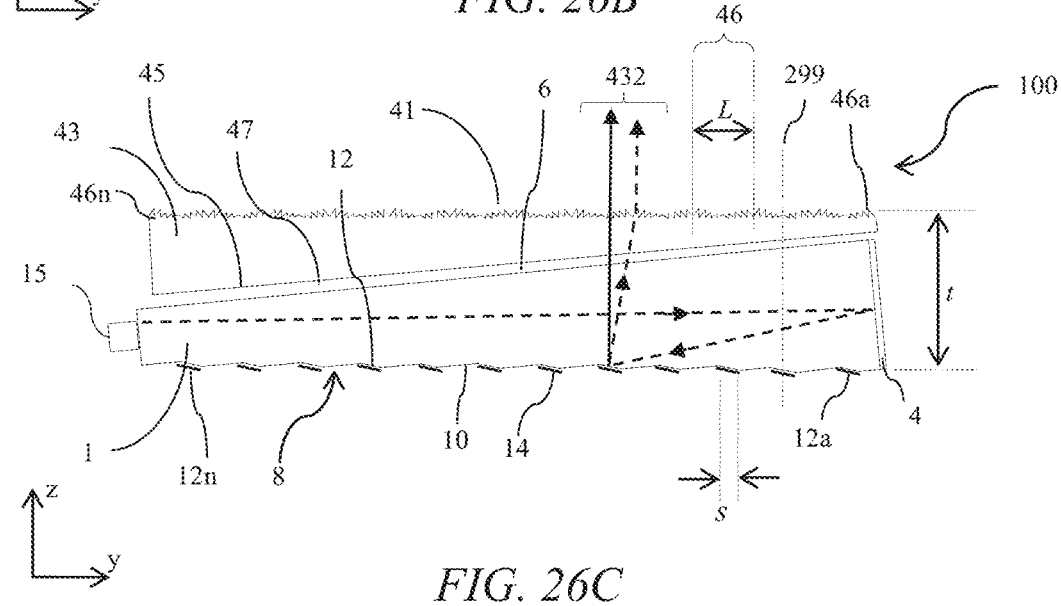
FIG. 26C is a schematic diagram illustrating in side view a directional illumination device comprising a stepped waveguide and an aligned lens array comprising a tapered support substrate.

FIG. 26C is a schematic diagram illustrating in side view a directional illumination device comprising a stepped waveguide 1 and an aligned tapered component 43 wherein the separation of the output surface 41 and input surface 45 varies along the waveguide 1 (y-direction). Features of the embodiment of FIG. 26C not discussed in further detail may be assumed to correspond to the features with equivalent reference numerals as discussed above, including any potential variations in the features.

In comparison to the arrangement of FIG. 26A, the plural elongate lens elements 46a-n may have the same optical power and may be separated from the respective light extraction feature 12a-n with which they are aligned by the same distance. Advantageously cost and complexity may be reduced.

In the alternative embodiment of FIG. 26C, the elongate lens elements 46 may be provided by a Fresnel lens surface. Advantageously thickness may be reduced.

Said taper compensates for the change in thickness of the waveguide 1 in the same direction, such that the separation t between the light extraction features 12 and output surface 41 is substantially the same across the waveguide 1. Further the width s of the light extraction features 12 and width L elongate lens element 46 is constant in the y-direction. Advantageously the complexity of tooling of the waveguide 1 and component 43 is reduced, reducing cost and complexity. The arrays 43 of FIGS. 26A-C advantageously achieve low thickness for the respective illumination devices 100.

It may be desirable to further reduce the complexity of the illumination device 100.

Figure 26D:
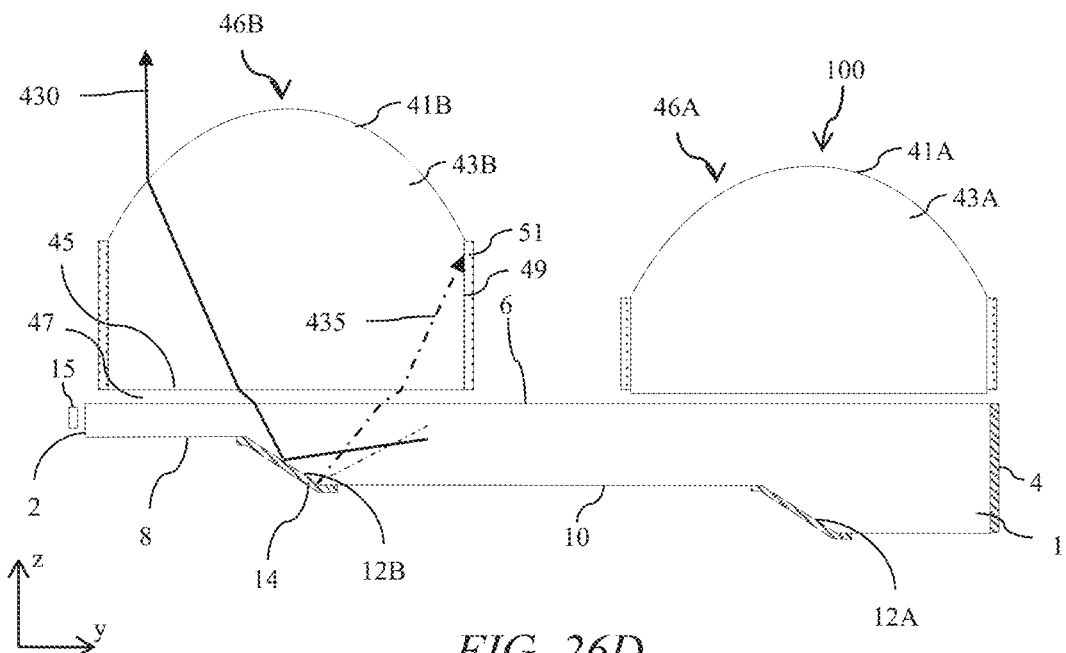
FIG. 26D is a schematic diagram illustrating in side view a directional illumination device comprising a stepped waveguide with two light extraction features and respective pair of aligned lenses.

FIG. 26D is a schematic diagram illustrating in side view a directional illumination device comprising a stepped waveguide 1 with two light extraction features 12A, 12B and respective pair of aligned lenses 43A, 43B. Features of the embodiment of FIG. 26D not discussed in further detail may be assumed to correspond to the features with equivalent reference numerals as discussed above, including any potential variations in the features.

The plural elongate lens elements 46A, 46B may have sides 49 extending away from first light guiding surface 6 of the waveguide 1. The sides 49 may comprise light absorbing material 51. Advantageously the cone angle of output light rays 430 may be reduced. Light rays 435 are absorbed in absorber 51 to advantageously reduce stray light.

In comparison to the embodiments of FIGS. 26A-C the component 43 is not provided as a monolithic array, with lenses 43A, 43B of the array 43 are separated. The separation of the surfaces 41A, 41B from the light extraction features 12A, 12B is provided to be the same, to achieve uniform output directionality.

In another embodiment (not shown) a single light extraction feature 12 and single lens 43 may be provided. Advantageously complexity is reduced.

FIG. 26D further illustrates a light absorbing material 49 may arranged on sides of the lenses 43A, 43B. Advantageously stray light in the far field is reduced. By way of comparison in the embodiments of FIGS. 26A-26B, total internal reflection within the component 43 may advantageously reduce stray light.

It may be desirable to provide high luminous intensity in a narrow hot spot in addition to a wide angular field.

Figure 26E:
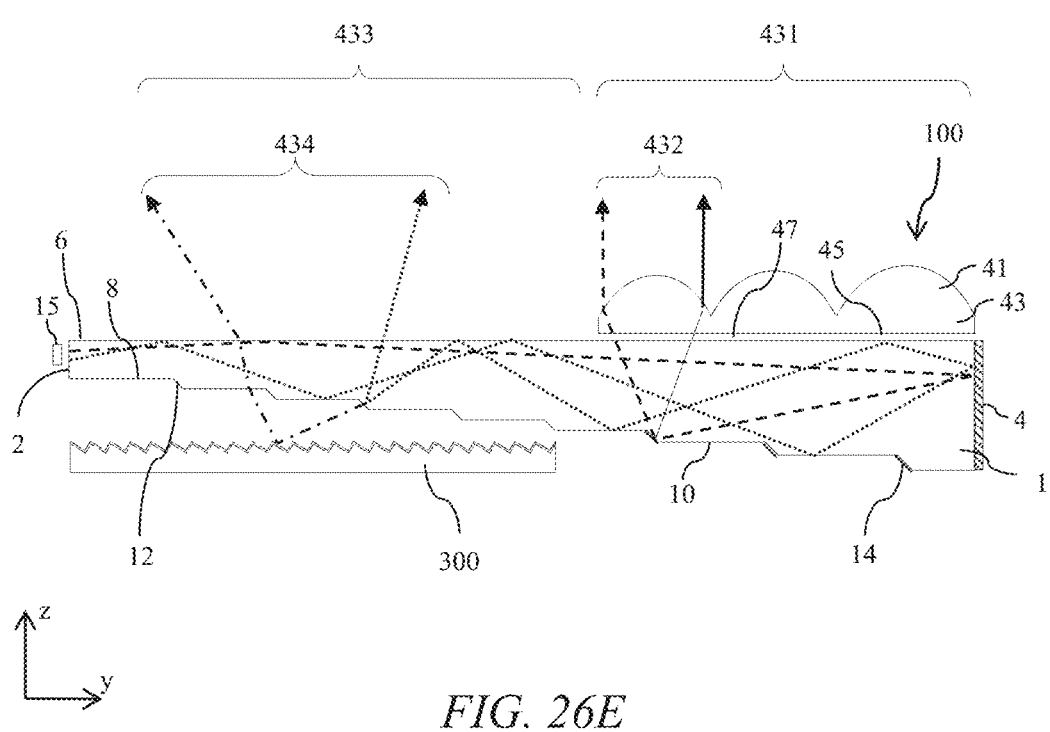
FIG. 26E is a schematic diagram illustrating in side view a directional illumination device comprising a stepped waveguide with a first region comprising an aligned lens array and a second region comprising a rear reflector.

FIG. 26E is a schematic diagram illustrating in side view a directional illumination device 100 comprising a stepped waveguide 1 with a first region 431 comprising an aligned component 43 and a second region 433 further comprising a rear reflector 300 and not comprising component 43. Features of the embodiment of FIG. 26E not discussed in further detail may be assumed to correspond to the features with equivalent reference numerals as discussed above, including any potential variations in the features.

The at least one light extraction feature 12 comprises plural light extraction features, at least one of the light extraction features having no elongate lens element 46 aligned therewith in the region 434.

In operation the light output cone 432 from region 431 may be provided with a narrow angular range and high luminous intensity. Advantageously a hot spot may be provided in the illumination profile. Further light output cone 434 from region 433 may be provided with a wide angular range for example for kerb illumination. Advantageously desirable structured illumination profiles may be provided. Both profiles may advantageously achieve the same control of illumination in the lateral direction (x-axis) as described elsewhere herein.

An illustrative output from the arrangement of FIGS. 26A-B will now be described.

Figure 26F:
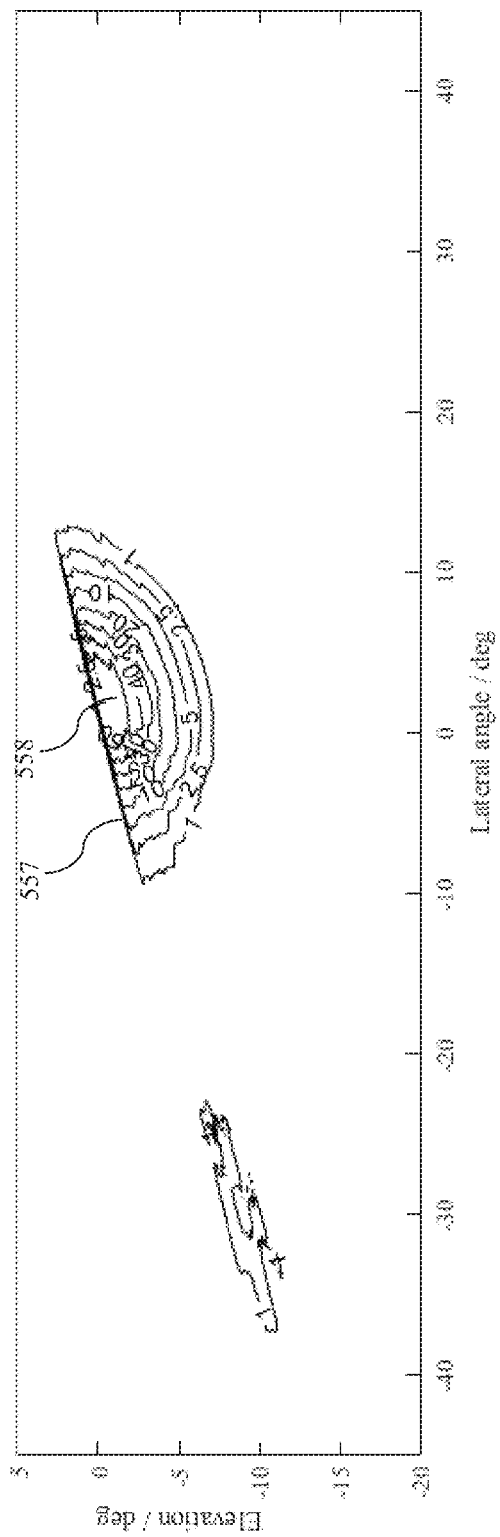
FIG. 26F is a schematic graph illustrating the variation with lateral angle and elevation of illuminance onto a screen placed in the far field of an illustrative illumination device of FIG. 26B with a rotation of 15 degrees about an axis normal to the second light guiding surface.
Figure 26G:
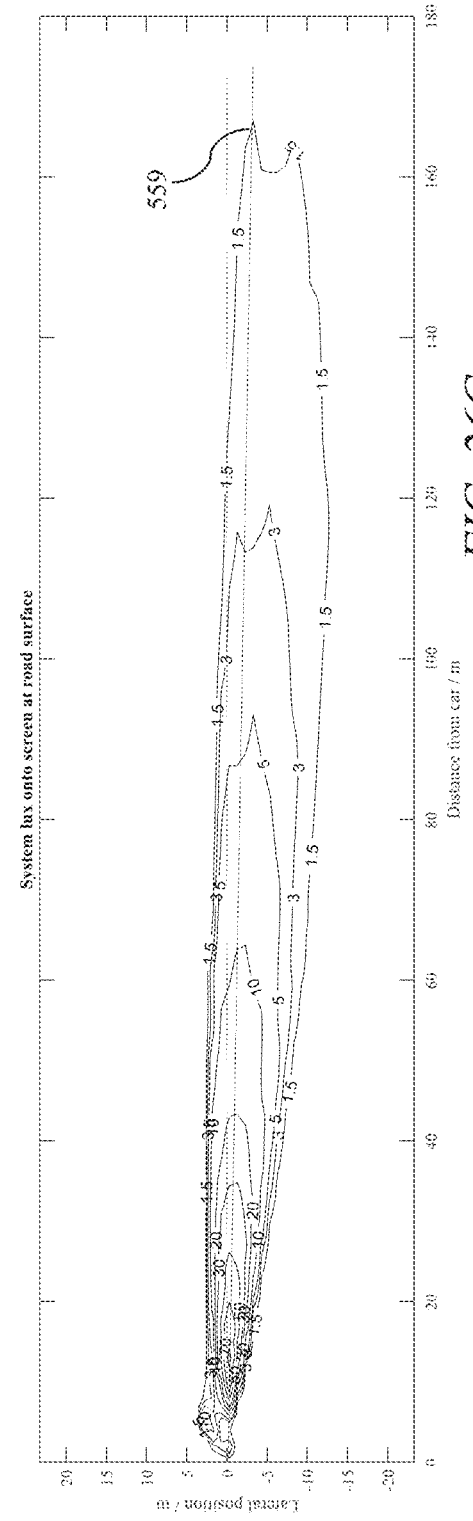
FIG. 26G is a schematic graph illustrating the variation of illuminance at a road surface for the far field illumination profile of FIG. 26F with a headlight positioned 0.75 m above the road surface.

FIG. 26F is a schematic graph illustrating the variation with lateral angle and elevation of illuminance onto a screen placed in the far field of an illustrative illumination device of FIG. 26B with a rotation of 15 degrees of the illumination device 100 about an axis normal to the second light guiding surface 8; and FIG. 26G is a schematic graph illustrating the variation of illuminance at a road surface for the far field illumination profile of FIG. 26F with a headlight positioned 0.75 m above the road surface.

The luminous intensity profile of FIG. 26F illustrates a hot spot 558 and horizon 557.

In comparison to the far field luminous intensity of hotspot 552 of FIG. 6B, the luminous intensity of the hot-spot 558 is substantially higher for the same input luminous flux from the array 15 of light sources. In comparison to the road illumination profile of FIG. 6C, this advantageously achieves increased distance of desirable road illuminance in the hot spot direction 559.

A desirable dip beam profile will now be illustrated combining the outputs of an arrangement of different luminous intensity profiles.

Figure 26H:
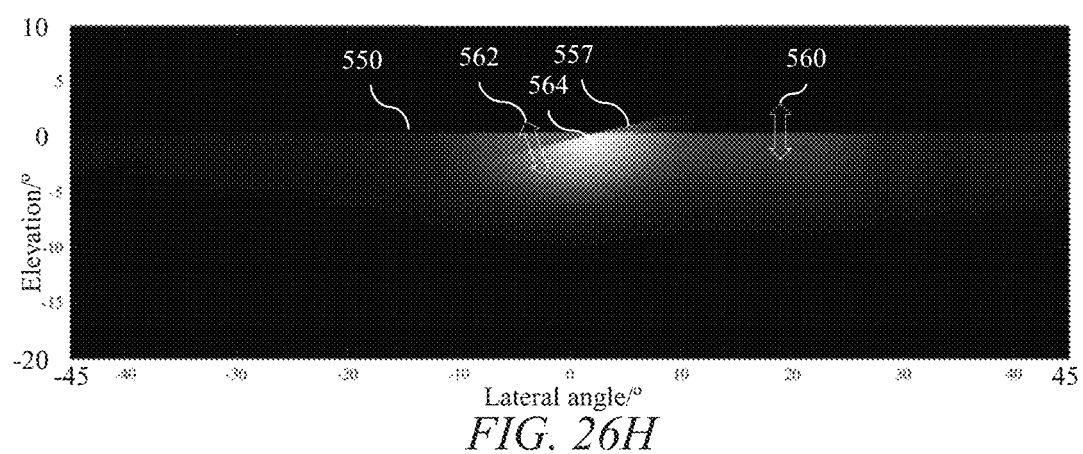
FIG. 26H is a simulated image illustrating the variation with lateral angle and elevation of illuminance onto a screen placed in the far field of an illustrative illumination device comprising the illumination device of FIG. 1 and the illumination device of FIG. 26B with a rotation of 15 degrees about an axis normal to the second light guiding surface.
Figures 26I, 26J:
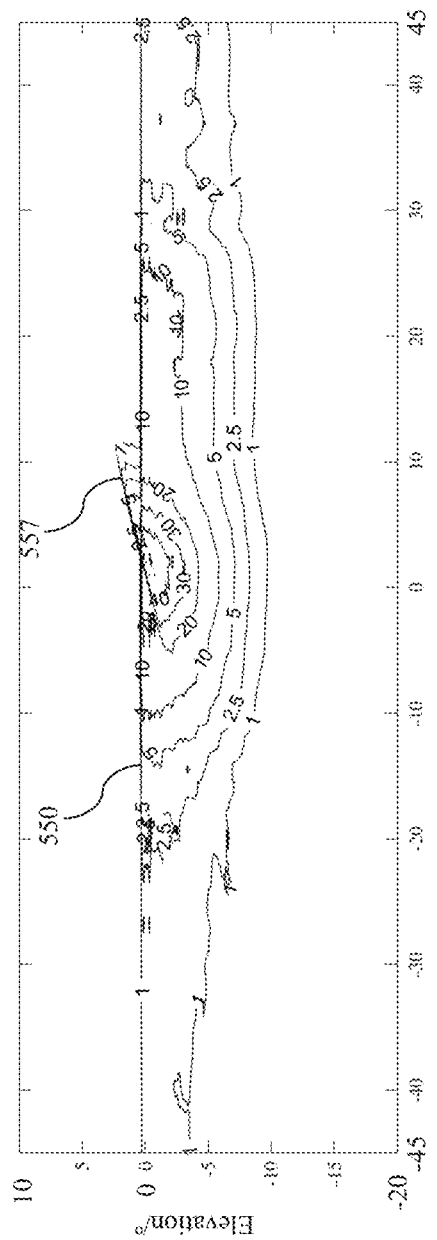
FIG. 26I is a schematic graph illustrating the variation with lateral angle and elevation of illuminance onto a screen placed in the far field of an illustrative illumination device comprising the illumination device of FIG. 1 and the illumination device of FIG. 26B with a rotation of 15 degrees about an axis normal to the second light guiding surface.
FIG. 26J is a schematic graph illustrating the variation of illuminance at a road surface for the far field illumination profile of FIG. 26I with a headlight positioned 0.75 m above the road surface.

FIG. 26H is a simulated image and FIG. 26I is a schematic graph illustrating the variation with lateral angle and elevation of illuminance onto a screen placed in the far field of an illustrative illumination device 100 comprising a first illumination device 100A of FIG. 1 and a second illumination device 100B of FIG. 26B with a rotation of 15 degrees about an axis normal to the second light guiding surface; and FIG. 26J is a schematic graph illustrating the variation of illuminance at a road surface for the far field illumination profile of FIG. 26I with a headlight positioned 0.75 m above the road surface.

Advantageously high illuminance is achieved on the road side of the driver as illustrated by direction 559, increased illuminance is directed onto the kerb as illustrated by direction 553 and reduced illuminance is achieved on the side of the road with oncoming traffic as illustrated by direction 555.

During operation, the location of the horizons 550, 557 may be adjusted by means of light source array 15 control. The direction of control is illustrated by arrows 560, 562 in FIG. 26H. Advantageously desirable illumination directions may be provided by control of horizons 550, 557 and hotspot 560 at or near the overlap of the two profiles.

An illustrative embodiment comprising optical cones 26 that have a vertical alignment will now be described.

Figure 26L:
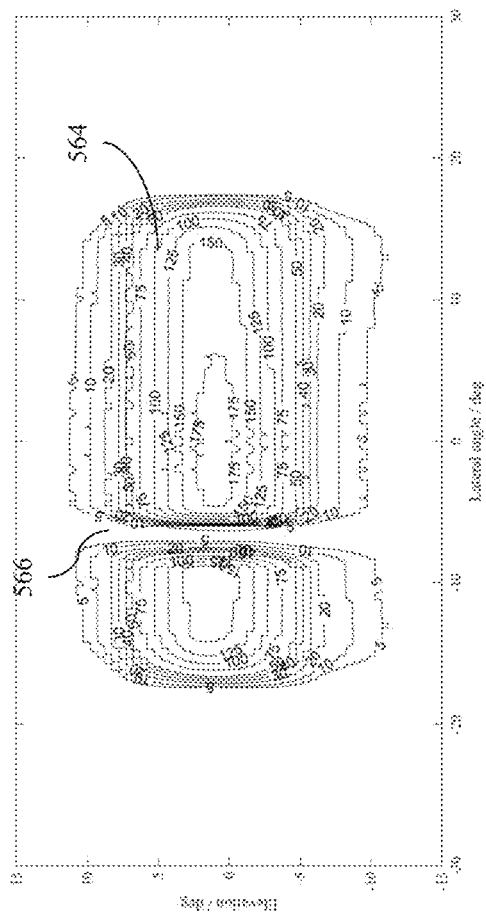
FIG. 26L is a schematic graph illustrating the variation with lateral angle and elevation of illuminance onto a screen placed in the far field of an illustrative illumination device comprising the illumination device of FIG. 26B with a rotation of 90 degrees about an axis normal to the second light guiding surface.
Figure 26K:
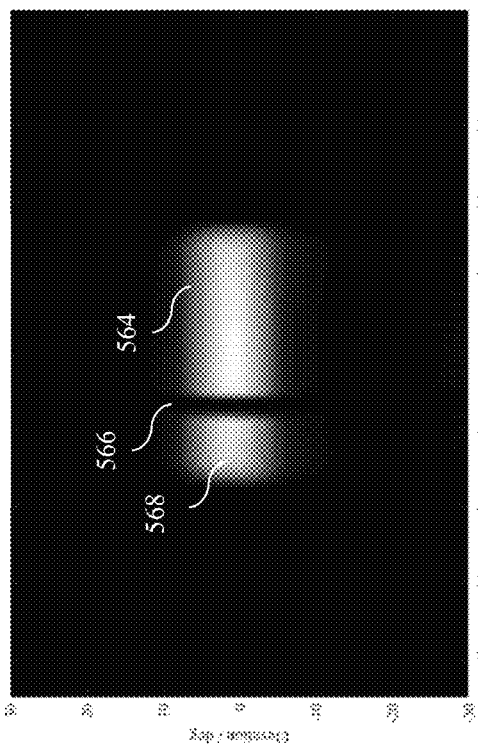
FIG. 26K is a simulated image illustrating the variation with lateral angle and elevation of illuminance onto a screen placed in the far field of an illustrative illumination device comprising the illumination device of FIG. 26B with a rotation of 90 degrees about an axis normal to the second light guiding surface.
Figure 26M:
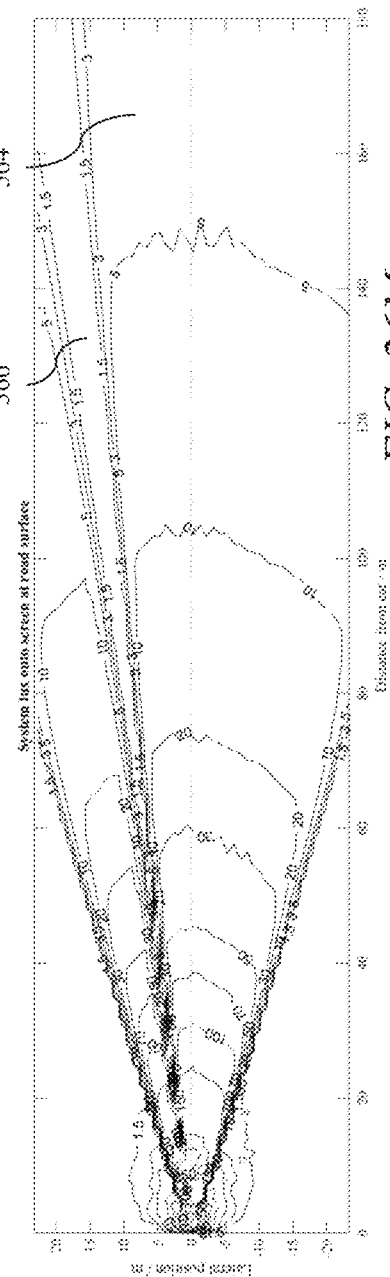
FIG. 26M is a schematic graph illustrating the variation of illuminance at a road surface for the far field illumination profile of FIG. 26L with a headlight positioned 0.75 m above the road surface.

FIG. 26K is a simulated image and FIG. 26L is a schematic graph illustrating the variation with lateral angle and elevation of illuminance onto a screen placed in the far field of an illustrative illumination device comprising the illumination device of FIG. 26B with a rotation of 90 degrees about an axis normal to the second light guiding surface 8; and FIG. 26M is a schematic graph illustrating the variation of illuminance at a road surface for the far field illumination profile of FIG. 26L with a headlight positioned 0.75 m above the road surface.

For illustrative purposes one light source of an array of illuminated light sources is provided with no luminous flux output to provide illumination slot 566 within illuminated regions 564. Advantageously a high beam profile may be achieved with reduced illuminance in desirable directions for oncoming vehicles as will be described further hereinbelow.

In other embodiments (not shown), part of the illumination cones, for example represented by cone 568 may be adjusted in pointing direction. Advantageously total power consumption may be reduced.

Another high luminance output structure will now be described.

Figure 27A:
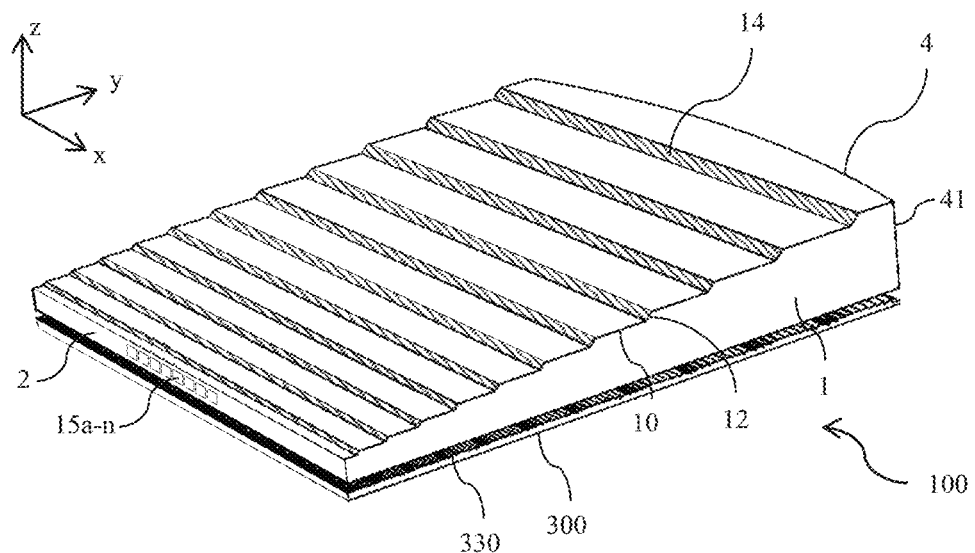
FIG. 27A is a schematic diagram illustrating in side perspective view a directional illumination device comprising a stepped waveguide with transparent light guiding regions and coated reflective facets arranged to direct light towards a collimating rear reflector.
Figure 27B:
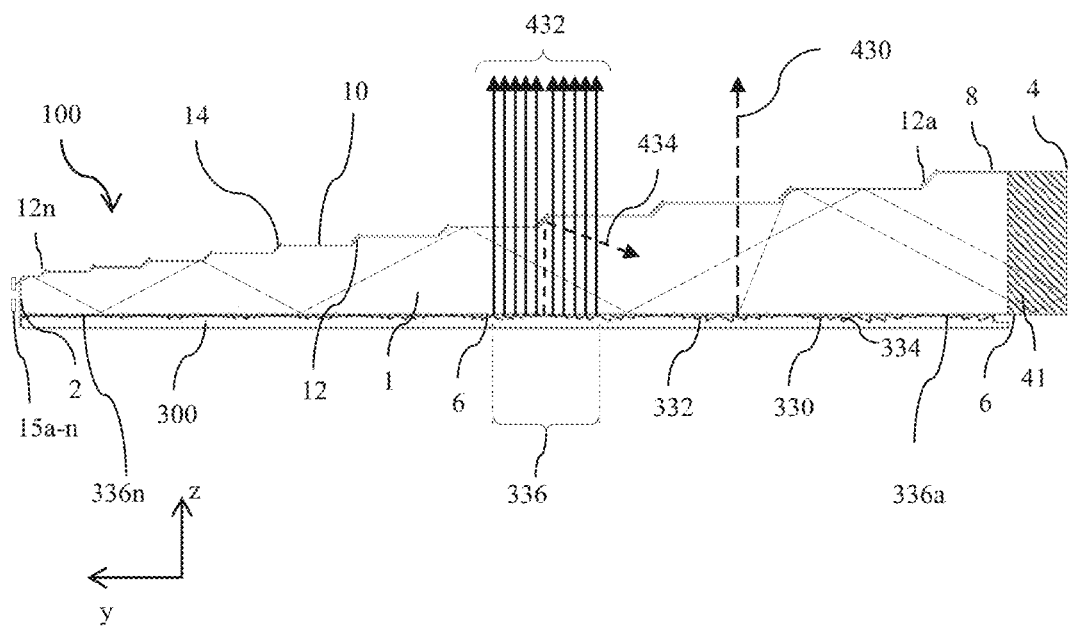
FIG. 27B is a schematic diagram illustrating in side view the directional illumination device of FIG. 27A.

FIG. 27A is a schematic diagram illustrating in side perspective view a directional illumination device comprising a stepped waveguide with transparent light guiding regions and coated reflective facets arranged to direct light towards a collimating rear reflector; and FIG. 27B is a schematic diagram illustrating in side view the directional illumination device of FIG. 27A. Features of the embodiment of FIG. 27A and FIG. 27B not discussed in further detail may be assumed to correspond to the features with equivalent reference numerals as discussed above, including any potential variations in the features.

In the alternative of FIG. 27A, the directional illumination device 100 further comprises a reflective element 300 extending across the first guide surface 6 that is arranged to reflect the extracted light back through the waveguide 1 so that it is output in an output direction that is forwards of the second guide surface 8.

The directional illumination device 100 comprises a reflective element 300 extending across the first guide surface 6 that is arranged to reflect the extracted light rays 430 back through the waveguide 1 so that it is output as rays 432 in an output direction that is forwards of the second guide surface 8. The reflective element 300 provides at least one elongate mirror element 336 arranged in front of the first guide surface 6, the elongate mirror element 336 being aligned with a light extraction feature 12 and arranged to control the distribution of the extracted light in a direction orthogonal to the lateral direction (y-z plane). In the embodiment an array 336a-n of elongate mirror elements is illustrated in alignment with light extraction features 12a-n respectively.

The at least one light extraction feature 12 comprises plural light extraction features 12a-n and the at least one elongate mirror element 336 may comprise plural elongate mirror elements 46a-n, each elongate mirror element 336 being aligned with a respective light extraction feature 12a-n.

The plural elongate mirror elements 336a-n may have optical powers that increase with increasing distance from the reflective end 4, such that the distribution of the extracted light from each light extraction feature 12 in a direction orthogonal to the lateral direction is uniform for the extracted light from each respective light extraction feature 12a-n.

In the present disclosure the optical power of a respective elongate mirror element 336 is determined by surface 41 profile and refractive index of material between the elongate mirror element 336 and light extraction feature 12. The profile of the elongate mirror element 336 may be spherical or may be aspherical. Advantageously aberrations may be controlled to provide a desirable output luminance profile.

The profile in the z-y plane may be common along the direction in which the elongate mirror element 336 is extended or may change along the direction in which the elongate mirror element 336 extends.

The elongate mirror element 336 may comprise a profile that is cylindrical. The elongate mirror element 336 may be an element of an array of mirror elements 336a-n. The elongate mirror elements 46a-n may be lenticular mirror elements.

The plural elongate mirror elements 336a-n may be provided in a common component 300 extending across the first guide surface 6. Advantageously cost and complexity of assembly may be reduced. In alternative embodiments, the plural elongate mirror elements 336a-n may be separate components. Advantageously tooling costs and complexity may be reduced.

At least one light extraction feature 12 has a reflective surface, that is a surface with a reflective coating in comparison to other embodiments herein wherein reflection is provided by total internal reflection. In comparison to the arrangement of FIG. 1, the light extraction features 12 are coated with a reflective material 14 such as silver, aluminium or ESR™ from 3M corporation. Further the second light guiding surface 8 with light extraction features 12 and light guiding features 10 is arranged on the output side of the waveguide 1. The first surface 6 is arranged between the second surface 8 and rear reflector 300. Rear reflector 300 comprises a reflective side 330 with an array of elongate mirror elements 336 each comprising reflective facets 332 and draft facets 334 between the reflective facets 332. Each elongate mirror element 336 is aligned to a respective light extraction feature 12. The reflective facets 332 are elongate in the direction parallel to the respective aligned light extraction features 12.

In operation, light rays 430 from the input light sources 15a-n are transmitted through the input side, are guided along the waveguide 1, are reflected by the reflective end 4 and are guided back towards the light sources 15a-n by means of total internal reflection at side 6 and transparent light guiding features 10.

Some of the light rays 430 that are incident on the light extraction features 12 are reflected towards the surface 6 and are transmitted onto the elongate mirror elements 336 of the rear reflector 300. For each elongate mirror element 336, the reflective facets 332 are arranged to direct light reflected at the respective aligned light extraction feature 12 in a substantially parallel direction, to form output light ray bundle 432 for each location within the light extraction feature 12. The ray bundle 432 is transmitted by the surface 6, 8 of the waveguide 1.

Some light rays 434 that are reflected by the rear reflector 300 are incident onto the respective aligned light extraction feature 12. Such light rays are recirculated within the waveguide 1.

The light ray bundle 432 may have a narrow cone angle in the z-y plane with an angular size that is determined by the refractive index of the waveguide 1, the size of the light extraction feature 12 and the thickness of the waveguide 1 at the respective aligned light extraction feature 12. Further the light ray bundle may have an angular size in the z-x plane that is determined as shown elsewhere herein. A degree of collimation, that is reduction in cone 26 angle, may thus be achieved in two dimensions. Advantageously stray light may be reduced and increased luminous intensity provided in desirable directions of illumination. Control of illumination directions may be provided as described elsewhere herein.

In other embodiments, rear reflector 300 may comprise other mirror structures, such as diffuser mirrors or a plane mirror. Advantageously increased angle of illumination output may be provided with desirable luminance profiles in the direction orthogonal to the lateral direction (y-axis).

Figure 27C:
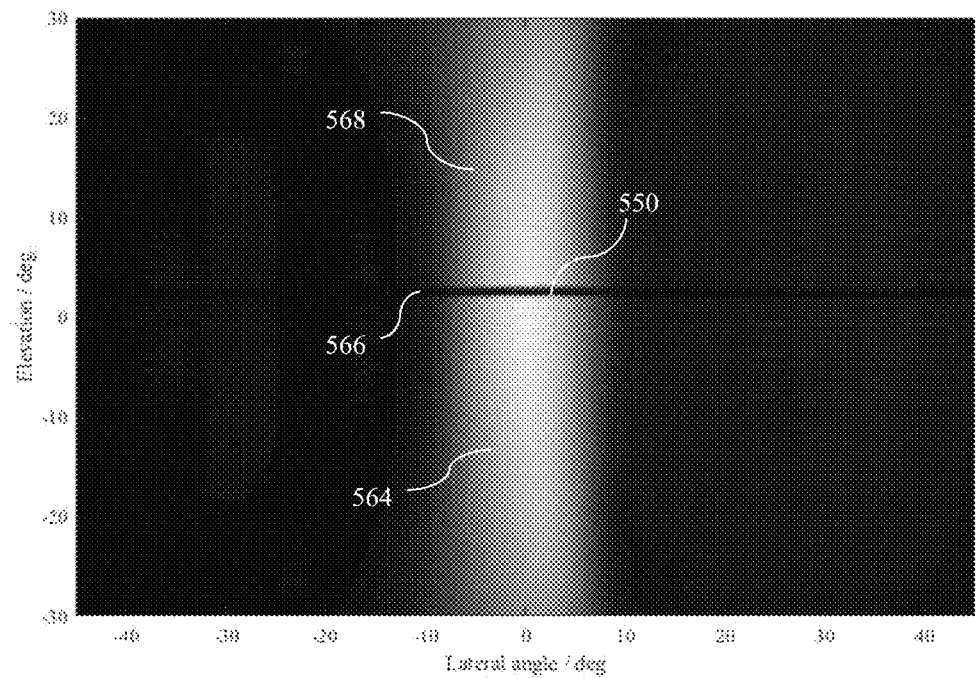
FIG. 27C is a simulated image illustrating the variation with lateral angle and elevation of illuminance onto a screen placed in the far field of an illustrative illumination device of FIG. 27B.

FIG. 27C is a simulated image illustrating the variation with lateral angle and elevation of illuminance onto a screen placed in the far field of an illustrative illumination device of FIG. 27B. FIG. 27C is similar to that illustrated in FIG. 26K, however the optical cones are arranged with illustrative horizontal horizon 550 provided by a non-illuminated light source.

In operation, region 564 may be provided in dip mode, and region 568 may be provided for main beam operation. Region 566 may be dimmed to minimise glare for an oncoming driver near to the horizon direction. Advantageously an adjustable dip beam may be provided as described elsewhere herein.

It may be desirable to reduce the complexity of fabrication of the mirror array 43 and waveguide 1 first light guiding surface 6.

Figure 27D:
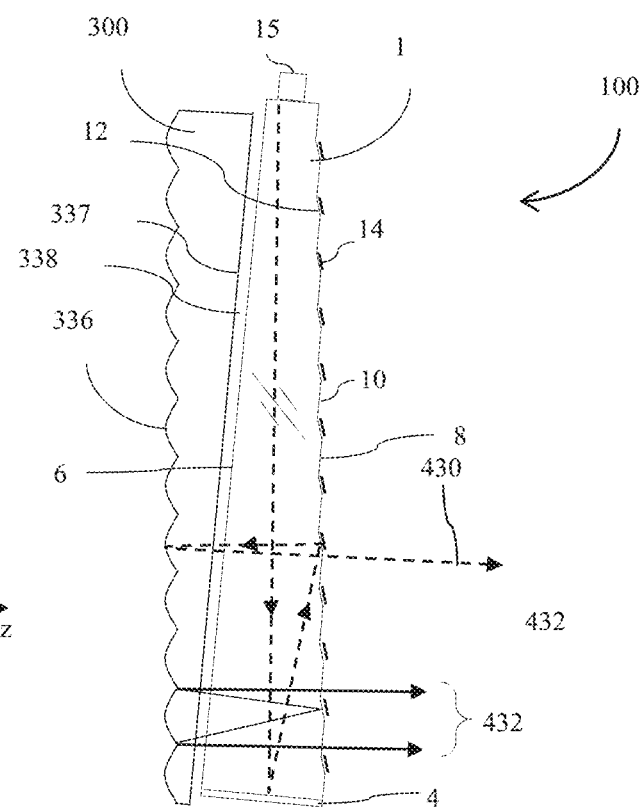
FIG. 27D is a schematic diagram illustrating in side view a directional illumination device comprising a stepped waveguide and an aligned mirror array comprising a tapered support substrate.

FIG. 27D is a schematic diagram illustrating in side view a directional illumination device 100 comprising a stepped waveguide 1 and an aligned tapered rear reflector 300. Features of the embodiment of FIG. 27D not discussed in further detail may be assumed to correspond to the features with equivalent reference numerals as discussed above, including any potential variations in the features.

Rear reflector 300 comprises a reflective side 330 with an array of elongate mirror elements 336 and a light transmitting side 337 that is tapered with respect to the plane of the elongate mirror elements 336. Air gap 338 is arranged between the light transmitting side 337 and the second guiding surface 8 of the waveguide 1.

In operation, light rays 430 are guided along the waveguide 1, reflected at alight extraction feature 12 with reflective coating 14 and directed through the second light guiding surface 8. The light is transmitted across the air gap and into the rear reflector 300 at which is incident on an elongate mirror element 336 aligned to the respective light extraction feature 12. The reflected light beam is directed into a collimated cone 432 in a similar manner to that illustrated in FIG. 27B. Advantageously luminous intensity is increased.

Said taper compensates for the change in thickness of the waveguide 1 in the y-direction, such that the separation between the light extraction features 12 and elongate mirror elements 336 is substantially the same across the waveguide 1. Further the width of the light extraction features 12 and width of each of the elongate mirror elements 336 is constant in the y-direction. Advantageously the complexity of tooling of the waveguide 1 and rear reflector is reduced, reducing cost and complexity.

It may be desirable to reduce the complexity of the waveguide while achieving a more focused output than that provided by the stepped waveguide 1 of FIG. 1.

Figure 28A:
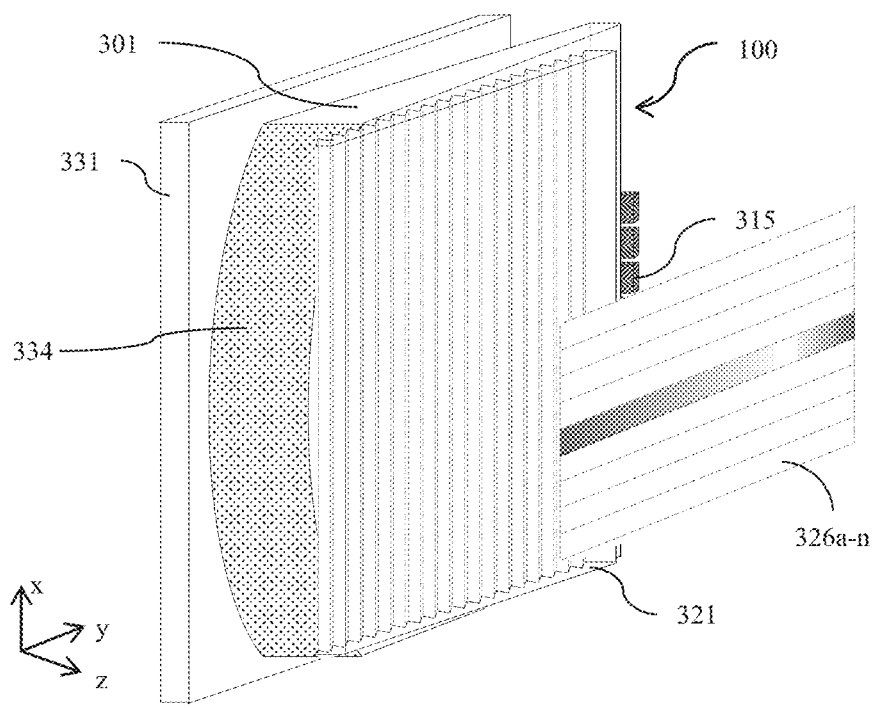
FIG. 28A is a schematic diagram illustrating in front perspective view a directional illumination device comprising a tapered waveguide with curved and tilted curved reflective surface, a light turning film and a planar rear reflector.
Figure 28B:
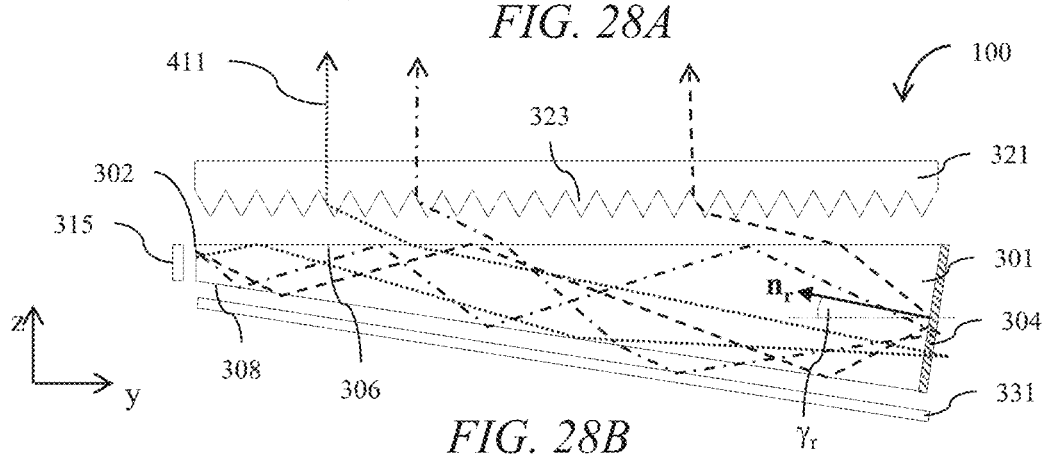
FIG. 28B is a schematic diagram illustrating in side view the directional illumination device of FIG. 28A.

FIG. 28A is a schematic diagram illustrating in front perspective view a directional illumination device 100 comprising a tapered waveguide 301 with curved and tilted curved reflective surface 334, a light turning film 321 and a planar rear reflector 331; FIG. 28B is a schematic diagram illustrating in side view the directional illumination device 100 of FIG. 28A; and FIG. 28C is a schematic diagram illustrating in front view the directional illumination device 100 of FIG. 28A.

A directional illumination device 100 for a vehicle external light 102, comprising: an array of light sources 315; and a waveguide 301 comprising: an input surface 302; a reflective end 304; and first and second guide surfaces 306, 308 extending between the input surface 302 and the reflective end 304, wherein the light sources 315 of the array are arranged to input light into the waveguide 301 through the input surface 302 and are disposed at different input positions in a direction laterally across the waveguide 301; and the first and second, opposed guide surfaces 306, 308 are arranged to guide input light from the input surface 302 to the reflective end 304 and back along the waveguide 301 after reflection at the reflective end 304, the waveguide 301 being arranged to extract input light as it is guided back along the waveguide 301 after reflection at the reflective end 304 and to cause the extracted light to exit through the first guide surface 306: and the reflective end 304 has positive optical power in the direction laterally across the waveguide 301 and the waveguide 301 is arranged to direct the extracted light in respective output illumination directions distributed in a lateral direction in dependence on the input positions of the light sources 315 in the direction laterally across the waveguide 301.

Figure 28C:
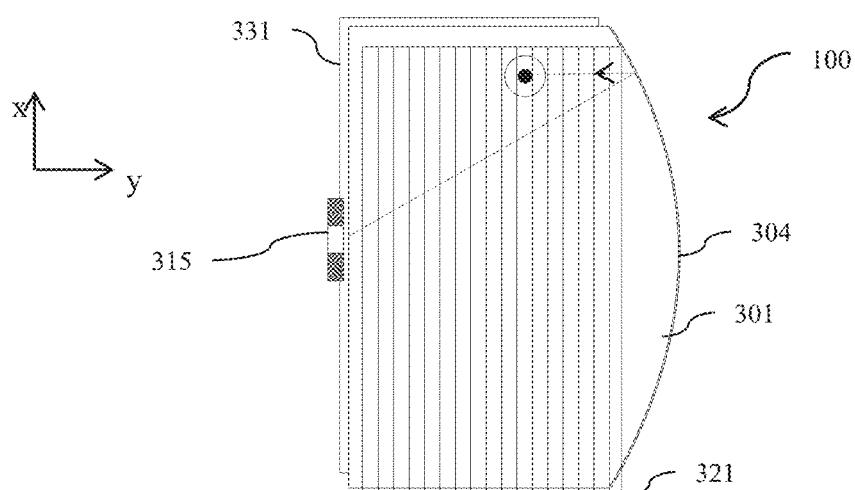
FIG. 28C is a schematic diagram illustrating in front view the directional illumination device of FIG. 28A.

The arrangement of FIG. 28A, FIG. 28C and FIG. 28C differ from the arrangement of FIG. 1, FIG. 2A and FIG. 2B in certain aspects.

Waveguide 301 comprises a second guiding surface 338 that is substantially planar and does not comprise a stepped surface. Guiding surfaces 306, 308 are not parallel (compared to the typically parallel surface 6 and intermediate features 10 of the second surface 8 of waveguide 1). The reflective end 304 has a surface normal direction $n_r$ in the z-y plane that is inclined at angle $\gamma_r$ to the y-axis (compared to the reflective surface 4 surface normal direction $n_r$ in the z-y plane that is parallel to the y-axis of waveguide 1). Rear reflector 331 comprises a planar reflective surface (compared to the faceted surface of rear reflector 300).

Light turning film 321 comprising elongate prisms 323 is provided to receive light rays 411 from the first surface 306 of the waveguide 301. The light turning film 321 redirects light rays 411 that are output with near grazing angle output angle from the waveguide 301 to a direction closer to the normal to the light guide surface 306.

In operation, the structure of FIG. 28A is similar but not identical to that of FIG. 1. Advantageously an array of electronically controllable optical cones 326*a-n* may be provided in a similar manner to the cones 26*a-n* of FIG. 1. Advantageously the luminance profile in the direction orthogonal to the lateral direction may have a narrower profile as will be further described below. Such a cone may advantageously achieve increased illuminance for example in region 522 as described elsewhere herein.

Figure 29A:
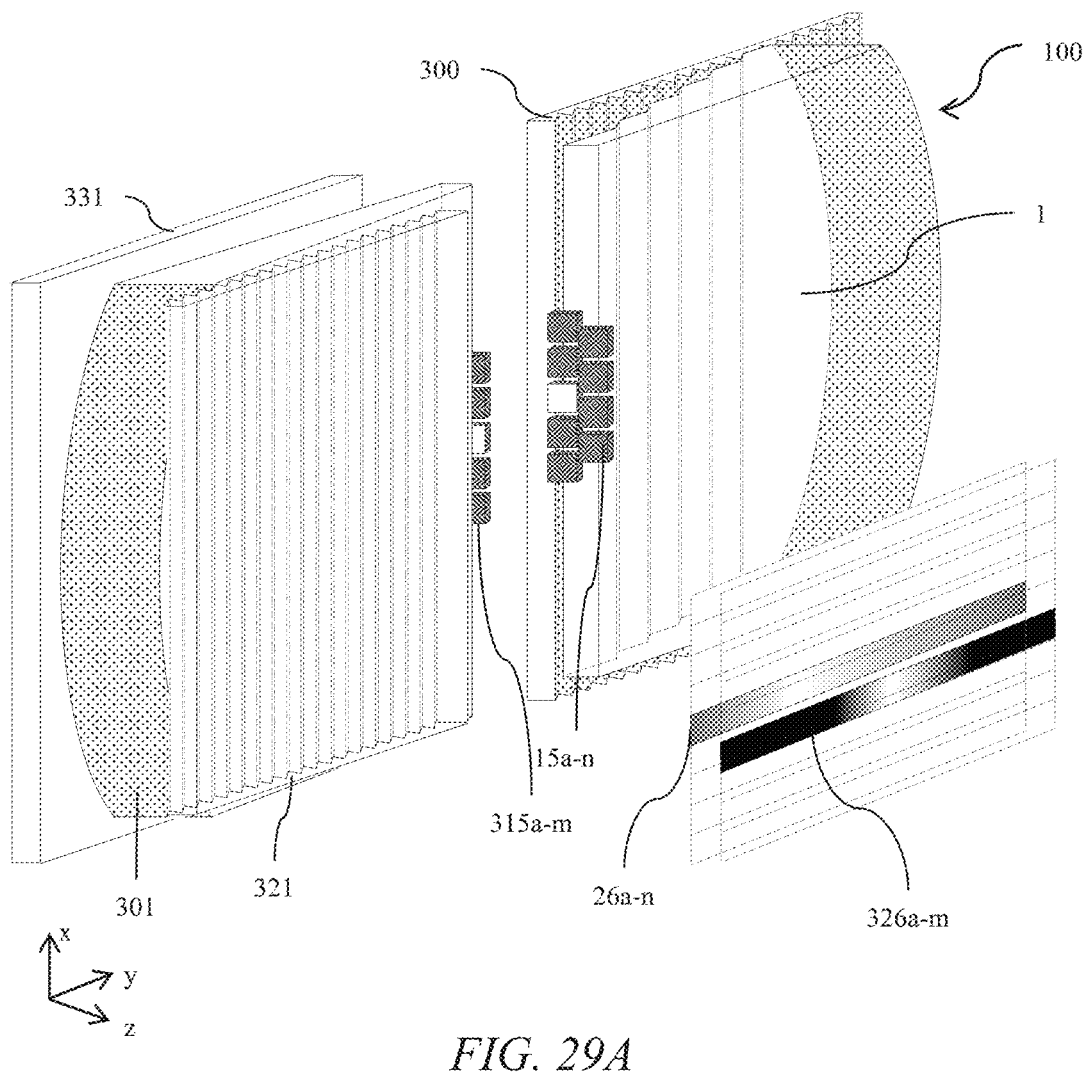
FIG. 29A is a schematic diagram illustrating in front perspective view a directional illumination device comprising a tiled stepped waveguide and a tapered waveguide.
Figure 29B:
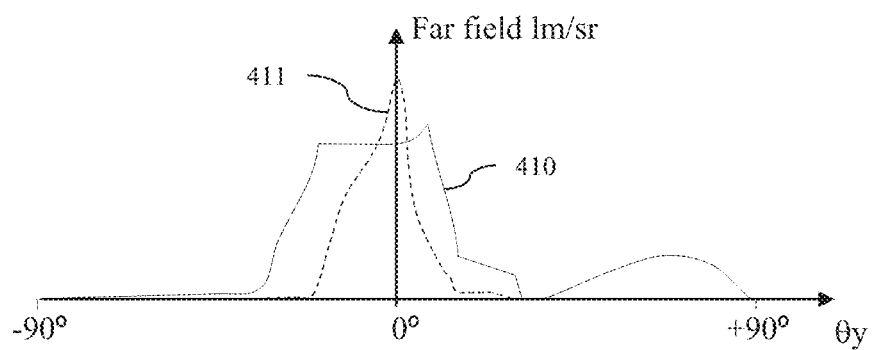
FIG. 29B is a schematic graph illustrating a variation of output luminance with angle in a directional parallel to the lateral direction for the waveguides of FIG. 29A.

It may be desirable to provide further control of structure of output illuminance profiles. FIG. 29A is a schematic diagram illustrating in front perspective view a directional illumination device 100 comprising a tiled stepped waveguide 1 and a tapered waveguide 301; and FIG. 29B is a schematic graph illustrating a variation of output luminance with angle in a directional parallel to the lateral direction for the waveguides of FIG. 29A. Features of the embodiment of FIGS. 29A-B not discussed in further detail may be assumed to correspond to the features with equivalent reference numerals as discussed above, including any potential variations in the features.

In the alternative embodiment of FIG. 29A, the plural waveguides 1, 301 are tiled. In respect of a first one of the waveguides 1, the first guide surface 6 is arranged to guide light by total internal reflection; and the second guide surface 8 comprises light extraction features 12 and intermediate regions 10 between the light extraction features 12, the light extraction features 12 being arranged to extract input light by deflecting the input light as it is guided back along the waveguide 1 after reflection at the reflective end 4 in directions causing the deflected light to exit through the first guide surface 6, the intermediate regions 10 being arranged to guide light along the waveguide 1 without extraction. In respect of a second one of the waveguides 301, the first guide surface 306 is arranged to guide light by total internal reflection, and the second guide surface 308 is arranged to guide light by total internal reflection and is inclined at an angle with respect to the first guide surface 306 that is selected so that the waveguide 301 is arranged to extract input light as it is guided back along the waveguide 301 after reflection at the reflective end 304 by breaking total internal reflection, and the directional illumination device 100 further comprises a deflection element 321 extending across the first guide surface 306 of the region of the waveguide 301 for deflecting light towards the normal to the first guide surface 306.

In operation profiles 410, 411 are provided by the respective waveguides 1, 301. The profile 411 may be substantially narrower than the profile 410. The profile 411 is well suited to provide control of illumination region 522 and the profile 410 is well suited to provide control of illumination region 520 as described elsewhere herein. Advantageously increased control of illumination profiles may be achieved.

Other arrangements of waveguides 301 will now be described.

Figure 30A:
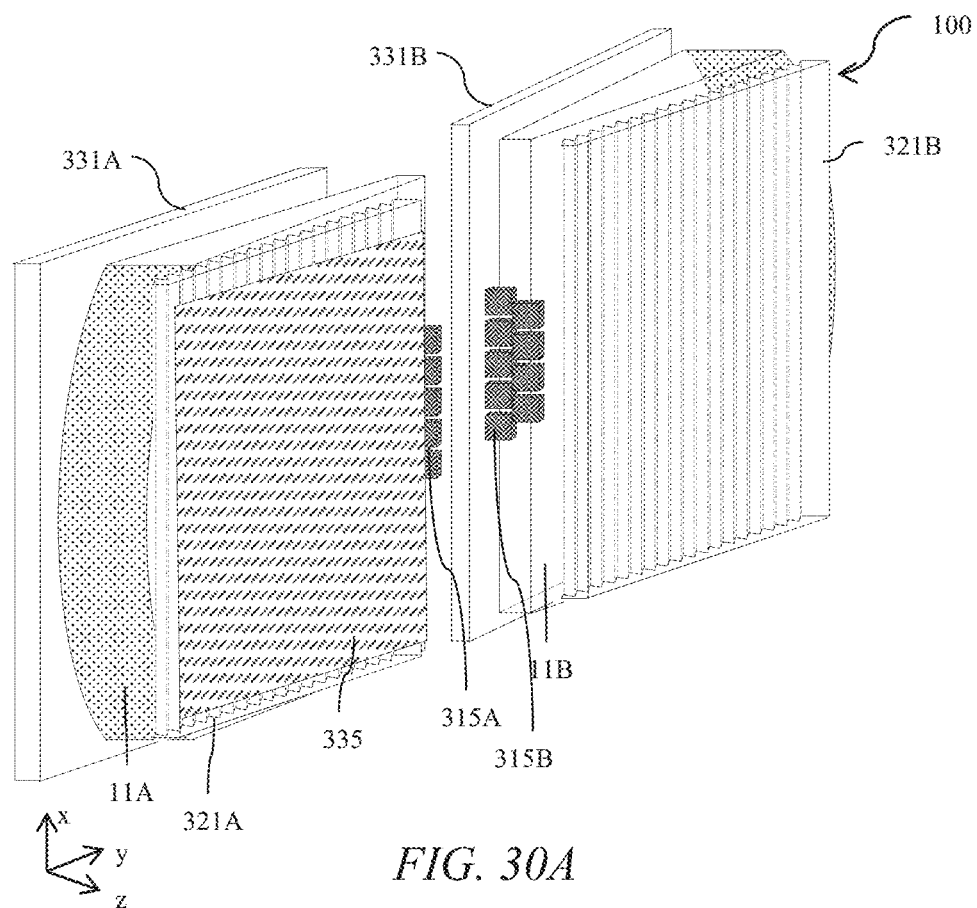
FIG. 30A is a schematic diagram illustrating in front perspective view a directional illumination device comprising two tiled tapered waveguides.
Figure 30B:
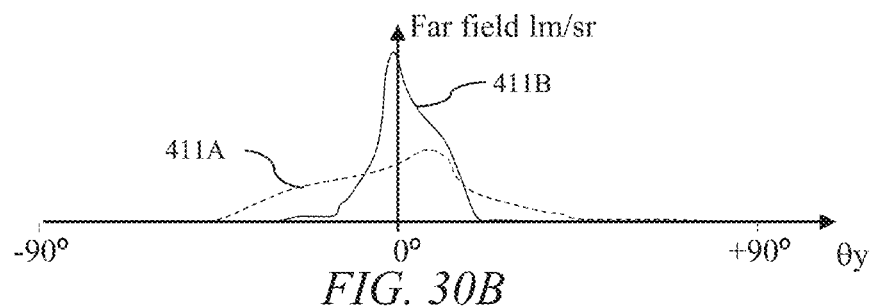
FIG. 30B is a schematic graph illustrating a variation of output luminance with angle in a directional parallel to the lateral direction for the waveguides of FIG. 30A.
Figure 30C:
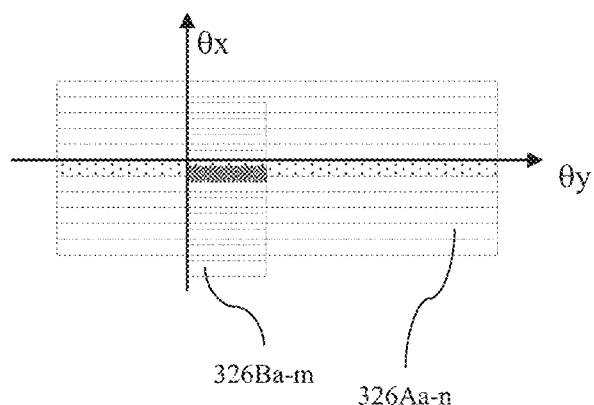
FIG. 30C is a schematic graph illustrating a variation of output luminance with polar angle for the arrangement of FIG. 30A.

FIG. 30A is a schematic diagram illustrating in front perspective view a directional illumination device 100 comprising two tiled tapered waveguides 301A, 301B further comprising a diffuser 335 is arranged to receive light from at least a first region of at least one of the waveguides 301A; and FIG. 30B is a schematic graph illustrating a variation of output luminance with angle in a directional parallel to the lateral direction for the waveguides of FIG. 30A; FIG. 30C is a schematic graph illustrating a variation of output luminance with polar angle for the arrangement of FIG. 30A. Features of the embodiment of FIGS. 30A-C not discussed in further detail may be assumed to correspond to the features with equivalent reference numerals as discussed above, including any potential variations in the features.

In the alternative embodiment of FIG. 30A, in respect of each waveguide 301A, 301B: the first guide surface 306 is arranged to guide light by total internal reflection, and the second guide surface 308 is arranged to guide light by total internal reflection and is inclined at an angle with respect to the first guide surface 306 that is selected so that the waveguide 301 is arranged to extract input light as it is guided back along the waveguide 301 after reflection at the reflective end 304 by breaking total internal reflection, and the directional illumination device 100 further comprises a deflection element 321 extending across the first guide surface 306 of the region of the waveguide 301 for deflecting light towards the normal to the first guide surface 306.

First and second illumination profiles 411A, 411B may be provided in the direction θy orthogonal to the lateral direction. Array of optical cones 326Aa-n and array of optical cones 326Ba-m may be provided for independent control.

In the present embodiments comprising more than one waveguide, the pitch Δθx of the optical cones 26, 326 may be different to advantageously achieve increased control of adjustment of illumination regions 520, 522.

Far field illumination regions 522 and 520 respectively may be conveniently provided as described elsewhere herein.

Figure 31:
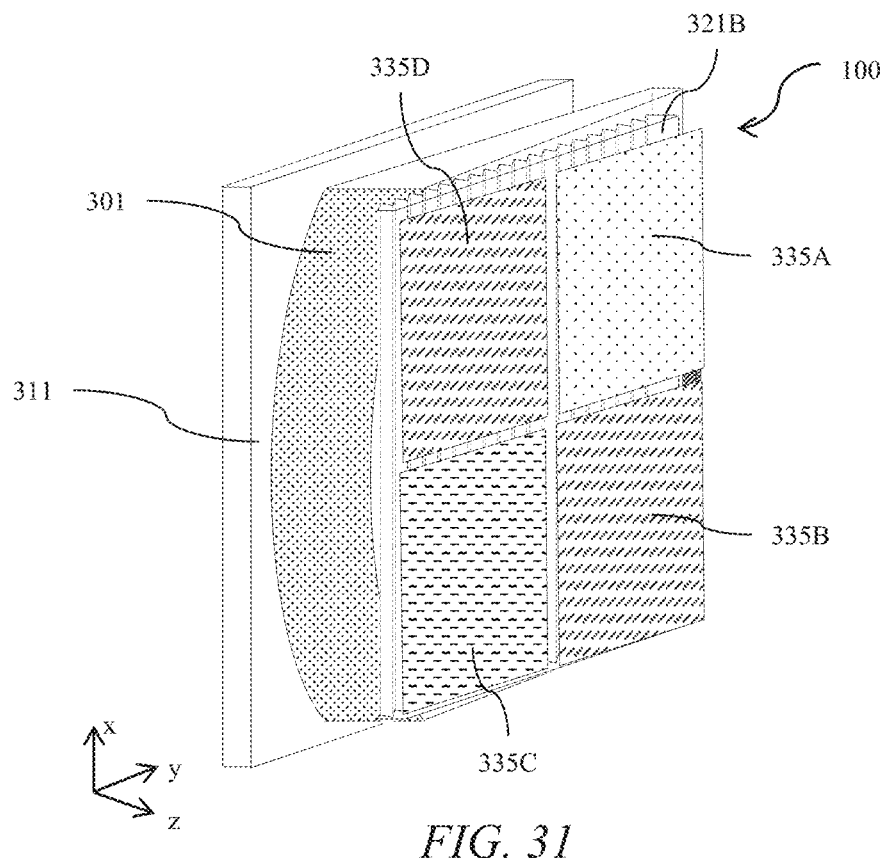
FIG. 31 is a schematic diagram illustrating in front perspective view a directional illumination device comprising a tapered waveguide with curved and tilted curved reflective surface, a light turning film, a planar rear reflector and array of diffusers.

FIG. 31 is a schematic diagram illustrating in front perspective view a directional illumination device 100 comprising a tapered waveguide 301 with curved and tilted curved reflective surface 334, a light turning film 321, a planar rear reflector 331 and array of diffusers 335A-D. Features of the embodiment of FIG. 31 not discussed in further detail may be assumed to correspond to the features with equivalent reference numerals as discussed above, including any potential variations in the features.

The narrow cone angle 411 as illustrated elsewhere may be modified by different diffusers 335A-D across the area of waveguide 301 such that a desirable output illumination profile is provided.

Figure 32:
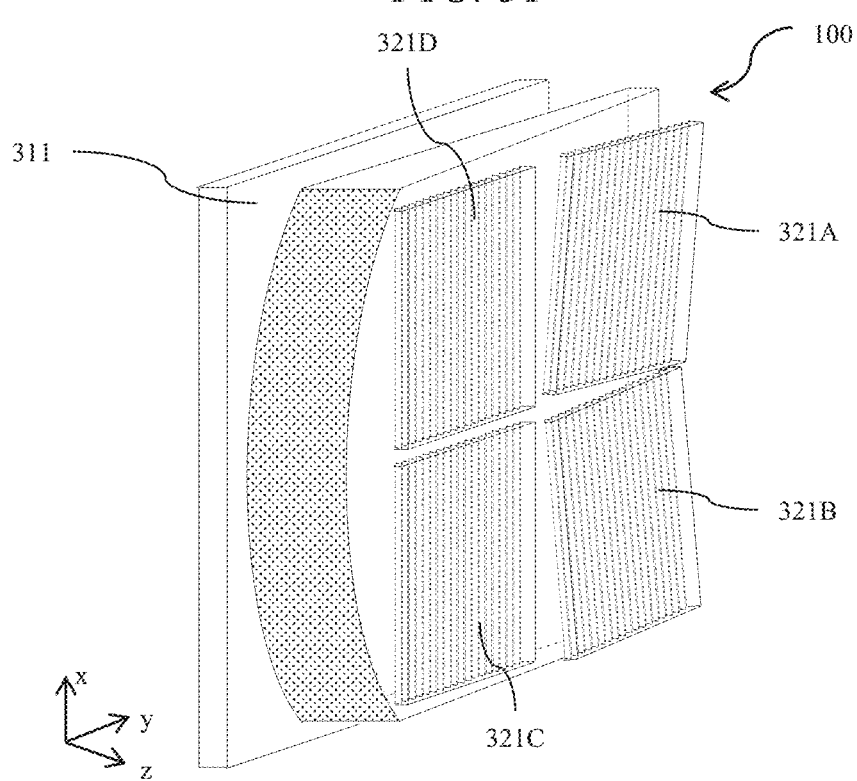
FIG. 32 is a schematic diagram illustrating in front perspective view a directional illumination device comprising a tapered waveguide with curved and tilted curved reflective surface, an array of light turning films, a planar rear reflector and a patterned diffuser.

FIG. 32 is a schematic diagram illustrating in front perspective view a directional illumination device 100 comprising a tapered waveguide 301 with curved and tilted curved reflective surface 334, an array of light turning films 321A-D, and a planar rear reflector 331. Features of the embodiment of FIG. 32 not discussed in further detail may be assumed to correspond to the features with equivalent reference numerals as discussed above, including any potential variations in the features.

Rotation of the light turning film direction can modify the directional output of the illumination device 100 such that a desirable output illumination profile is provided.

It may be desirable to reduce the size of the illumination device 100 in comparison to the arrangement of FIG. 29A.

Figure 33:
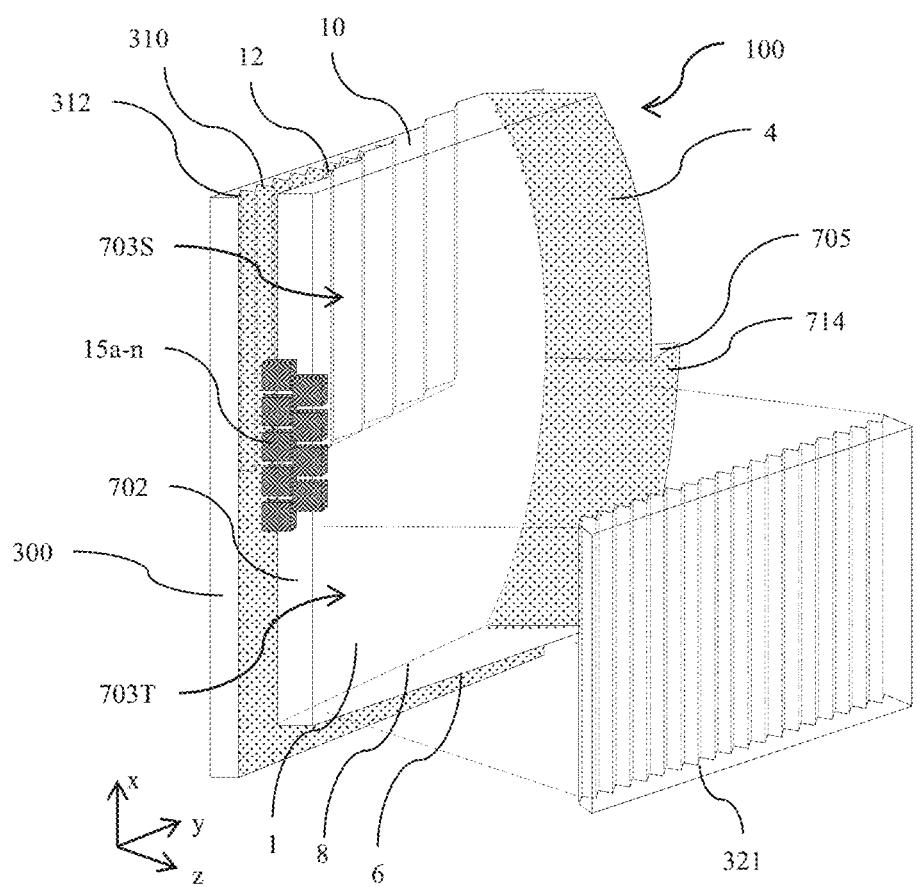
FIG. 33 is a schematic diagram illustrating in front perspective view a directional illumination device comprising a waveguide with a stepped region and a tapered region.

FIG. 33 is a schematic diagram illustrating in front perspective view a directional illumination device 100 comprising a waveguide 1 with a stepped region 703S and a tapered region 703T. Features of the embodiment of FIG. 33 not discussed in further detail may be assumed to correspond to the features with equivalent reference numerals as discussed above, including any potential variations in the features.

In the alternative embodiment of FIG. 33, region 703S comprises a stepped waveguide 1 of the type illustrated in FIG. 1 comprising the first guide surface 706 is arranged to guide light by total internal reflection, and across the region 703S of the waveguide 1, the second guide surface 8 comprises light extraction features 12 and intermediate regions 10 between the light extraction features 12, the light extraction features 12 being arranged to extract input light by deflecting the input light as it is guided back along the waveguide 1 after reflection at the reflective end 4 in directions causing the deflected light exit through the first guide surface 6, the intermediate regions 10 being arranged to guide light along the waveguide without extraction. Rear reflector 300 comprises reflective facets 312, 310 in the region 703S.

Region 703T comprises a tapered waveguide that in operation directs light as for the type illustrated in FIG. 28A with tapered first and second guide surfaces 706, 8, inclined reflective end 714 that are equivalent in operation to the first and second guide surfaces 306, 308, inclined reflective end 304 of FIG. 28A. Rear reflector 300 comprises a plane surface in the region 703T.

Step 705 is provided between reflective end portions 4, 714. Light turning film 321 is arranged to receive light from the first guide surface 706 of the waveguide as illustrated for FIG. 28A. Step 5 may be transmissive to advantageously reduce stray light.

The region 703S of the waveguide 1 is a partial region, and across the remaining region 703T of the waveguide 1, the second guide surface 8 is arranged to guide light by total internal reflection and is inclined at an angle with respect to the first guide surface 706 that is selected so that the waveguide is arranged to extract input light as it is guided back along the waveguide 1 after reflection at the reflective end 4 by breaking total internal reflection, and the directional illumination device 100 further comprises a deflection element 321 extending across the first guide surface 706 of the remainder of the waveguide for deflecting light towards the normal to the first guide surface 706.

The first guide surface 706 is arranged to guide light by total internal reflection, and across a region 703T of the waveguide 1, the second guide surface 8 is arranged to guide light by total internal reflection and is inclined at an angle with respect to the first guide surface 6 that is selected so that the waveguide 301 is arranged to extract input light as it is guided back along the waveguide 301 after reflection at the reflective end 714 by breaking total internal reflection, and the directional illumination device 100 further comprises a deflection element 321 extending across the first guide surface 706 of the region 703T of the waveguide 1 for deflecting light towards the normal to the first guide surface 706.

Advantageously the size of the illumination device 100 is reduced while achieving desirable illumination profile output.

It would be desirable to provide stepped waveguides 1 which are suitable for use with high luminous flux at the input side 2.

Figure 34A:
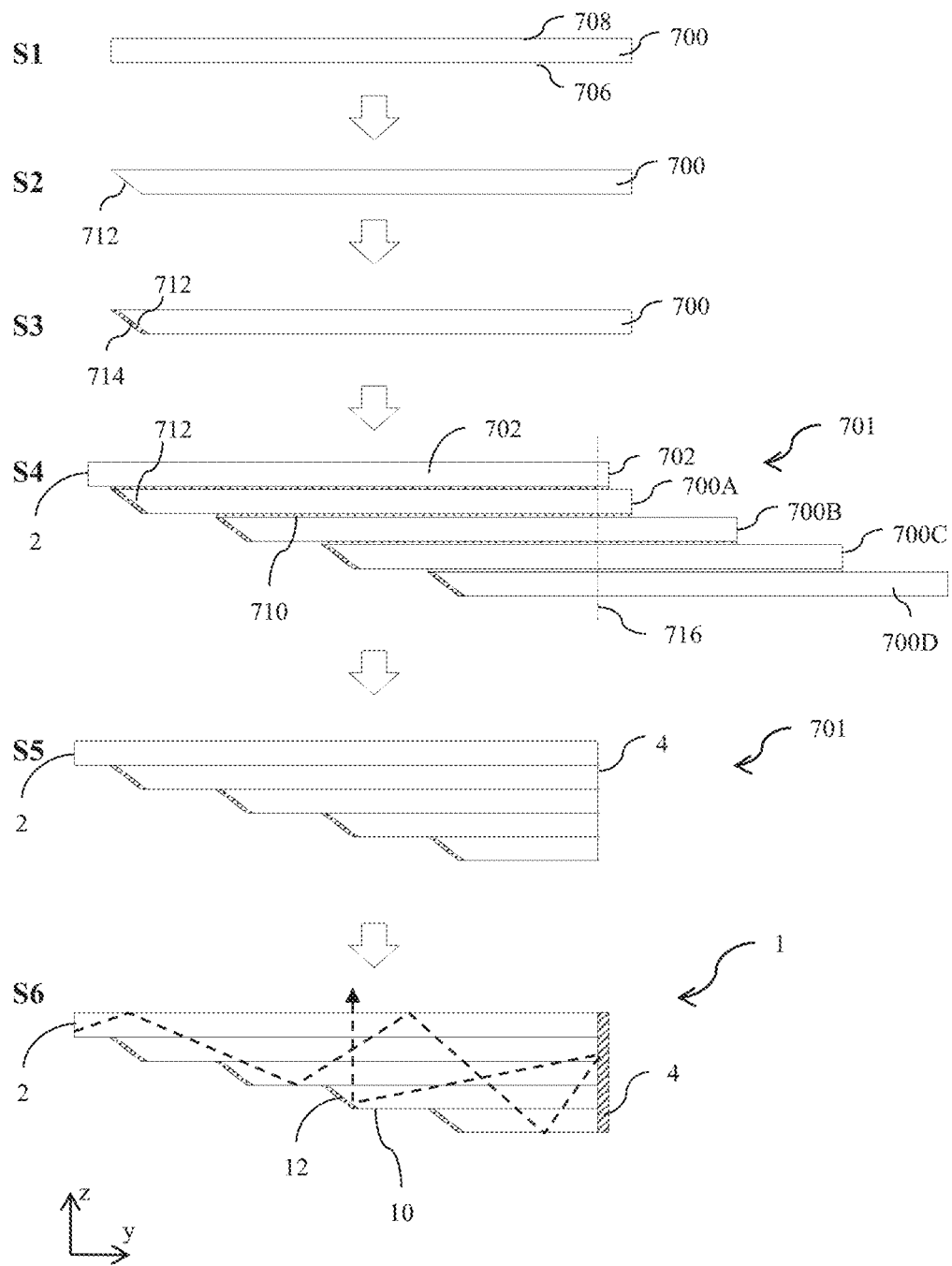
FIG. 34A is a schematic diagram illustrating in side view a method to fabricate a stepped waveguide.

FIG. 34A is a schematic diagram illustrating a method to fabricate a stepped waveguide. Features of the embodiment of FIG. 34A not discussed in further detail may be assumed to correspond to the features with equivalent reference numerals as discussed above, including any potential variations in the features.

In a first step S1 a substrate 700 is provided, with substantially planar surfaces 706, 708. The substrate may be a glass substrate and the surfaces 706, 708 may be polished using known flat polish methods. Alternatively the surfaces 706, 708 may be provided during the fabrication of the substrate 700, for example float or fire polished glass.

In a second step S2, an edge of the substrate 700 may optionally be cut and then polished to provide a polished slope 712. In operation as a waveguide the polished slope 712 provides the light extraction feature 12. Advantageously the profile shape of the slope 712 may be adjusted by means of the polishing shape.

In a third step S3 a reflective material 714 may be provided on the slope 712. Reflective material 714 may be a coating formed on the surface of slope 712 such as silver or aluminium, by means of evaporation, spray coating or other known coating methods.

Alternatively reflective material may be a reflective material 714 such as ESR™, from 3M Corporation that is adhered to the slope 712 by means of an adhesive such as PSA or OCA. Advantageously the length of the slope 712 may be sufficiently large to provide desirable adhesion for the adhered reflective material 714. For example the slope may have a length of 0.5 mm or greater and preferably 1 mm or greater. Advantageously the reflectivity of the reflective coating 14 of the waveguide 1 may be increased and efficiency increased in comparison to metallic coatings.

In a fourth step S4 a stack 701 of substrates 700A, 700B, 700C, 700D are arranged with offset slopes and may be adhered by means of adhesive layers 710 such as PSA or OCA or by solvent bonding.

A further planar substrate 702 with input side 2 is adhered to substrate 700A. The planar substrate 702 may be a glass material. Advantageously in operation, high flux light sources are provided at the input side 2 of substrate 702. In the present embodiments, materials such as glass may be provided that achieve resilience to very high flux levels can be used for substrates 700, 702.

The length of the substrates 702, 700A-D are arranged to overlap a cut line location 716.

Desirably the refractive index of the adhesive layers 710 is the same as or lower than the refractive index of the substrates 700. In operation of waveguide 1, efficient guiding of light through the waveguide 1 is achieved without confinement within individual substrates 700, 702.

In a fifth step S5 the stack 701 is cut and polished to provide an end 4 of waveguide 1 at the cut line location 716. The end 4 may be curved or may be planar. Advantageously output efficiency is increased.

In a sixth step S6 a reflector 4 is attached to the end 704. In the case that the end 4 is curved, the reflective material 714 may be a coating formed on the surface of slope 712 such as silver or aluminium, by means of evaporation, spray coating or other known coating methods. Alternatively reflective material may be a reflective material such as ESR™ from 3M Corporation that is adhered to the slope 712 by means of an adhesive such as PSA or OCA. In the case that the end 4 is planar the reflector may comprise a reflective Fresnel mirror.

Advantageously a stepped waveguide 1 may be provided with a small number of assembly steps. Tooling costs may be reduced in comparison to moulded waveguides. High feature 12 fidelity may be provided. In operation glass substrates 700 may advantageously achieve increased luminous flux at input surface 2 without damage or yellowing.

Alternatively the substrate 700 may be provided by a polymer substrate such as POC, PMMA, PC or other known transparent material. Alternatively the second step S2 is omitted and the substrate may be moulded with the slope 712. Advantageously cost and complexity may be reduced.

It may be desirable to reduce the cost of the polishing of the substrate 700.

Figure 34B:
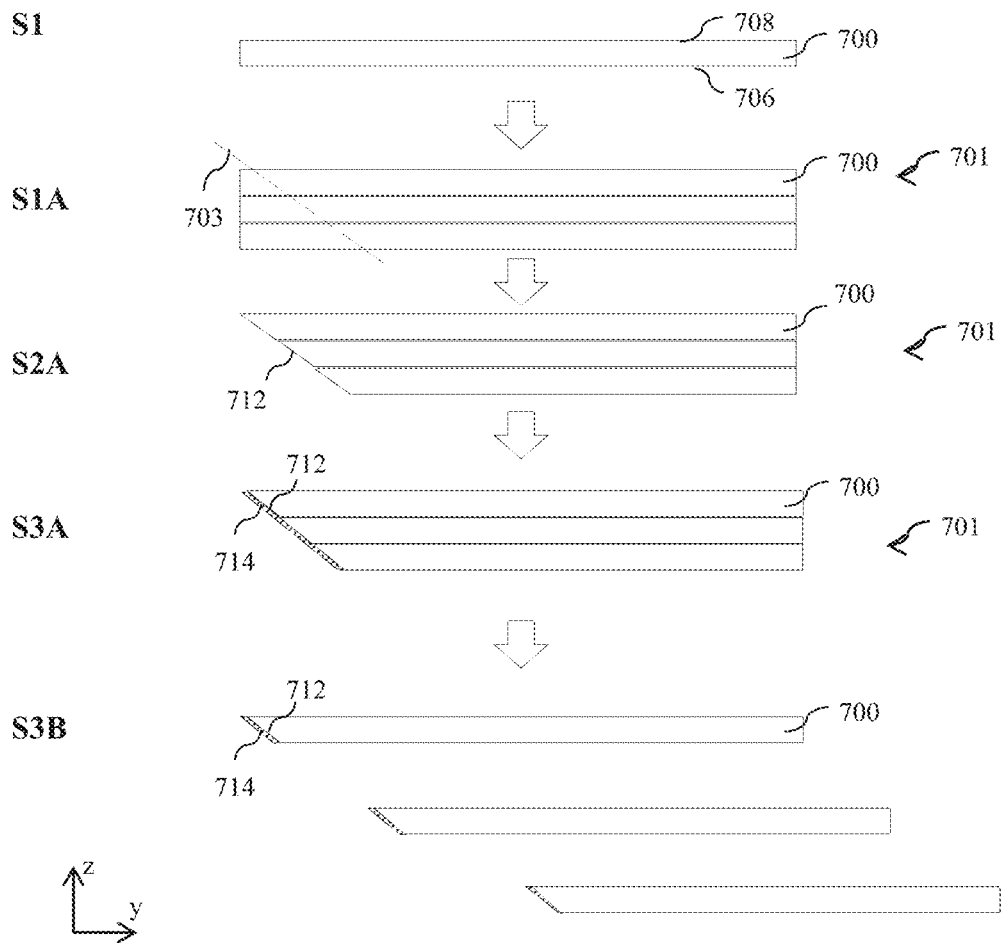
FIG. 34B is a schematic diagram illustrating in side view alternative steps of a method to fabricate a stepped waveguide.

FIG. 34B is a schematic diagram illustrating in side view alternative steps of a method to fabricate a stepped waveguide. Features of the embodiment of FIG. 34B not discussed in further detail may be assumed to correspond to the features with equivalent reference numerals as discussed above, including any potential variations in the features.

In comparison to the method of FIG. 34A, step S1A provides an intermediate step in which a stack 701 of substrates 700 is provided. The substrates may be attached within the stack using a jig or a removable wax for example. A cut and polish line 703 is illustrated, such that in step S2A the stack 701 is polished in the same step. Advantageously the number of polishing steps and cost is reduced.

In step S3A, a coating is applied at the same time to the polished surfaces 712 of the stack 701. Advantageously cost is reduced. In the case that the coating 714 is a film, an additional cut step (not shown) may be used to separate the coating 714 between adjacent substrates 700.

In step S3B, the substrates are separated and moved into position for bonding as illustrated in steps S4-S6 of FIG. 34A.

Figure 34C:
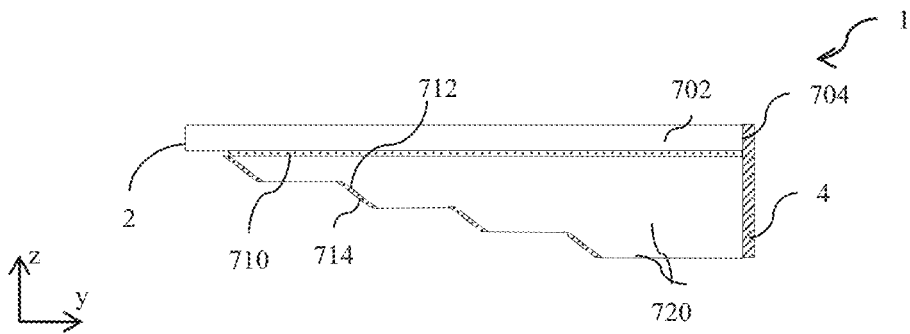
FIG. 34C is a schematic diagram illustrating in side view an alternative structure of a stepped waveguide.

FIG. 34C is a schematic diagram illustrating in side view an alternative structure of a stepped waveguide 1. Features of the embodiment of FIG. 34C not discussed in further detail may be assumed to correspond to the features with equivalent reference numerals as discussed above, including any potential variations in the features.

In comparison to the methods of FIGS. 34A-B, an integrated body 720 is provided with steps 712 that are provided with coating 714. Low index adhesive 710 is provided between the integrated body 720 and the substrate 702. The substrate 702 may be provided with a polished end 704 that is aligned to the moulded end of integrated substrate 720. Alternatively the substrates 702 and integrated body 720 may be polished after adhesion to provide the end 4.

Advantageously in operation the material of the substrate 702 is provided that is resilient to the high input flux of the light sources. As the light spreads within the substrate 702, the light flux density falls so that the flux density within the integrated body is reduced. Materials may be used for integrated substrate 720 that are suitable for moulding and coating and are resilient to lower light fluxes that that desirable for the input end 2 of the waveguide 1. Advantageously cost may be reduced and lifetime increased. The operating temperature range of the waveguide 1 may be increased.

In another alternative an illumination device 100 for a vehicle, comprises: an array of light sources 15a-n; and a waveguide 1 comprising: an input surface 2; a reflective end 4; and first and second guide surfaces 6, 8 extending between the input surface 2 and the reflective end 4, wherein the light sources 15a-n of the array are arranged to input light into the waveguide 1 through the input surface 2 and are disposed at different input positions in a direction laterally across the waveguide 1; and the first and second, opposed guide surfaces 6, 8 are arranged to guide input light from the input surface 2 to the reflective end 4 and back along the waveguide 1 after reflection at the reflective end 4, the waveguide 1 being arranged to extract input light as it is guided back along the waveguide 1 after reflection at the reflective end 4 and to cause the extracted light to exit through the first guide surface; and the reflective end has positive optical power in the direction laterally across the waveguide 1 and the waveguide 1 is arranged to direct the extracted light in respective output illumination directions distributed in a lateral direction in dependence on the input positions of the light sources 15a-n in the direction laterally across the waveguide 1.

Whilst the embodiments described above refer to a vehicle external light to provide illumination of scene exterior to the vehicle, in another alternative the illumination device 100 may be a vehicle internal light arranged to provide illumination of the internal zones or surfaces of the vehicle. For example, directional illumination may be provided to direct light onto limited surface areas, for example by directing light onto a door during opening, onto control stalks during operation or onto a lap to enable a passenger to read. Advantageously stray light may be reduced while high illuminance may be achieved in desirable directions. In other embodiments, the light sources may comprise ultraviolet light sources, such as UV-C radiating sources that are arranged to provide sterilisation of bacterial and viral matters. Advantageously the light sources may be directed onto surfaces such as steering wheels, and other surfaces which users handle, without stray light being directed to the eyes of occupants. Advantageously retinal damage risk is reduced. Alternatively, the UV light source may be operated remotely when the vehicle is unoccupied.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A directional illumination device for a vehicle external light, comprising:
    an array of light sources; and
    a waveguide comprising:
        an input surface;
        a reflective end; and
        first and second guide surfaces extending between the input surface and the reflective end, wherein
    the light sources of the array are arranged to input light into the waveguide through the input surface and are disposed at different input positions in a direction laterally across the waveguide; and
    the first and second, opposed guide surfaces are arranged to guide input light from the input surface to the reflective end and back along the waveguide after reflection at the reflective end, the waveguide being arranged to extract input light as it is guided back along the waveguide after reflection at the reflective end and to cause the extracted light to exit through the first guide surface; and
    the reflective end has positive optical power in the direction laterally across the waveguide and the waveguide is arranged to direct the extracted light in respective output illumination directions distributed in a lateral direction in dependence on the input positions of the light sources in the direction laterally across the waveguide.

2. A directional illumination device according to claim 1, wherein the first guide surface is arranged to guide light by total internal reflection, and across a region of the waveguide, the second guide surface comprises:
at least one light extraction feature, arranged to extract input light by deflecting the input light as it is guided back along the waveguide after reflection at the reflective end in directions causing the deflected light to exit through the first guide surface; and
at least one guiding region to guide light along the waveguide without extraction.

3. A directional illumination device according to claim 2, wherein
the at least one light extraction feature comprises plural light extraction features, and
the at least one guiding region includes one or more intermediate regions between the light extraction features.

4. A directional illumination device according to claim 3, wherein the number of light extraction features is 10 or fewer.

5. A directional illumination device according to claim 3, wherein the second guide surface is shaped as a series of steps, the light extraction features and the intermediate regions being surfaces of successive steps.

6. A directional illumination device according to claim 3, wherein the light extraction features have a pitch measured in a direction parallel to the first surface between centres of the light extraction features that is greater than 0.5 mm.

7. A directional illumination device according to claim 3, wherein, across respective sub-regions of the region of the waveguide, the light extraction features are configured differently.

8. A directional illumination device according to claim 7, wherein, across the respective sub-regions of the region of the waveguide, the light extraction features extend in different directions so that the output illumination directions into which light is directed from the different regions is offset.

9. A directional illumination device according to claim 7, wherein, across the respective sub-regions of the region of the waveguide, the light extraction features have different profiles so that the output illumination directions into which light is directed from the different regions have different intensity distributions along a length perpendicular to the lateral directions for respective waveguides, in which the output illumination directions are distributed.

10. A directional illumination device according to claim 7, wherein the region of the waveguide is the entirety of the waveguide.

11. A directional illumination device according to claim 7, wherein
the region of the waveguide is a partial region, and
across the remaining region of the waveguide, the second guide surface is arranged to guide light by total internal reflection and is inclined at an angle with respect to the first guide surface that is selected so that the waveguide is arranged to extract input light as it is guided back along the waveguide after reflection at the reflective end by breaking total internal reflection, and
the directional illumination device further comprises a deflection element extending across the first guide surface of the remainder of the waveguide for deflecting light towards the normal to the first guide surface.

12. A directional illumination device according to claim 3, wherein the waveguide is non-planar and the plural light extraction features are curved to achieve a common output illumination direction across at least part of the waveguide.

13. A directional illumination device according to claim 2, wherein the at least one light extraction feature has a reflective surface.

14. A directional illumination device according to claim 2, wherein the height of the at least one light extraction feature in a direction orthogonal to the first surface is greater than 0.25 mm.

15. A directional illumination device according to claim 2, wherein the at least one light extraction feature has no optical power in a direction laterally across the waveguide.

16. A directional illumination device according to claim 2, further comprising at least one elongate lens element arranged in front of the first guide surface, the elongate lens element axis being aligned with a light extraction feature and arranged to control the distribution of the extracted light in a direction orthogonal to the lateral direction.

17. A directional illumination device according to claim 16, wherein the at least one light extraction feature comprises plural light extraction features and the at least one elongate lens element comprises plural elongate lens elements arranged in front of the first guide surface, each elongate lens element being aligned with a respective light extraction feature.

18. A directional illumination device according to claim 17, wherein the plural elongate lens elements have the same optical power and are separated from the respective light extraction feature with which they are aligned by the same distance.

19. A directional illumination device according to claim 17, wherein the plural elongate lens elements have optical powers that increase with increasing distance from the reflective end, such that the distribution of the extracted light from each light extraction feature in a direction orthogonal to the lateral direction is uniform for the extracted light from each light extraction feature.

20. A directional illumination device according to claim 17, wherein the plural elongate lens elements are provided in a common component extending across the first guide surface.

21. A directional illumination device according to claim 17, wherein the plural elongate lens elements are separate components.

22. A directional illumination device according to claim 21, wherein the plural elongate lens elements have sides extending away from first light guiding surface of the waveguide, the sides comprising light absorbing material.

23. A directional illumination device according to claim 16, wherein the at least one elongate lens element is arranged in front of the first guide surface with an air gap therebetween.

24. A directional illumination device according to claim 16, wherein the at least one light extraction feature comprises plural light extraction features, at least one of the light extraction features having no elongate lens element aligned therewith.

25. A directional illumination device according to claim 2, wherein the directional illumination device further comprises a reflective element extending across the first guide surface that is arranged to reflect the extracted light back through the waveguide so that it is output in an output direction that is forwards of the second guide surface, the reflective element providing at least one elongate mirror element arranged in front of the first guide surface, the elongate mirror element being aligned with a light extraction feature and arranged to control the distribution of the extracted light in a direction orthogonal to the lateral direction.

26. A directional illumination device according to claim 1, wherein
the first guide surface is arranged to guide light by total internal reflection, and
across a region of the waveguide, the second guide surface is arranged to guide light by total internal reflection and is inclined at an angle with respect to the first guide surface that is selected so that the waveguide is arranged to extract input light as it is guided back along the waveguide after reflection at the reflective end by breaking total internal reflection, and
the directional illumination device further comprises a deflection element extending across the first guide surface of the region of the waveguide for deflecting light towards the normal to the first guide surface.

27. A directional illumination device according to claim 1, wherein the directional illumination device is arranged to output the extracted light in an output direction that is forwards of the first guide surface.

28. A directional illumination device according to claim 1, wherein the directional illumination device further comprises a reflective element extending across the first guide surface that is arranged to reflect the extracted light back through the waveguide so that it is output in an output direction that is forwards of the second guide surface.

29. A directional illumination device according to claim 1, wherein the waveguide further comprises sides extending between the opposed guide surfaces and between the input surface and the reflective end.

30. A directional illumination device according to claim 1, wherein some of the light sources are separated in the direction perpendicular to the direction laterally across the waveguide.

31. A directional illumination device according to claim 30, wherein the light sources are contiguous in the direction laterally across waveguide.

32. A directional illumination device according to claim 1, further comprising a diffuser arranged across a partial region of the first guide surface.

33. A directional illumination device according to claim 1, further comprising a rear reflector disposed behind the second guide surface.

34. A directional illumination device according to claim 33, wherein the rear reflector comprises an array of reflective facets arranged to reflect input light that is transmitted through the second guide surface back through the waveguide to exit through the first guide surface.

35. A directional illumination device according to claim 1, wherein the directional illumination device comprises:
plural arrays of light sources; and
plural waveguides each comprising:
an input surface;
a reflective end; and
first and second guide surfaces extending between the input surface and the reflective end, wherein in respect of each waveguide:
the light sources of a respective array of light sources are arranged to input light into the waveguide through the input surface and are disposed at different input positions in a direction laterally across the waveguide; and
the first and second, opposed guide surfaces are arranged to guide input light from the input surface to the reflective end and back along the waveguide after reflection at the reflective end, the waveguide being arranged to extract input light as it is guided back along the waveguide and to cause the extracted light to exit through the first guide surface; and the reflective end has positive optical power in the direction laterally across the waveguide and the waveguide is arranged to direct the extracted light in respective output illumination directions distributed in a lateral direction in dependence on the input positions of the light sources in the direction laterally across the waveguide, and
wherein the first guide surface of each waveguide faces in a common direction.

36. A directional illumination device according to claim 35, wherein the plural waveguides are oriented so that the lateral directions for respective waveguides, in which the output illumination directions are distributed, are perpendicular or at an acute non-zero angle.

37. A directional illumination device according to claim 35, wherein the plural waveguides are oriented so that the lateral directions for respective waveguides, in which the output illumination directions are distributed, are parallel.

38. A directional illumination device according to claim 35, wherein the plural waveguides are configured to provide output illumination directions having intensity distributions along a length perpendicular to the lateral directions for respective waveguides, in which the output illumination directions are distributed, that are different for each waveguide.

39. A directional illumination device according to claim 35, wherein in respect of each waveguide:
the first guide surface is arranged to guide light by total internal reflection, and across a region of the waveguide, the second guide surface comprises light extraction features and intermediate regions between the light extraction features, the light extraction features being arranged to extract input light by deflecting the input light as it is guided back along the waveguide after reflection at the reflective end in directions causing the deflected light to exit through the first guide surface, the intermediate regions being arranged to guide light along the waveguide without extraction.

40. A directional illumination device according to claim 35, wherein
in respect of a first one of the waveguides:
the first guide surface is arranged to guide light by total internal reflection; and
the second guide surface comprises light extraction features and intermediate regions between the light extraction features, the light extraction features being arranged to extract input light by deflecting the input light as it is guided back along the waveguide after reflection at the reflective end in directions causing the deflected light to exit through the first guide surface, the intermediate regions being arranged to guide light along the waveguide without extraction, and
in respect of a first one of the waveguides:
the first guide surface is arranged to guide light by total internal reflection, and
the second guide surface is arranged to guide light by total internal reflection and is inclined at an angle with respect to the first guide surface that is selected so that the waveguide is arranged to extract input light as it is guided back along the waveguide after reflection at the reflective end by breaking total internal reflection, and
the directional illumination device further comprises a deflection element extending across the first guide surface of the region of the waveguide for deflecting light towards the normal to the first guide surface.

41. A directional illumination device according to claim 35, wherein in respect of each waveguide:

the first guide surface is arranged to guide light by total internal reflection, and the second guide surface is arranged to guide light by total internal reflection and is inclined at an angle with respect to the first guide surface that is selected so that the waveguide is arranged to extract input light as it is guided back along the waveguide after reflection at the reflective end by breaking total internal reflection, and the directional illumination device further comprises a deflection element extending across the first guide surface of the region of the waveguide for deflecting light towards the normal to the first guide surface.

42. A directional illumination device according to claim 35, wherein the plural waveguides are tiled.

43. A directional illumination device according to claim 35, wherein the plural waveguides are stacked.

44. A directional illumination device according to claim 1, further comprising a control system arranged to selectively control the light sources.

45. A directional illumination device according to claim 1, wherein each light source of the array of light sources comprises an optical output that comprises a white light spectrum, an infra-red light spectrum or an ultraviolet light spectrum.

46. A directional illumination device according to claim 1, wherein at least some of the light sources comprise light emitting diodes or laser diodes.

47. A directional illumination device according to claim 1, wherein the array of light sources comprises at least two light sources with different spectral outputs.

48. A directional illumination device according to claim 47, wherein the two different spectral outputs comprise two of: a first white light spectrum, a second white light spectrum different from the first white light spectrum, red light, orange light, ultra-violet and infra-red light.

49. A directional illumination device according to claim 1, further comprising an actuator system arranged to drive movement of the array of light sources relative to the waveguide in the direction laterally across the waveguide.

50. A directional illumination device according to claim 49, wherein the actuator system has a resolution which is smaller than an average pitch of the light sources in the direction laterally across the waveguide.

51. A vehicle external light comprising:
a housing for fitting to a vehicle, and
an illumination device according to claim 1 mounted on the housing.

52. A vehicle external light according to claim 51, further comprising a transmissive cover extending across an output side of the waveguide.

53. A vehicle external light according to claim 51, being a vehicle headlight having an output luminous flux of at least 100 lumens.

54. A vehicle external light according to claim 51, being a vehicle reversing light.

55. A vehicle external light according to claim 51, being a rear vehicle light wherein the light sources provide red light.

56. An illumination device for a vehicle external light, comprising:
an array of light sources; and
a waveguide comprising:
an input surface;
a reflective end; and
first and second guide surfaces extending between the input surface and the reflective end, wherein
the light sources of the array are arranged to input light into the waveguide through the input surface and are disposed at different input positions in a direction laterally across the waveguide; and
the first and second, opposed guide surfaces are arranged to guide input light from the input surface to the reflective end and back along the waveguide after reflection at the reflective end, the waveguide being arranged to extract input light as it is guided back along the waveguide after reflection at the reflective end and to cause the extracted light to exit through the first guide surface; and
the reflective end has positive optical power in the direction laterally across the waveguide and the waveguide is arranged to direct the extracted light in respective output illumination directions distributed in a lateral direction in dependence on the input positions of the light sources in the direction laterally across the waveguide.

* * * * *